(12) United States Patent
Crarer et al.

(10) Patent No.: US 9,999,315 B2
(45) Date of Patent: Jun. 19, 2018

(54) BEVERAGE PRODUCTION METHODS WITH MULTI CHAMBERED BASKET UNITS

(71) Applicant: Starbucks Corporation, Seattle, WA (US)

(72) Inventors: Alan Scott Crarer, Santa Cruz, CA (US); Adam Mekeel Mack, Menlo Park, CA (US); Matthew Thomas James, San Francisco, CA (US); Philipe Roget Manoux, Oakland, CA (US); Diane Chia-Lin Lee, San Francisco, CA (US); Martin Ruegg, Muttenz (CH)

(73) Assignee: Starbucks Corporation, Seattle, WA (US)

( * ) Notice: Subject to any disclaimer, the term of this patent is extended or adjusted under 35 U.S.C. 154(b) by 0 days. days.

(21) Appl. No.: 15/251,824

(22) Filed: Aug. 30, 2016

(65) Prior Publication Data

US 2017/0042364 A1 Feb. 16, 2017

Related U.S. Application Data

(62) Division of application No. 14/205,256, filed on Mar. 11, 2014, now Pat. No. 9,439,532.

(51) Int. Cl.
*A47J 31/06* (2006.01)
*B65D 65/46* (2006.01)
(Continued)

(52) U.S. Cl.
CPC ....... *A47J 31/0647* (2013.01); *A47J 31/0668* (2013.01); *A47J 31/368* (2013.01);
(Continued)

(58) Field of Classification Search
CPC ............... A47J 31/0647; A47J 31/0668; A47J 31/3633; A47J 31/3638; A47J 31/368;
(Continued)

(56) References Cited

U.S. PATENT DOCUMENTS 3,483,811 A 12/1969 Heier
3,948,157 A 4/1976 Layre
(Continued)

FOREIGN PATENT DOCUMENTS

CA 2557883 C 11/2009
CA 2429631 C 1/2011
(Continued)

OTHER PUBLICATIONS

International Search Report and Written Opinion in corresponding International Patent Application No. PCT/US2015/019395, dated Jun. 23, 2015, in 9 pages.
(Continued)

*Primary Examiner* — Anthony Weier
(74) *Attorney, Agent, or Firm* — Knobbe, Martens, Olson & Bear, LLP

(57) ABSTRACT

Various beverage preparation machines having a multi-chambered basket unit are shown. The basket unit can be configured to accept multiple cartridge configurations. For example, some embodiments are configured to receive a first cartridge configuration in a first chamber of the basket unit and a second configuration in a second chamber of the basket unit. In various embodiments, the basket unit can rotate to allow selective accessibility of the first and second chambers. This can facilitate loading the cartridges into the appropriate chamber, such as loading the first cartridge configuration into the first chamber and the second cartridge configuration into the second chamber.

26 Claims, 69 Drawing Sheets

(51) Int. Cl.
*B65D 85/804* (2006.01)
*A47J 31/40* (2006.01)
*A47J 31/36* (2006.01)
*A47J 31/44* (2006.01)

(52) U.S. Cl.
CPC ....... *A47J 31/3633* (2013.01); *A47J 31/3638* (2013.01); *A47J 31/3685* (2013.01); *A47J 31/407* (2013.01); *A47J 31/4407* (2013.01); *B65D 65/466* (2013.01); *B65D 85/8043* (2013.01)

(58) Field of Classification Search
CPC .. A47J 31/3685; A47J 31/407; A47J 31/4407; B65D 65/466; B65D 85/8043
See application file for complete search history.

(56) References Cited

U.S. PATENT DOCUMENTS

| | | |
|---|---|---|
| 4,860,645 A | 8/1989 | van der Lijn et al. |
| 5,495,793 A | 3/1996 | Muis et al. |
| 5,520,093 A | 5/1996 | Ackermann |
| 5,551,988 A | 9/1996 | Reyhanloo et al. |
| 6,009,792 A | 1/2000 | Kraan |
| 6,021,705 A | 2/2000 | Dijs |
| 6,026,732 A | 2/2000 | Kollep et al. |
| 6,079,315 A | 6/2000 | Beaulieu et al. |
| 6,182,554 B1 | 2/2001 | Beaulieu et al. |
| 6,290,063 B1 | 9/2001 | Vogt et al. |
| 6,494,128 B1 | 12/2002 | Yu |
| 6,510,783 B1 | 1/2003 | Basile et al. |
| 6,607,762 B2 | 8/2003 | Lazaris et al. |
| 6,655,260 B2 | 12/2003 | Lazaris et al. |
| 6,685,365 B2 | 2/2004 | White |
| 6,725,762 B2 | 4/2004 | Kollep et al. |
| 6,763,759 B2 | 7/2004 | Denisart |
| 6,786,134 B2 | 9/2004 | Green |
| 6,832,542 B2 | 12/2004 | Hu et al. |
| 6,948,420 B2 | 9/2005 | Kirschner et al. |
| 6,955,116 B2 | 10/2005 | Hale |
| 6,978,682 B2 | 12/2005 | Foster et al. |
| 6,990,891 B2 | 1/2006 | Tebo |
| 7,028,604 B2 | 4/2006 | Cortese |
| 7,093,530 B2 | 8/2006 | Meister et al. |
| 7,165,488 B2 | 1/2007 | Bragg et al. |
| 7,216,582 B2 | 5/2007 | Yoakim et al. |
| 7,219,596 B2 | 5/2007 | Kief, Jr. |
| 7,243,867 B2 | 7/2007 | Steckhan |
| 7,255,039 B2 | 8/2007 | Halliday et al. |
| 7,320,274 B2 | 1/2008 | Castellani |
| 7,325,479 B2 | 2/2008 | Laigneau et al. |
| 7,347,138 B2 | 3/2008 | Bragg et al. |
| 7,464,636 B2 | 12/2008 | Mariller |
| 7,543,527 B2 | 6/2009 | Schmed |
| 7,569,243 B2 | 8/2009 | Yoakim et al. |
| 7,592,027 B2 | 9/2009 | Halliday et al. |
| 7,650,831 B2 | 1/2010 | Denisart et al. |
| 7,669,518 B2 | 3/2010 | Bardazzi |
| 7,698,992 B2 | 4/2010 | Wei |
| 7,707,927 B2 | 5/2010 | Boussemart et al. |
| 7,726,233 B2 | 6/2010 | Kodden et al. |
| 7,798,054 B2 | 9/2010 | Evers et al. |
| 7,815,953 B2 | 10/2010 | Mastropasqua et al. |
| 7,823,501 B2 | 11/2010 | Rijskamp et al. |
| 7,827,905 B2 | 11/2010 | Bardazzi |
| 7,832,328 B2 | 11/2010 | Koeling et al. |
| 7,856,920 B2 | 12/2010 | Schmed et al. |
| 7,883,733 B2 | 2/2011 | Cortese |
| 7,946,217 B2 | 5/2011 | Favre et al. |
| 7,992,486 B2 | 8/2011 | Constantine et al. |
| 7,993,691 B2 | 8/2011 | Yoakim et al. |
| 8,002,146 B2 | 8/2011 | Cahen et al. |
| 8,028,616 B2 | 10/2011 | Van Der Meer et al. |
| 8,039,036 B2 | 10/2011 | Knitel et al. |
| 8,071,147 B2 | 12/2011 | Steenhof et al. |
| 8,074,560 B2 | 12/2011 | Levi et al. |
| 8,079,300 B2 | 12/2011 | Jing |
| 8,091,469 B2 | 1/2012 | Cahen et al. |
| 8,095,242 B2 | 1/2012 | Quah |
| 8,109,200 B2 | 2/2012 | Hansen |
| 8,191,463 B2 | 6/2012 | Spinelli |
| 8,202,560 B2 | 6/2012 | Yoakim et al. |
| 8,210,095 B2 | 7/2012 | Brezovnik et al. |
| 8,210,098 B2 | 7/2012 | Boussemart et al. |
| 8,225,710 B2 | 7/2012 | Kristiaan et al. |
| 8,272,319 B2 | 9/2012 | Jarisch et al. |
| 8,307,754 B2 | 11/2012 | Ternite et al. |
| 8,312,806 B2 | 11/2012 | De Graaf et al. |
| 8,327,754 B2 | 12/2012 | Kirschner et al. |
| 8,333,144 B2 | 12/2012 | Boussemart et al. |
| 8,409,646 B2 | 4/2013 | Yoakim et al. |
| 8,431,175 B2 | 4/2013 | Yoakim et al. |
| 8,468,934 B2 | 6/2013 | Epars et al. |
| 8,475,860 B2 | 7/2013 | Colantonio et al. |
| 8,512,776 B2 | 8/2013 | Yoakim et al. |
| 8,567,304 B2 | 10/2013 | Saxton et al. |
| 8,613,248 B2 | 12/2013 | Steenhof et al. |
| 8,616,117 B2 | 12/2013 | Evers et al. |
| 8,651,012 B2 | 2/2014 | Yoakim et al. |
| 8,656,827 B2 | 2/2014 | Vanni |
| 8,658,232 B2 | 2/2014 | Yoakim et al. |
| 8,733,229 B2 | 5/2014 | Jarisch et al. |
| 8,752,478 B2 | 6/2014 | Nocera |
| 8,758,844 B2 | 6/2014 | Nocera |
| 8,784,915 B2 | 7/2014 | Evers et al. |
| 8,800,433 B2 | 8/2014 | Cahen et al. |
| 8,808,777 B2 | 8/2014 | Kamerbeek et al. |
| 8,813,634 B2 | 8/2014 | Yoakim et al. |
| 8,833,238 B2 | 9/2014 | Hansen et al. |
| 8,844,427 B2 | 9/2014 | Beutlrock et al. |
| 8,846,121 B2 | 9/2014 | Hansen et al. |
| 8,887,622 B2 | 11/2014 | Bentley et al. |
| 8,906,435 B2 | 12/2014 | Kamerbeek et al. |
| 8,931,397 B2 | 1/2015 | Frigeri et al. |
| 8,695,484 B2 | 2/2015 | Quelever et al. |
| 8,950,317 B2 | 2/2015 | Tanner et al. |
| 8,956,672 B2 | 2/2015 | Yoakim et al. |
| 8,962,048 B2 | 2/2015 | Gerbaulet et al. |
| 8,974,846 B2 | 3/2015 | Burton-Wilcock et al. |
| 8,978,545 B2 | 3/2015 | Yoakim et al. |
| 8,986,764 B2 | 3/2015 | Yoakim et al. |
| 9,439,532 B2 | 9/2016 | Crarer et al. |
| 9,504,348 B2 | 11/2016 | Windler et al. |
| 2002/0121198 A1 | 9/2002 | Kollep et al. |
| 2003/0066431 A1 | 4/2003 | Fanzutti et al. |
| 2003/0145736 A1 | 8/2003 | Green |
| 2004/0129145 A1* | 7/2004 | Denisart ............ A47J 31/3628 99/275 |
| 2004/0244599 A1 | 12/2004 | Wei |
| 2004/0255790 A1 | 12/2004 | Green |
| 2005/0076786 A1 | 4/2005 | Meister et al. |
| 2005/0076787 A1 | 4/2005 | Grant et al. |
| 2005/0076788 A1 | 4/2005 | Grant et al. |
| 2005/0095158 A1 | 5/2005 | Kirschner et al. |
| 2005/0126400 A1 | 6/2005 | Bragg et al. |
| 2005/0172820 A1 | 8/2005 | Cortese |
| 2005/0188854 A1 | 9/2005 | Green et al. |
| 2005/0223904 A1 | 10/2005 | Laigneau et al. |
| 2005/0241489 A1 | 11/2005 | Kirschner et al. |
| 2006/0075903 A1 | 4/2006 | Dijs |
| 2006/0196364 A1 | 9/2006 | Kirschner |
| 2006/0266225 A1 | 11/2006 | Hammad |
| 2007/0144355 A1 | 6/2007 | Denisart et al. |
| 2007/0148290 A1 | 6/2007 | Ternite et al. |
| 2007/0158366 A1 | 7/2007 | Van Deer Meer et al. |
| 2007/0261564 A1 | 11/2007 | Liverani et al. |
| 2008/0041234 A1 | 2/2008 | Cortese |
| 2008/0089982 A1 | 4/2008 | Brouwer et al. |
| 2008/0105131 A1 | 5/2008 | Castellani |
| 2008/0115673 A1 | 5/2008 | Zelioli et al. |
| 2008/0121111 A1 | 5/2008 | Paget et al. |
| 2008/0173181 A1 | 7/2008 | Startz |
| 2008/0245236 A1 | 10/2008 | Ternite et al. |

(56) References Cited

U.S. PATENT DOCUMENTS

| | | |
|---|---|---|
| 2008/0250936 A1 | 10/2008 | Cortese |
| 2009/0022864 A1 | 1/2009 | Steenhof et al. |
| 2009/0130270 A1* | 5/2009 | Cortese ............... A47J 31/0647 426/281 |
| 2009/0211457 A1 | 8/2009 | Cortese |
| 2009/0293733 A1* | 12/2009 | Martin ................... A47J 31/60 99/280 |
| 2010/0147873 A1 | 7/2010 | Yoakim et al. |
| 2010/0173056 A1 | 7/2010 | Yoakim et al. |
| 2010/0178404 A1 | 7/2010 | Yoakim et al. |
| 2010/0203208 A1 | 8/2010 | Yoakim et al. |
| 2010/0258010 A1 | 10/2010 | Castellani |
| 2010/0282088 A1* | 11/2010 | Deuber ................... A47J 31/52 99/281 |
| 2010/0313766 A1 | 12/2010 | Liverani et al. |
| 2011/0100228 A1 | 5/2011 | Rivera |
| 2011/0113968 A1 | 5/2011 | Schmed et al. |
| 2011/0154993 A1 | 6/2011 | Bertolina |
| 2011/0162533 A1 | 7/2011 | Fumagalli |
| 2011/0183055 A1 | 7/2011 | Mariller |
| 2011/0274802 A1 | 11/2011 | Rivera |
| 2011/0277642 A1 | 11/2011 | Mariller |
| 2011/0297002 A1 | 12/2011 | Vitel et al. |
| 2012/0031279 A1 | 2/2012 | Mariller et al. |
| 2012/0055343 A1 | 3/2012 | Remo et al. |
| 2012/0104025 A1* | 5/2012 | Anselmino ........... F25D 23/126 99/275 |
| 2012/0121765 A1 | 5/2012 | Kamerbeek et al. |
| 2012/0148709 A1 | 6/2012 | Kamerbeek et al. |
| 2012/0171332 A1 | 7/2012 | Lai et al. |
| 2012/0171334 A1 | 7/2012 | Yoakim et al. |
| 2012/0199010 A1 | 8/2012 | Mariller |
| 2012/0207895 A1 | 8/2012 | Rivera |
| 2012/0207896 A1 | 8/2012 | Rivera |
| 2012/0210878 A1 | 8/2012 | Mariller |
| 2012/0251669 A1 | 10/2012 | Kamerbeek et al. |
| 2012/0251670 A1 | 10/2012 | Kamerbeek et al. |
| 2012/0251671 A1 | 10/2012 | Kamerbeek et al. |
| 2012/0312174 A1 | 12/2012 | Lambert |
| 2012/0328740 A1 | 12/2012 | Nocera |
| 2013/0008316 A1 | 1/2013 | Hoglauer et al. |
| 2013/0025465 A1 | 1/2013 | Schnyder |
| 2013/0045308 A1 | 2/2013 | Gorbatenko |
| 2013/0068108 A1 | 3/2013 | Rivera |
| 2013/0068110 A1 | 3/2013 | Pagano |
| 2013/0142931 A1 | 6/2013 | Fin et al. |
| 2013/0149424 A1 | 6/2013 | Fischer |
| 2013/0156898 A1 | 6/2013 | Fisk et al. |
| 2013/0183130 A1 | 7/2013 | Etter |
| 2013/0269535 A1 | 10/2013 | Colantonio et al. |
| 2013/0340387 A1 | 12/2013 | Mariller |
| 2014/0102310 A1 | 4/2014 | Aardenburg et al. |
| 2014/0157993 A1 | 6/2014 | Brouwer et al. |
| 2014/0202338 A1 | 7/2014 | Remo et al. |
| 2014/0220205 A1 | 8/2014 | Kamerbeek et al. |
| 2014/0238249 A1 | 8/2014 | Mariller et al. |
| 2014/0290493 A1 | 10/2014 | Rivera |
| 2014/0302204 A1 | 10/2014 | Evers et al. |
| 2014/0328981 A1 | 11/2014 | Kamerbeek et al. |
| 2014/0360377 A1 | 12/2014 | Yoakim et al. |
| 2015/0060481 A1 | 3/2015 | Murray et al. |
| 2015/0068403 A1 | 3/2015 | Bentley et al. |
| 2015/0093484 A1 | 4/2015 | Kamerbeek et al. |
| 2015/0257585 A1 | 9/2015 | Windler et al. |
| 2015/0257586 A1 | 9/2015 | DiNucci |
| 2016/0309946 A1 | 10/2016 | Gunstone et al. |
| 2016/0367068 A1 | 12/2016 | Cable et al. |
| 2016/0367069 A1 | 12/2016 | Cable et al. |
| 2016/0367070 A1 | 12/2016 | Cable et al. |

FOREIGN PATENT DOCUMENTS

| | | |
|---|---|---|
| EP | 1521541 B1 | 7/2003 |
| EP | 1631176 B1 | 5/2004 |
| EP | 1208782 B1 | 8/2004 |
| EP | 1522241 A2 | 4/2005 |
| EP | 1829467 A2 | 9/2007 |
| EP | 1502528 B1 | 5/2008 |
| EP | 1653832 B1 | 10/2008 |
| EP | 1912542 B1 | 2/2009 |
| EP | 1854384 B1 | 12/2009 |
| EP | 2210539 A2 | 7/2010 |
| EP | 2000062 B1 | 8/2010 |
| EP | 2004028 B1 | 8/2010 |
| EP | 2413754 B1 | 1/2013 |
| FR | 2842090 A1 | 1/2004 |
| TW | 201540241 | 11/2015 |
| WO | WO 02/043541 A1 | 6/2002 |
| WO | WO 2007/016977 A1 | 2/2007 |
| WO | WO 2007/017455 A1 | 2/2007 |
| WO | WO 2007/045553 A1 | 4/2007 |
| WO | WO 2007/110842 A2 | 10/2007 |
| WO | WO 2007/138457 A2 | 12/2007 |
| WO | WO 2009/016444 A2 | 2/2009 |
| WO | WO 2010/081311 A1 | 7/2010 |
| WO | WO 2010/136601 A1 | 12/2010 |
| WO | WO 2011/051867 A1 | 5/2011 |
| WO | WO 2011/138723 A1 | 11/2011 |
| WO | WO 2012/123857 A1 | 9/2012 |
| WO | WO 2015/082662 A1 | 6/2015 |
| WO | WO 2015/138292 A1 | 9/2015 |
| WO | WO 2015/138293 A1 | 9/2015 |
| WO | WO 2016/205072 A2 | 12/2016 |

OTHER PUBLICATIONS

International Preliminary Report on Patentability in corresponding International Patent Application No. PCT/US2015/019395, dated Sep. 22, 2016, in 7 pages.

* cited by examiner

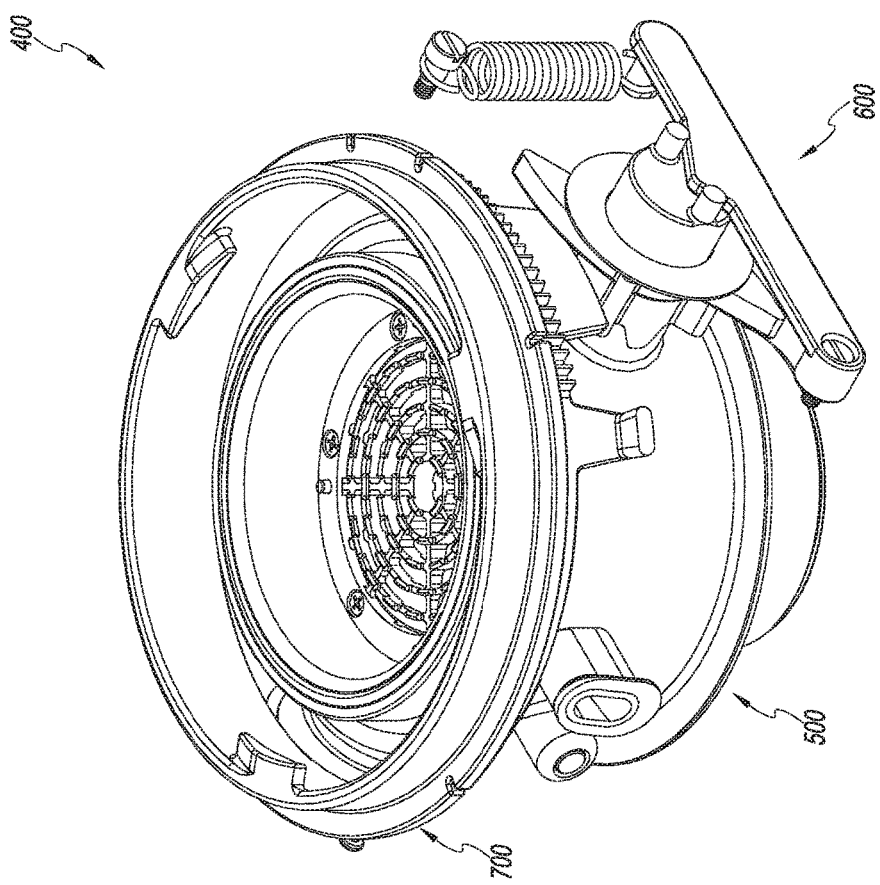

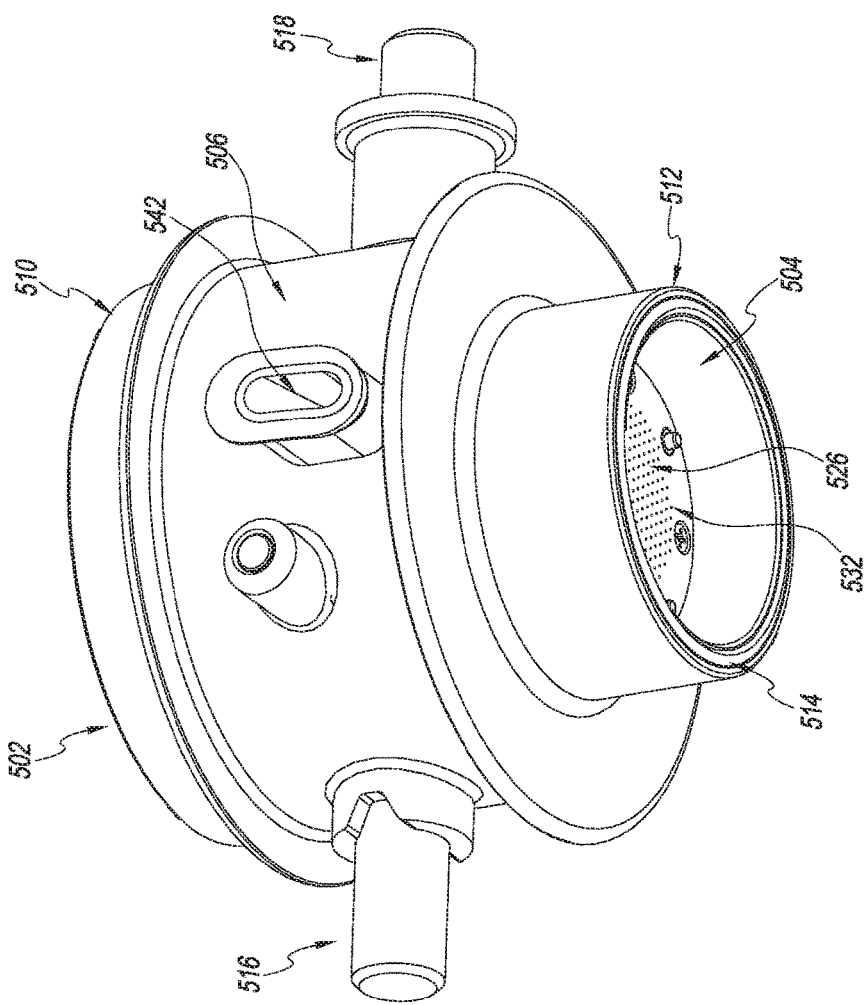

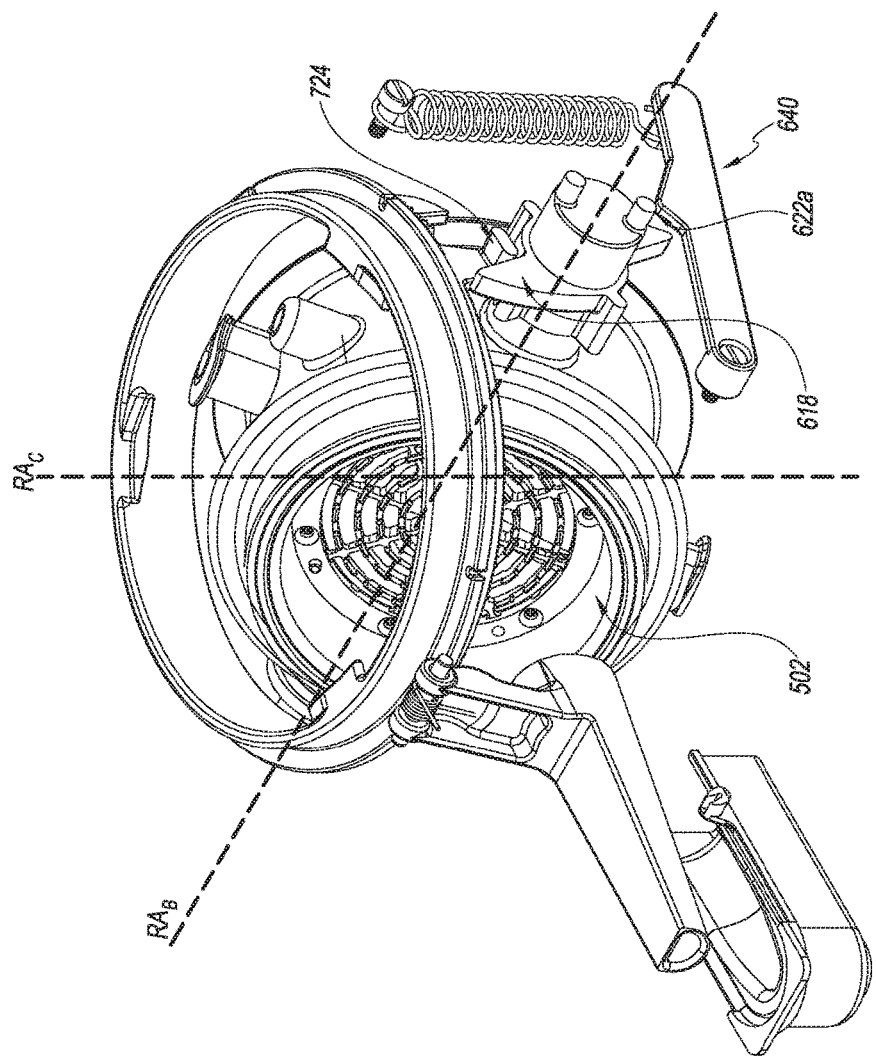

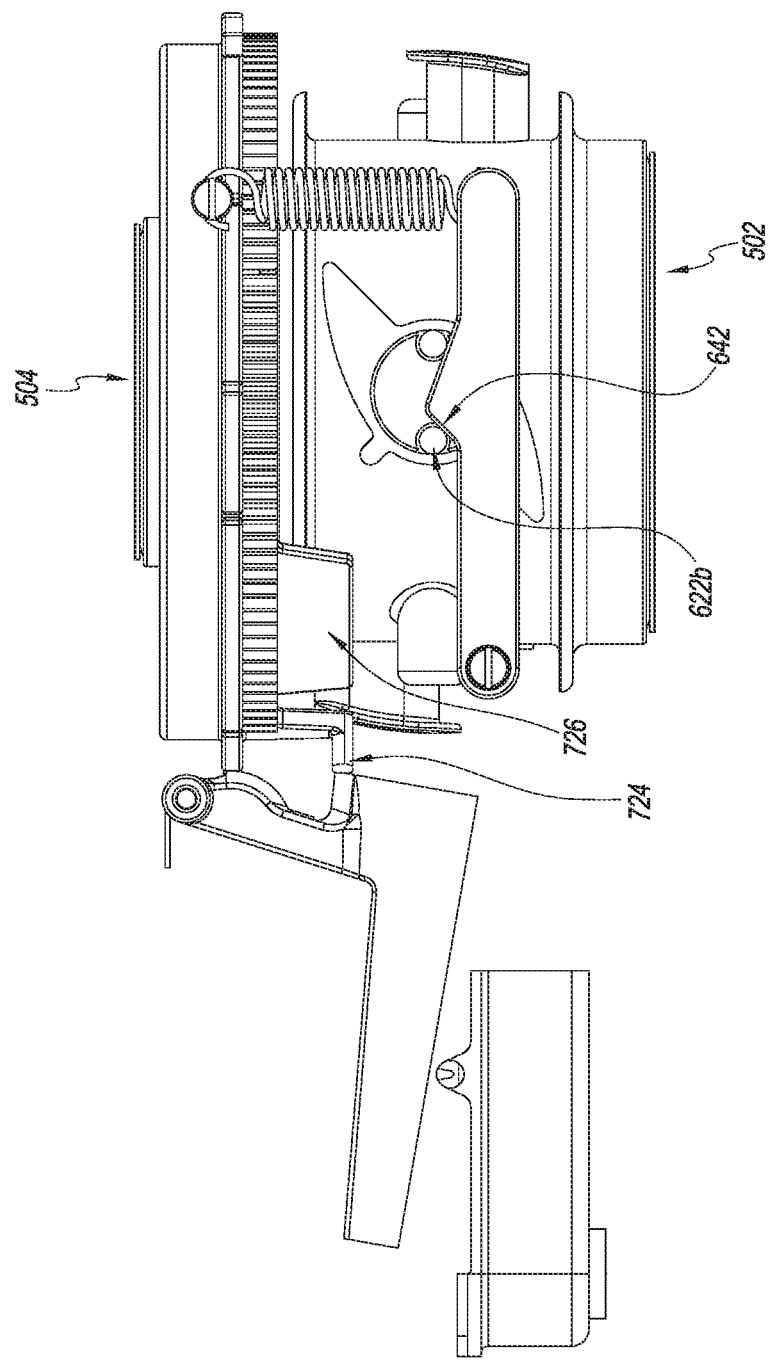

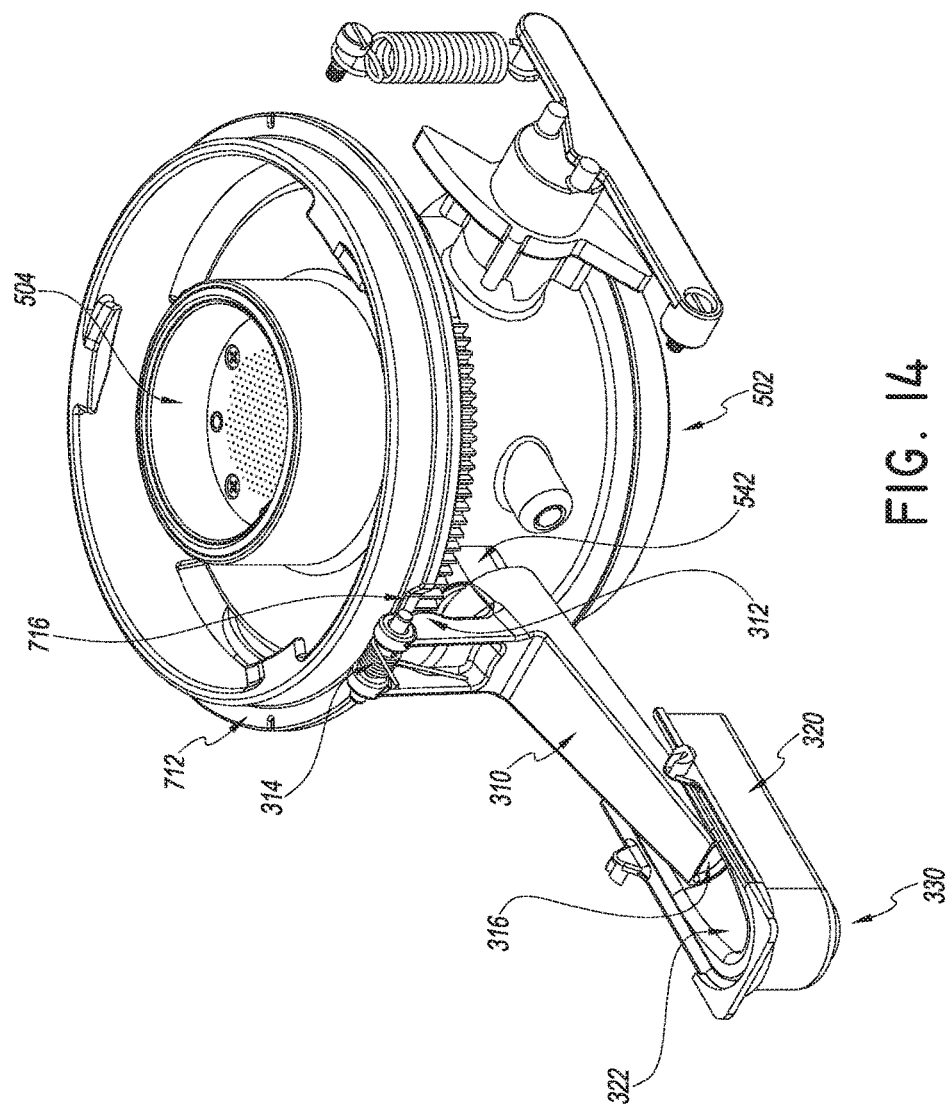

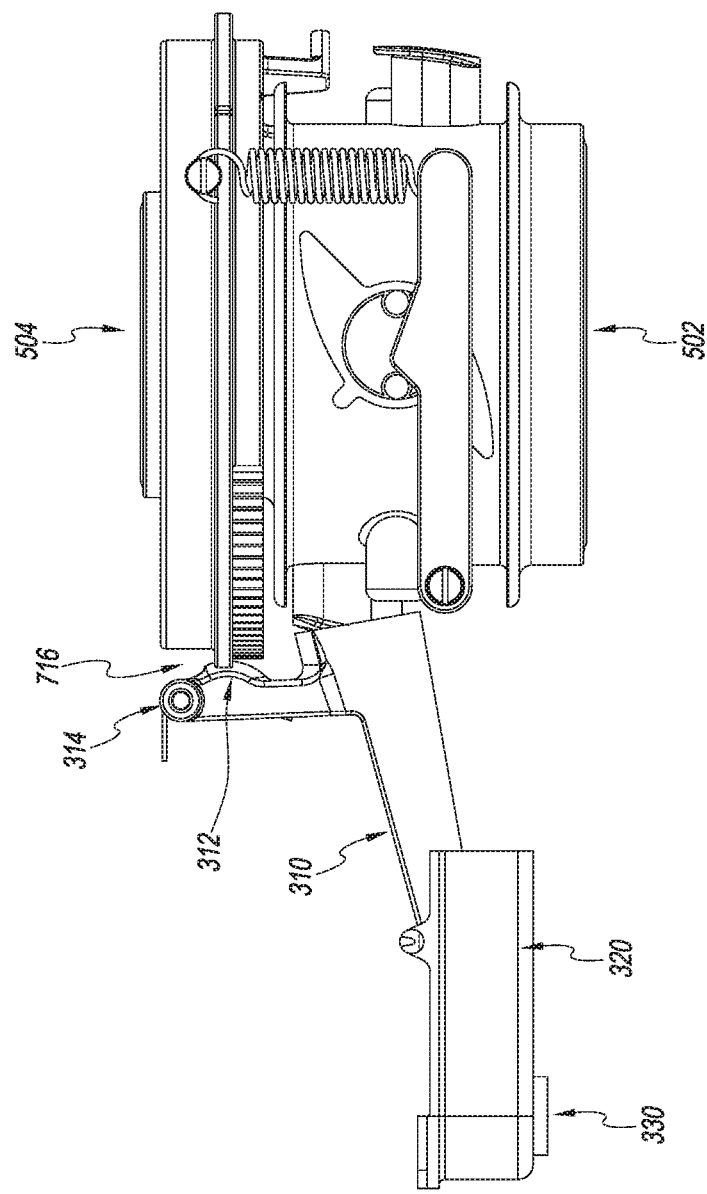

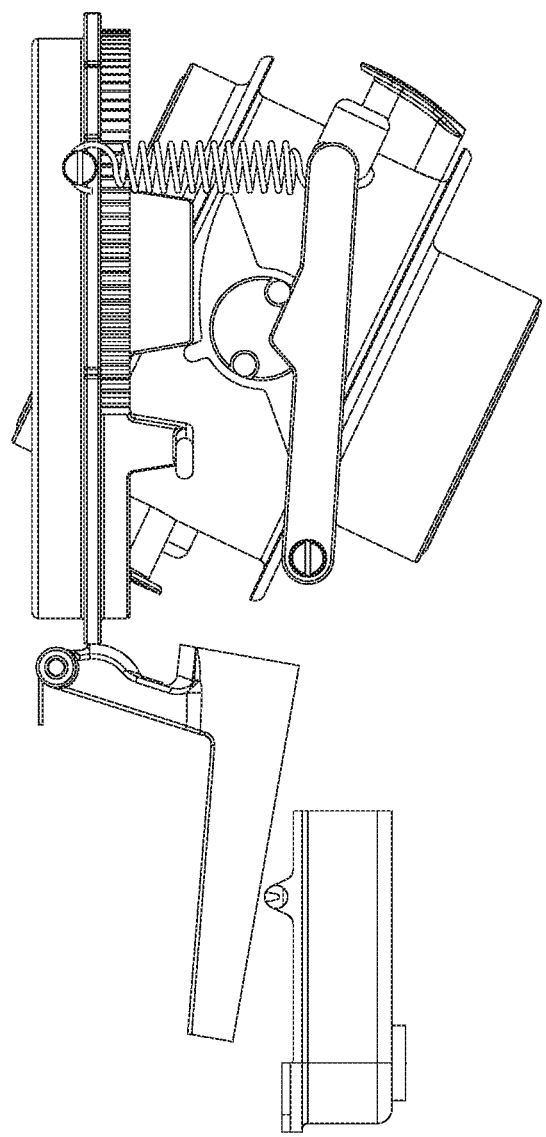

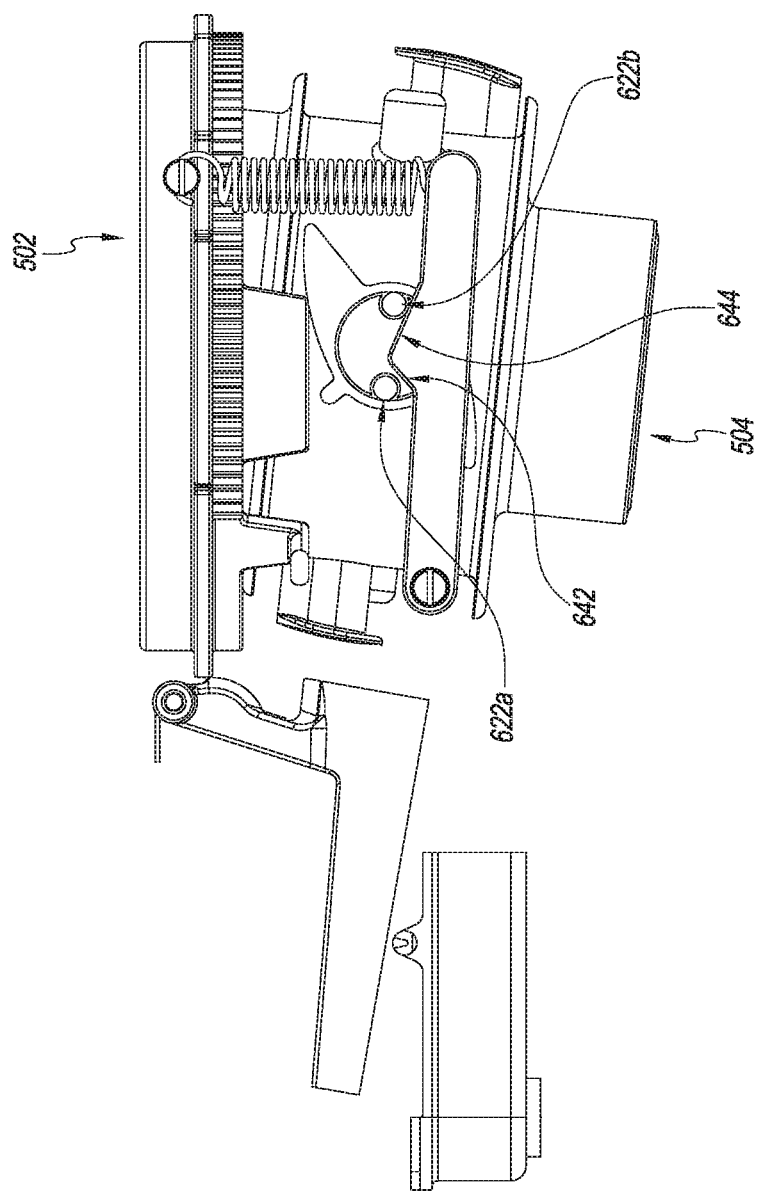

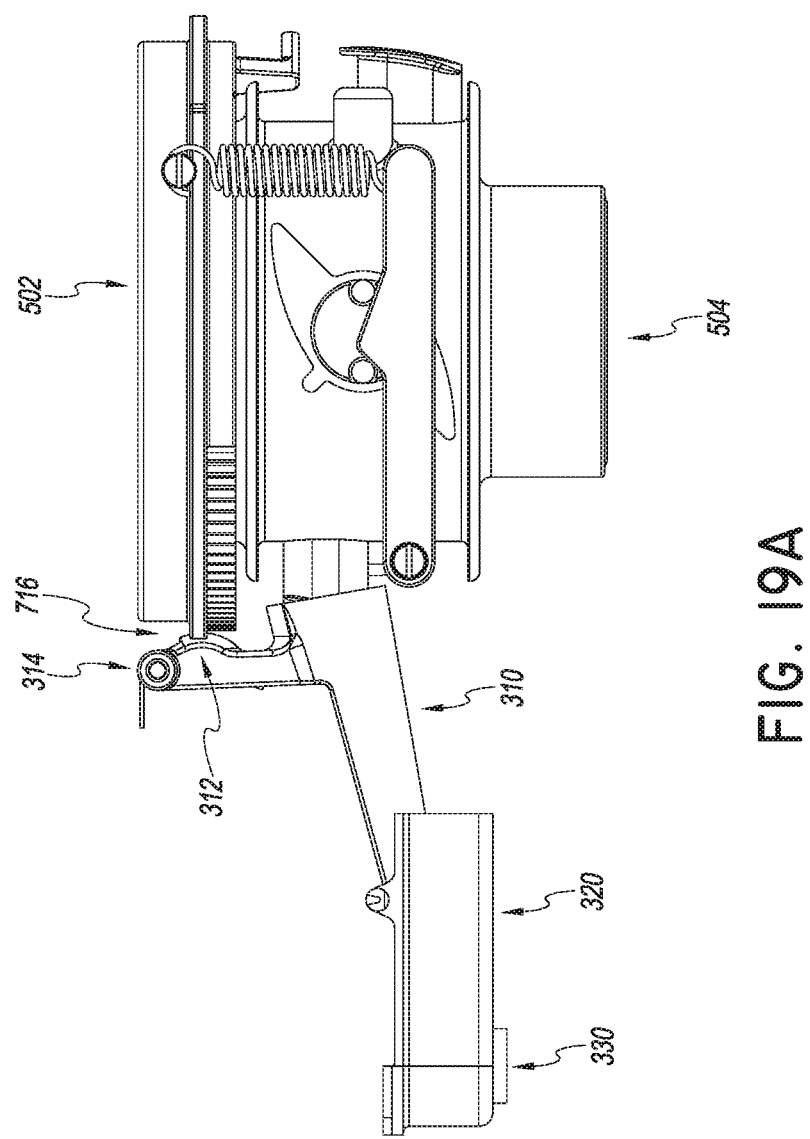

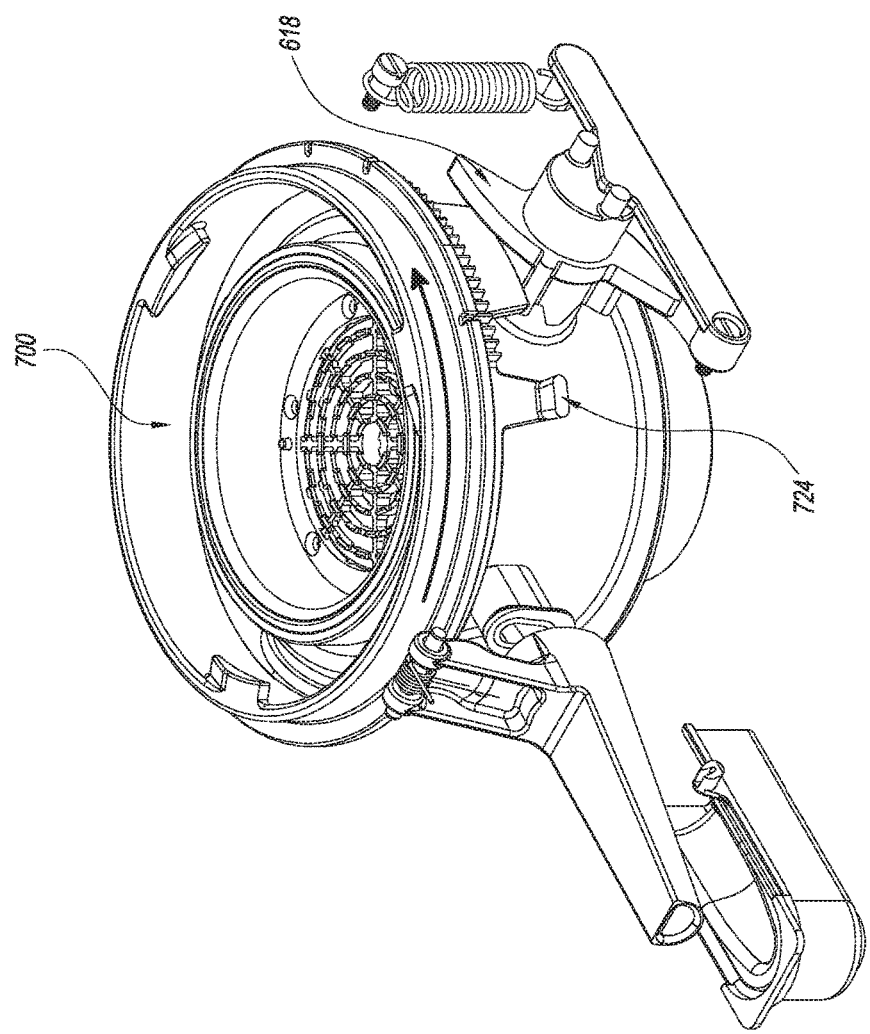

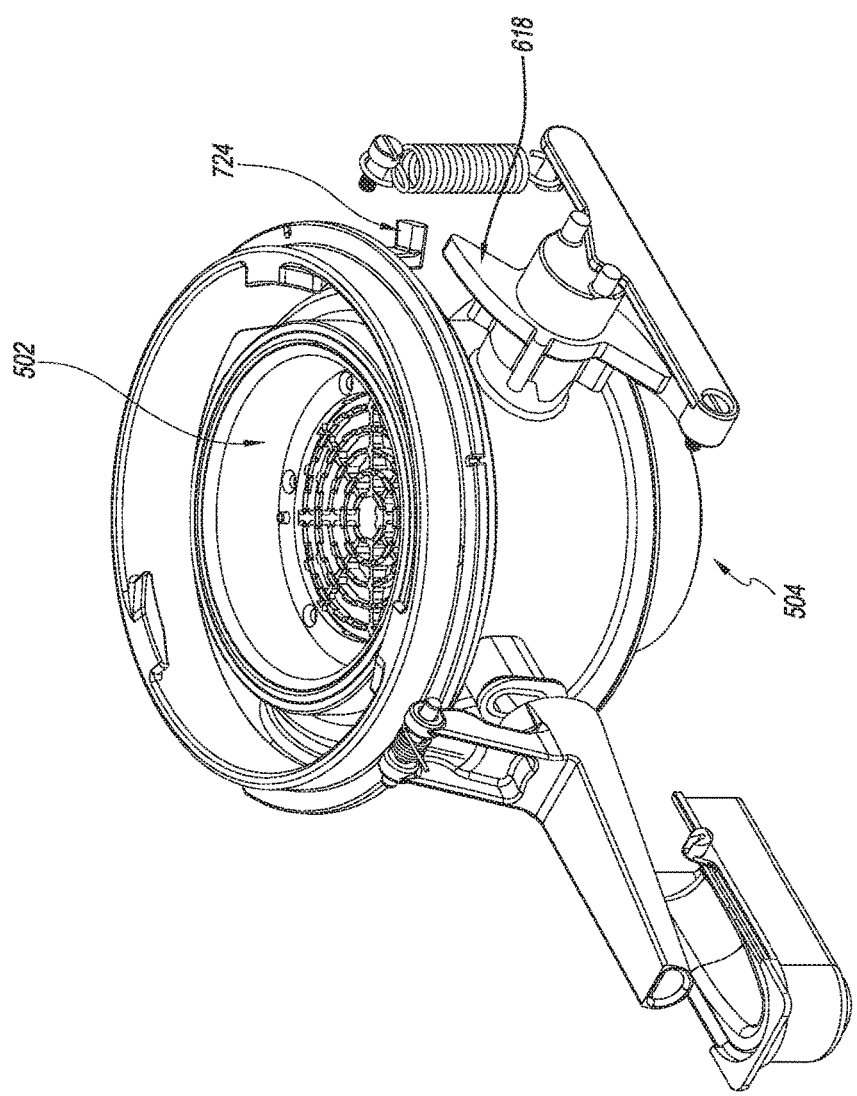

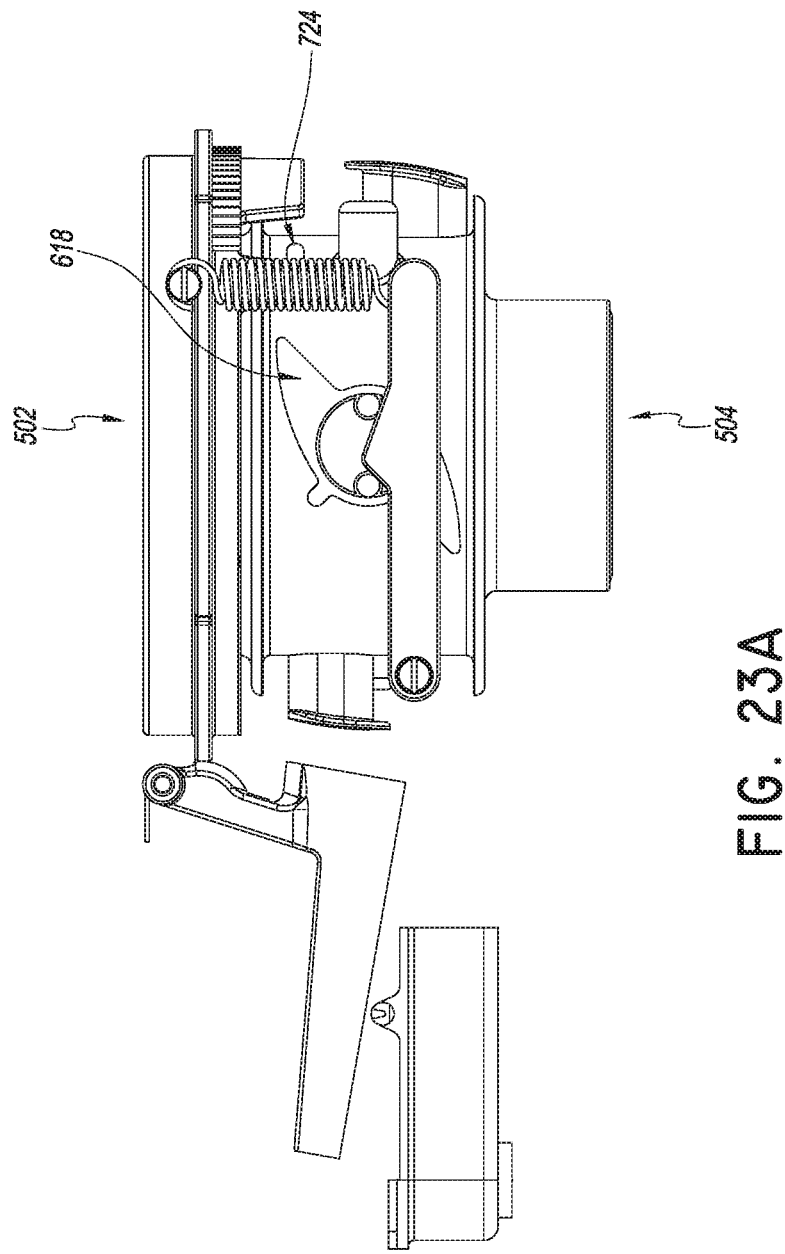

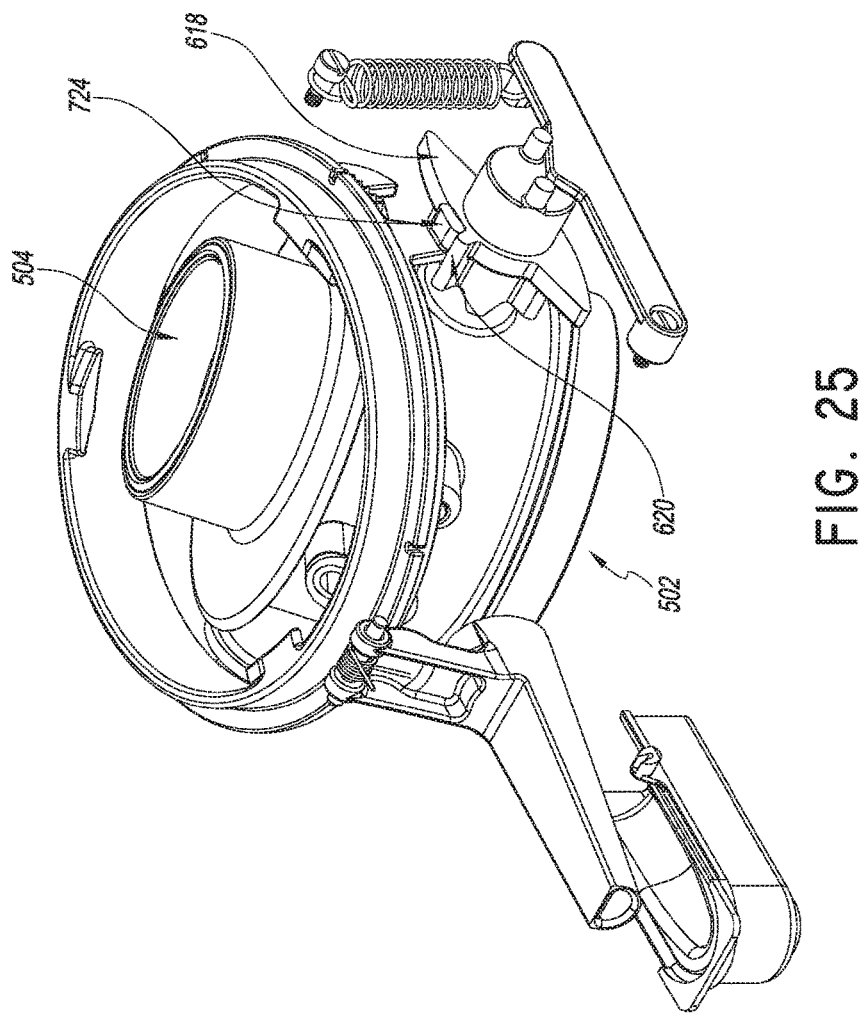

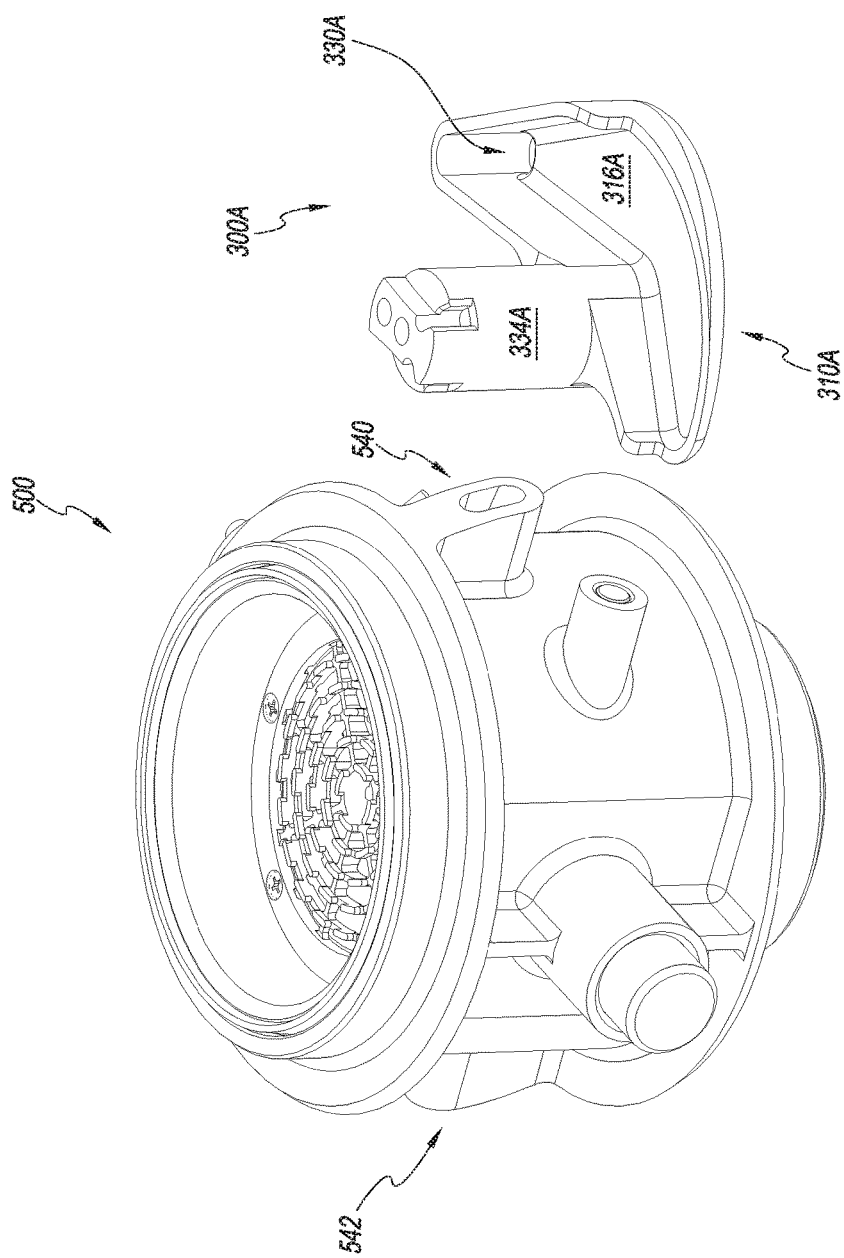

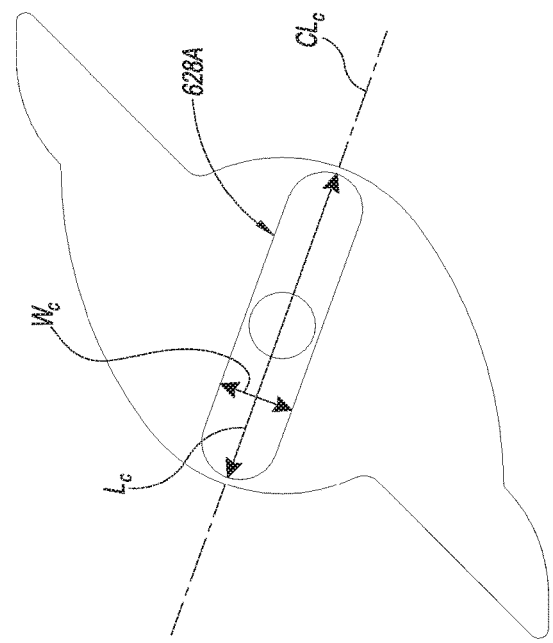
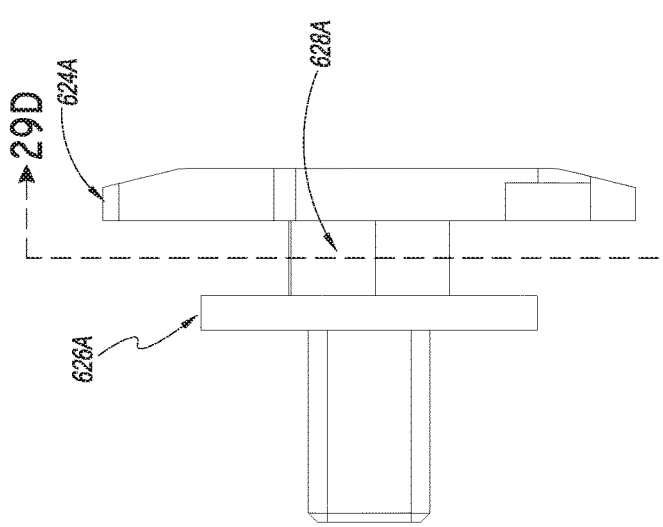

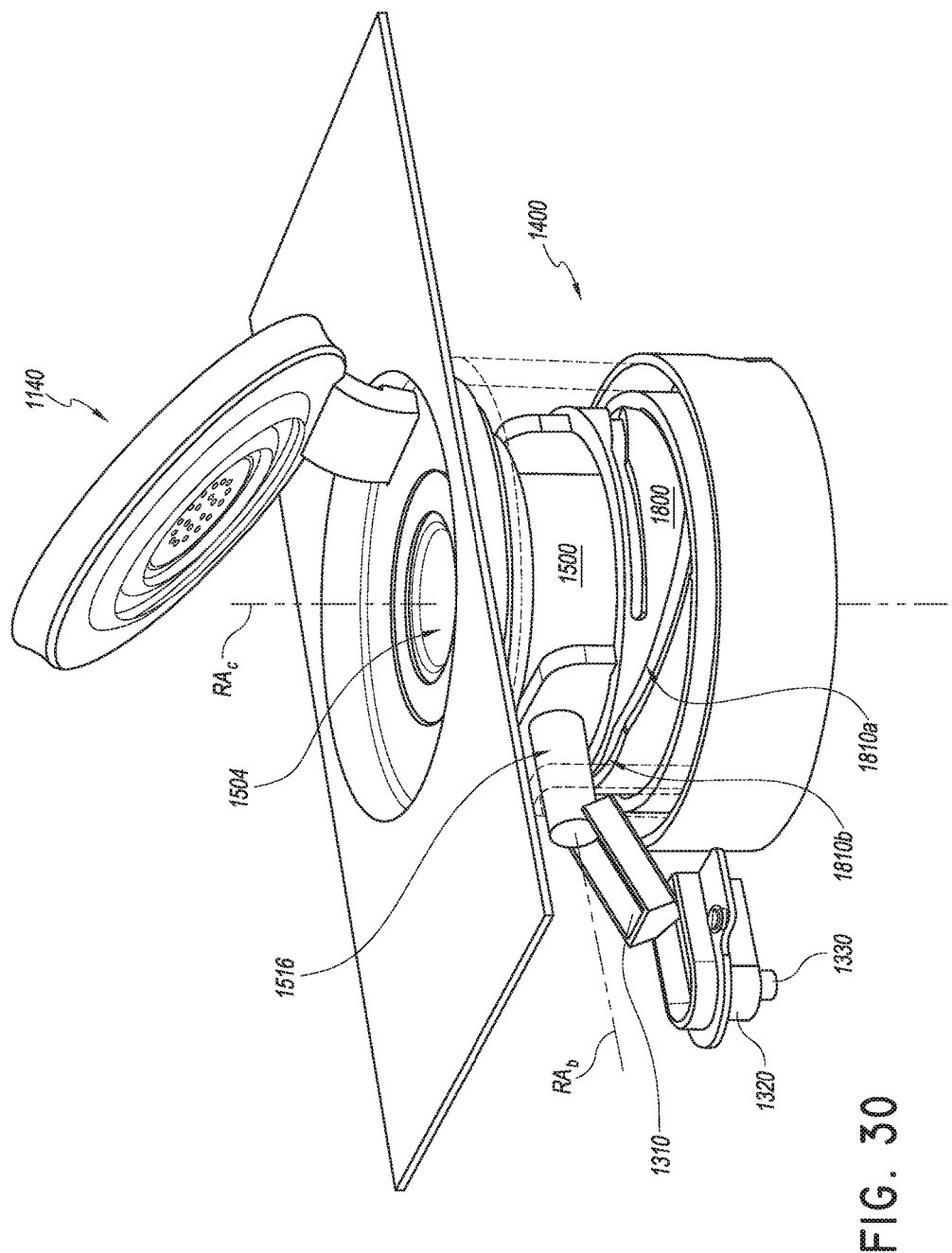

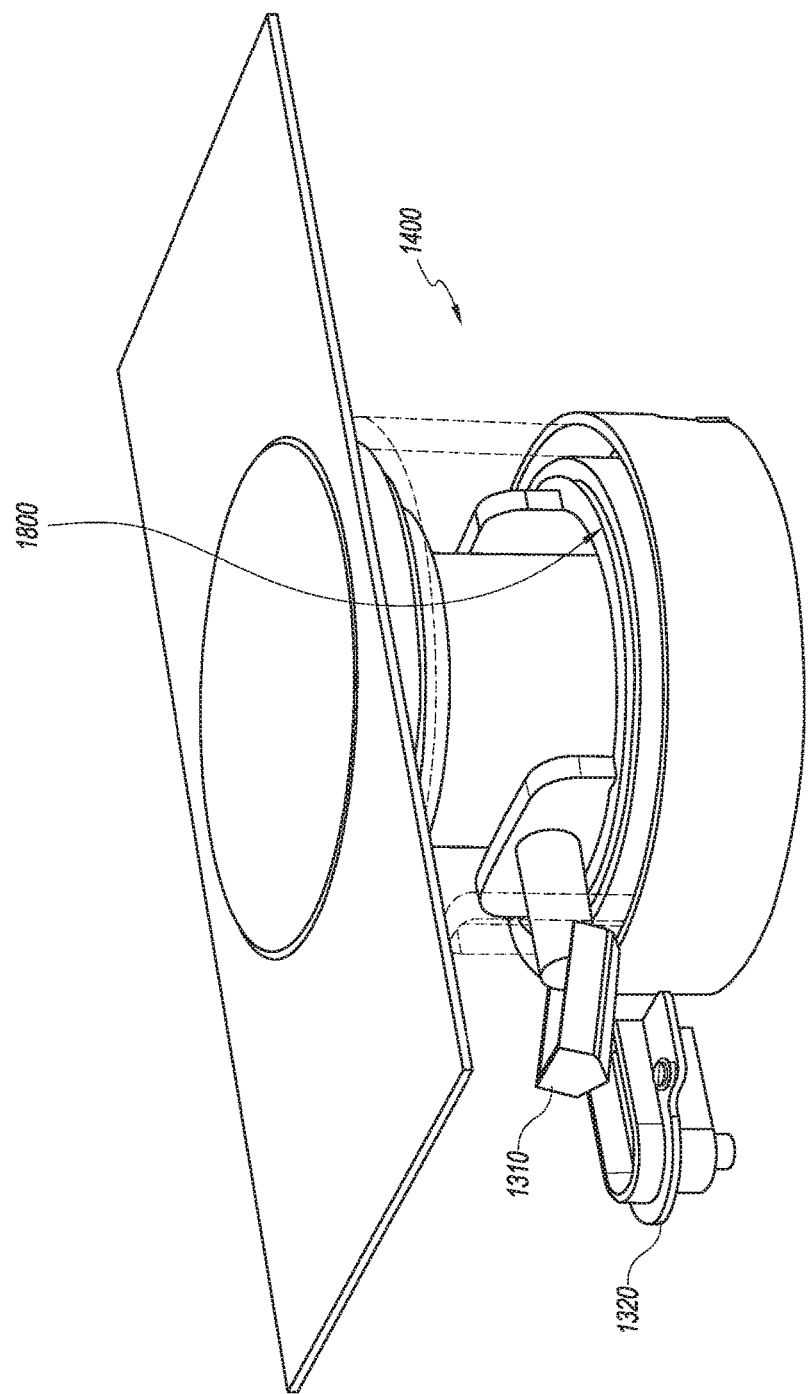

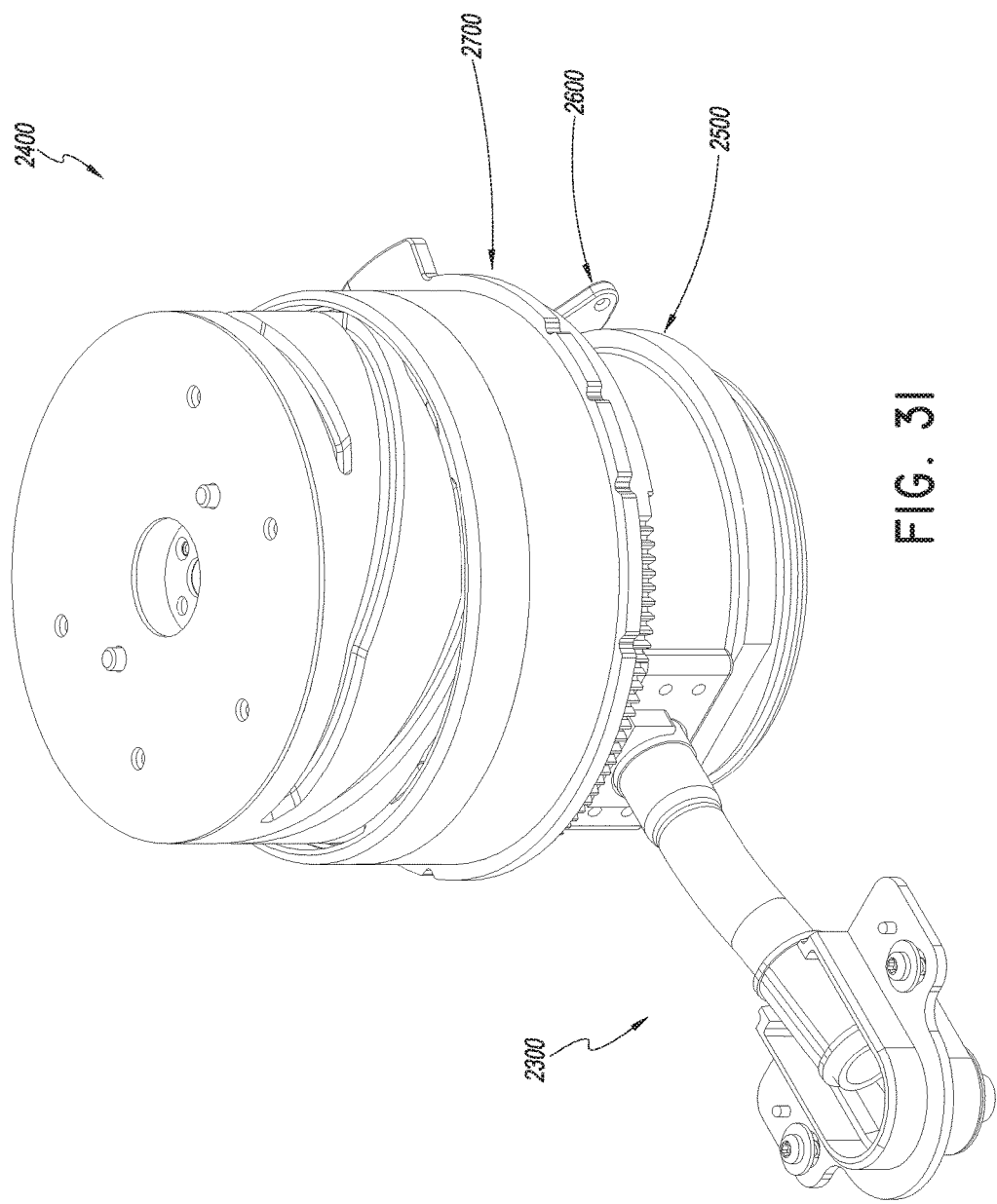

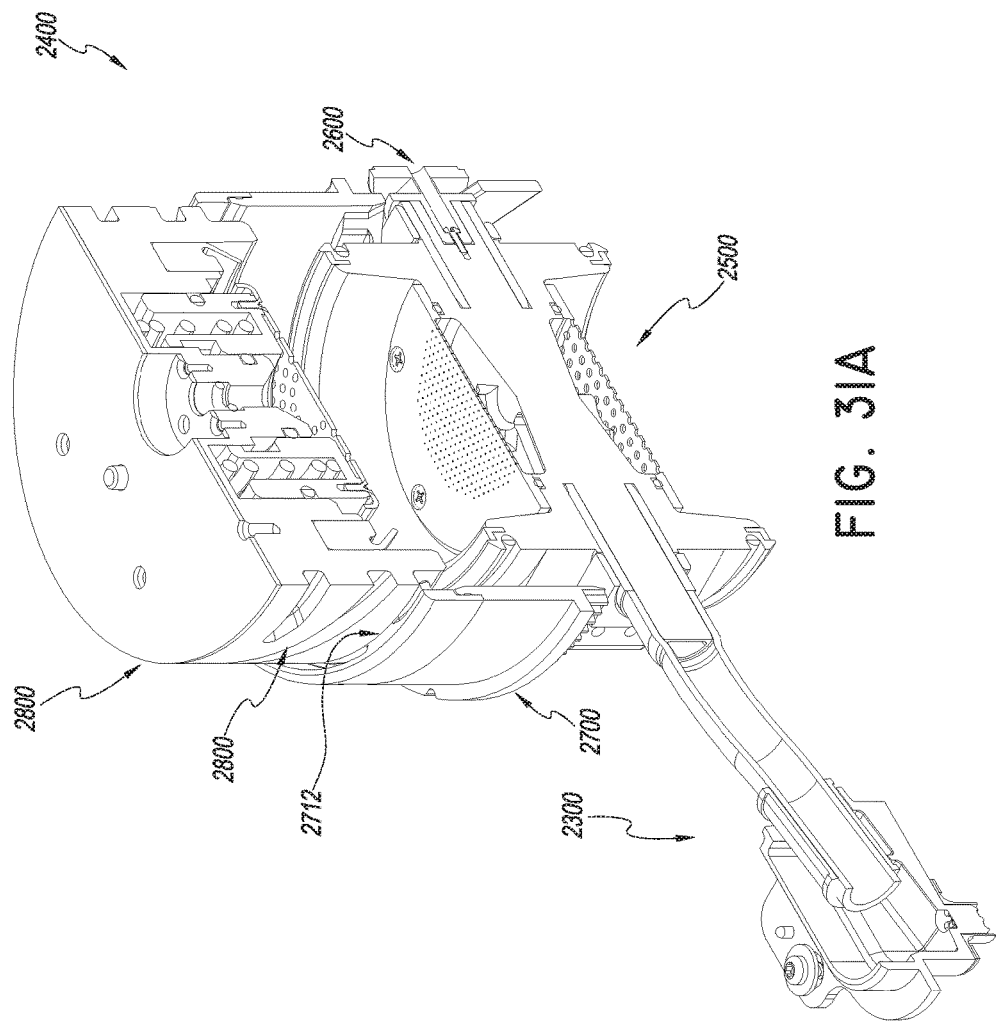

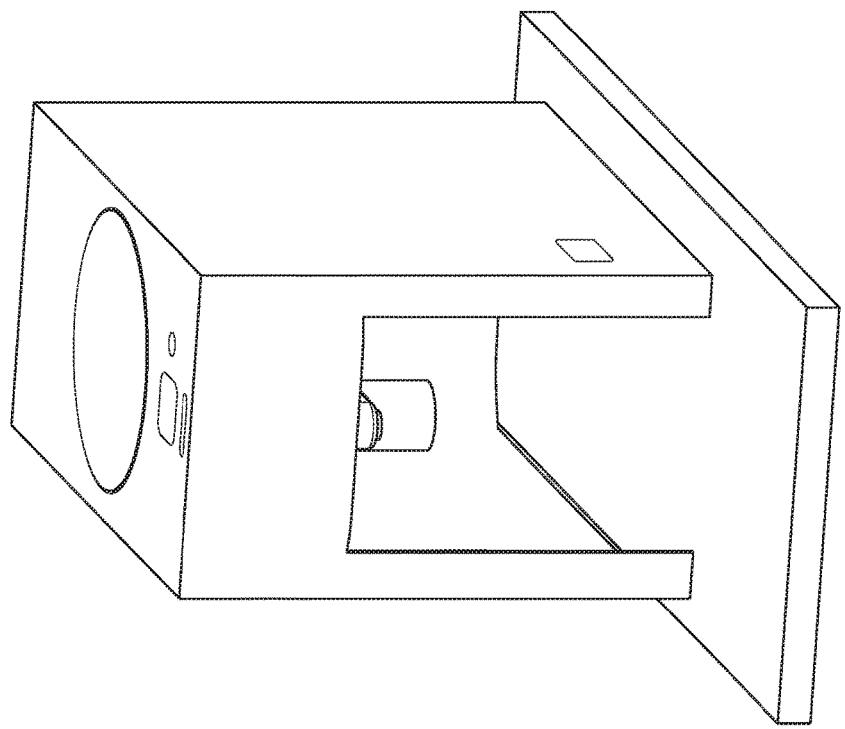
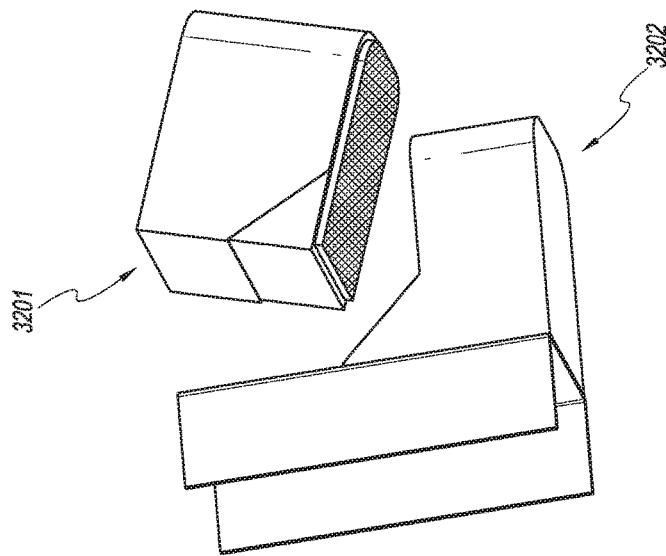
FIG. 32A

BEVERAGE PRODUCTION METHODS WITH MULTI CHAMBERED BASKET UNITS

RELATED APPLICATIONS

This application is a divisional of U.S. application Ser. No. 14/205,256, titled "BEVERAGE PRODUCTION MACHINES WITH MULTI-CHAMBERED BASKET UNITS," filed Mar. 11, 2014, now U.S. Pat. No. 9,439,532. This application is related to at least U.S. application Ser. No. 14/205,198, titled "SINGLE-SERVE BEVERAGE PRODUCTION MACHINE," filed Mar. 11, 2014; U.S. application Ser. No. 14/205,261, titled "CARTRIDGE EJECTION SYSTEMS AND METHODS FOR SINGLE-SERVE BEVERAGE PRODUCTION MACHINES," filed Mar. 11, 2014; U.S. application Ser. No. 14/205,241, titled "BEVERAGE PRODUCTION MACHINES AND METHODS WITH TAMPING ASSEMBLY," filed Mar. 11, 2014; U.S. application Ser. No. 14/205,232, titled "BEVERAGE PRODUCTION MACHINES AND METHODS WITH RESTRICTORS," filed Mar. 11, 2014; and U.S. application Ser. No. 14/205,197, titled "POD-BASED RESTRICTORS AND METHODS," filed Mar. 11, 2014. The entirety of each of the aforementioned applications is hereby incorporated herein by reference.

BACKGROUND

Field

The present disclosure relates to beverage machines, and more specifically to beverage machines that can receive a cartridge, such as a cartridge containing a single serving of an instant beverage component for producing a beverage.

Description of the Related Art

Single-serve beverage machines are devices that are designed to produce a single serving, or sometimes a single cup, of a desired beverage. In comparison to other types of beverage machines (such as drip coffee makers having a multi-cup carafe), single-serve beverage machines can enhance convenience by reducing the time to prepare the beverage.

Some single-serve beverage machines use a cartridge or capsule containing one or more beverage components or precursors to produce the beverage. Generally, such cartridges are received in the single-serve beverage machine, are used to produce the single serving of the beverage, and are subsequently manually removed from the machine and discarded.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 4C illustrates a perspective view of the beverage production assembly of FIG. 3 with the frame hidden and the cartridge removed, the beverage production assembly including a multi-chambered basket unit, a ratchet assembly, and a collar.

FIG. 5A illustrates a bottom rear perspective view of the basket unit of FIG. 4C.

FIGS. 9, 10, 11, and 12 illustrate perspective views of the beverage production assembly of FIG. 4C in various stages of a rotating operation.

FIG. 13A illustrates a side view of the beverage production assembly of FIG. 13.

FIG. 14 illustrates a perspective view of the beverage production assembly of FIG. 4C in a configuration for dispensing the second type of beverage.

FIG. 14A illustrates a side view of the beverage production assembly of FIG. 14.

FIGS. 15A, 16A, 17A, and 18A illustrate side views of the beverage production assembly of FIGS. 15-18, respectively.

FIG. 19A illustrates a side view of the beverage production assembly of FIG. 19.

FIGS. 20, 21, 22, and 23 illustrate perspective views of the beverage production assembly of FIG. 4C in various stages of a reset operation.

FIGS. 20A, 21A, 22A, and 23A illustrate side views of the beverage production assembly of FIGS. 20-23, respectively.

FIGS. 24, 25, 26, and 27 illustrate perspective views of the beverage production assembly of FIG. 4C in various stages of another reset operation.

FIGS. 28 and 28A illustrate perspective views of an alternative dispensing assembly.

FIGS. 29, 29A, 29B, 29C, and 29D illustrate various views of an alternative ratchet assembly and of a ratchet member thereof.

FIGS. 30, 30A, 30B, and 30C illustrate partial perspective views of another embodiment of a beverage production assembly.

FIGS. 31, 31A, and 31B illustrate various views of another embodiment of a beverage production assembly.

FIGS. 32 and 32A illustrate perspective views of an embodiment of a waste bin unit.

DETAILED DESCRIPTION OF CERTAIN EMBODIMENTS

Figure 1:
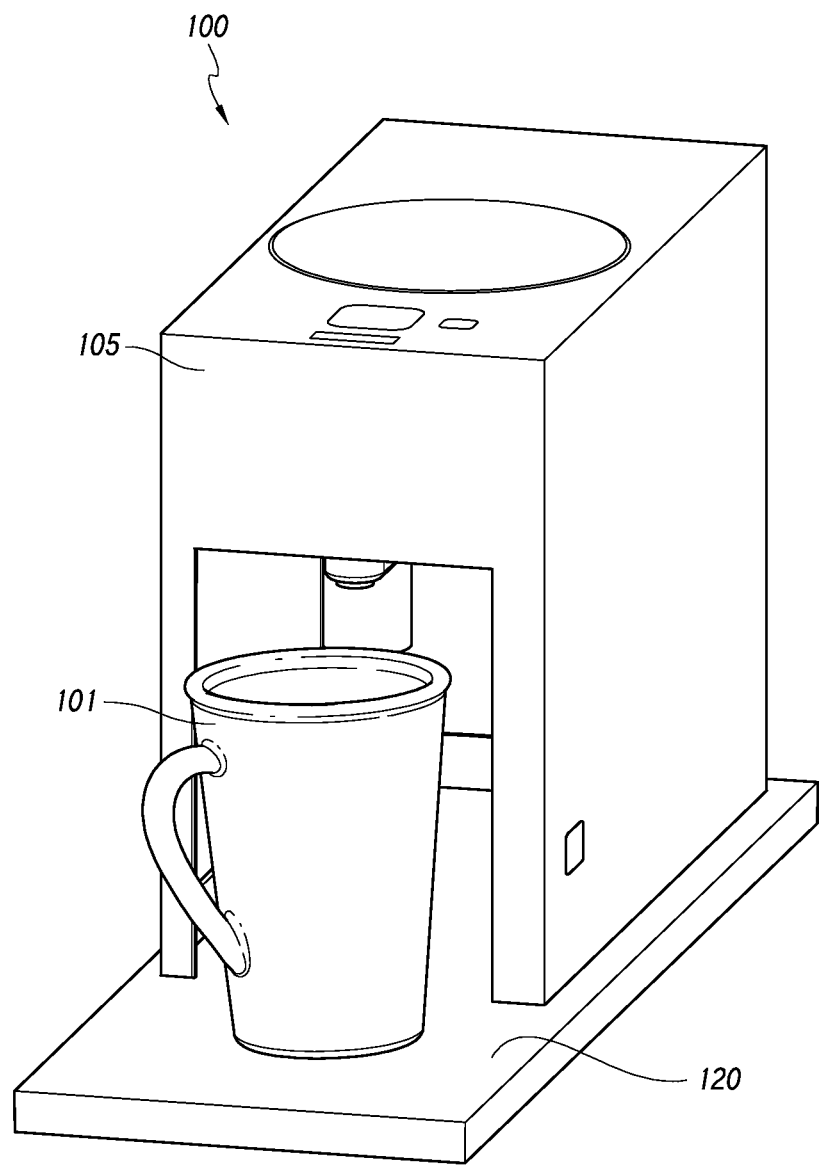
FIG. 1 illustrates an embodiment of a beverage production machine including a main housing.

Various beverage preparation machines having multi-chamber basket units are described below to illustrate various examples that may be employed to achieve one or more desired improvements. These examples are only illustrative and not intended in any way to restrict the general disclosure presented and the various aspects and features of the disclosure. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein. Certain aspects, advantages, and features of the inventions have been described herein. It is not necessary that any or all such aspects, advantages, and features are achieved in accordance with any particular embodiment. Some embodiments may not achieve the advantages described herein, but may achieve different advantages instead. Any structure, feature, or step in one example is contemplated to be used in place of or in addition to any structure, feature, or step of any other example. No features, structure, or step disclosed herein is essential or indispensable.

Certain single-serve beverage machines can accept only a single type of cartridge. For example, some such machines can use only cartridges having a certain configuration (e.g., diameter, height, shape, etc.). This can be problematic because variations in the cartridge configuration can be beneficial. Indeed, in some instances, one cartridge configuration may be suitable for preparing some beverages and another cartridge configuration may be suitable for preparing other beverages. For example, it can be beneficial to prepare brewed drinks using different cartridge configurations, which are useful for different brewing conditions (e.g., different temperatures and/or pressures). For example, brewed coffee drinks and espresso coffee drinks can be produced using different cartridge configurations (e.g., the espresso cartridge having a diameter that is less than a diameter of the brewed coffee cartridge, a height that is greater than the brewed coffee cartridge, and/or being adapted to withstand higher pressures than the brewed coffee cartridge).

Accordingly, some aspects of the present disclosure describe beverage preparation machines include a basket unit that is configured to accept multiple cartridge configurations. For example, some embodiments are configured to receive a first cartridge configuration in a first chamber of the basket unit and a second configuration in a second chamber of the basket unit. In some variants, the first chamber has a shape that substantially corresponds to the shape of the first cartridge and the second chamber has a shape that substantially corresponds to the shape of the second cartridge. In certain embodiments, the first cartridge configuration is for preparing brewed coffee beverages and the second cartridge configuration is for preparing espresso coffee beverages. In some implementations, the first cartridge configuration is for preparing beverages at a first pressure and the second cartridge configuration is for preparing beverages at a second pressure (e.g., greater than the first pressure).

In various embodiments, the first and second chambers are selectively accessible. This can facilitate loading the cartridges into the appropriate chamber (e.g., loading the first cartridge configuration into the first chamber and the second cartridge configuration into the second chamber). In several embodiments, the basket unit can be moved so that the first and second chambers can be selectively presented to and/or accessed by a user. For example, the basket unit can be rotated relative to a frame of the beverage machine so that the first or second chambers are selectively oriented generally upwardly and/or near a top portion of the beverage preparation machine, which can facilitate loading of a cartridge into the first or second chambers. In some embodiments, rotation of the basket unit is driven by a movable (e.g., rotatable) collar, which in turn can be driven by a motor and/or gear train.

In accordance with some embodiments, a machine for preparing beverages from cartridges includes a frame, a basket unit, and a rotatable collar. The basket unit can rotate in the frame. The basket unit can include a first chamber, which can receive a first single-serve cartridge configuration, and a second chamber, which can receive a second cartridge configuration. The second cartridge configuration can be the same or different from the first cartridge configuration. In some variants, when one of the chambers is in a loading position, the other of the chambers is in a non-loading (e.g., inverted) position. The ratchet assembly can have a ratchet member, a ratchet follower, and a biasing member (e.g., a spring). The ratchet member can be engaged with (e.g., abut against) the basket unit. The ratchet member can have an arm and a boss. The ratchet follower can be pivotally connected with the frame and can include a ramp. The biasing member can bias the ramp of the ratchet follower against the boss of the ratchet member. The rotatable collar can have a projection. In certain implementations, during rotation of the collar, the projection engages with the arm of the ratchet member, which slides the boss of the ratchet member along the ramp of the ratchet follower and/or rotates the basket unit. This can result in the chamber in the loading position being moved to the non-loading (e.g., inverted) position and the chamber in the non-loading position being moved to the loading position.

Certain variants of the machine include any one, or any combination, of any of the following. The first chamber can have a volume that is greater than a volume of the second chamber. The basket unit and the collar can be adapted to rotate about axes that are substantially perpendicular. The first chamber can receive cartridges for brewed coffee beverages and the second chamber can receive cartridges for espresso beverages.

In some implementations, a machine for preparing a beverage from a cartridge includes a basket unit, a ratchet assembly connected with the basket unit, and a collar. The basket unit can have a first chamber for receiving a first single-serve cartridge configuration and a second chamber for receiving a second cartridge configuration. The basket unit can rotate about an axis $RA_b$ between a first chamber loading position and a second chamber loading position. In certain embodiments, in the first chamber loading position, the first chamber is positioned to facilitate loading the first cartridge and the second chamber is inverted. In some embodiments, in the second chamber loading position, the second chamber positioned to facilitate loading the second cartridge and the first chamber is inverted. The collar can rotate about an axis $RA_c$. In some variants, rotation of the collar engages the collar with the ratchet assembly, which causes the basket unit to rotate between the first chamber loading position and the second chamber loading position.

Certain variants of the machine include any one, or any combination, of any of the following. The axes $RA_b$ and $RA_c$ can be substantially perpendicular. The axis $RA_c$ can be substantially vertical, and the axis $RA_b$ can be substantially horizontal and pass through first and second sidewalls of the machine. The first chamber loading position can be such that the first chamber is generally upwardly oriented, and the second chamber loading position can be such that the second chamber is generally upwardly oriented. The collar can have a projection. The ratchet assembly can include an arm. The projection can engage the arm. The collar can have a wing. The ratchet assembly can have a rib. The wing can engage the rib. In some implementations, during normal operation of the machine (e.g., preparing one or more single-serve beverages from one or more cartridges), the collar is rotatable in the clockwise and counterclockwise directions. The basket unit can have a first outlet in fluid communication with the first chamber and a second outlet in fluid communication with the second chamber. Certain embodiments include a dispensing assembly that can move (e.g., rotate) into and out of engagement with one of the first and second outlets. In some variants, the dispensing assembly and one of the first and second chambers is in fluid communication during the engagement of the dispensing assembly and the one of the first and second outlets. In some variants of the machine, the first chamber can receive cartridges for brewed coffee beverages and the second chamber can receive cartridges for espresso beverages. Certain implementations include one or more of the cartridges.

In some embodiments, a machine for preparing a beverage from a cartridge has a frame, a basket unit, a ratchet assembly, and a rotatable collar. The basket unit can be rotatable in the frame. The basket unit can have a first chamber for receiving a first single-serve cartridge configuration and a second chamber for receiving a second single-serve cartridge configuration. The basket unit can rotate between a first position (e.g., in which the first chamber is oriented upwardly) and a second position (e.g., in which the second chamber is oriented upwardly). In some embodiments, the ratchet assembly is connected (e.g., directly or indirectly) with the basket unit. The rotatable collar can engage the ratchet assembly. In various embodiments, rotation of the collar in a first direction engages the collar with a first surface of the ratchet assembly. The first surface can be adapted (e.g., shaped and/or angled) such that the collar slides along the first surface without rotating the basket unit from the first position to the second position. In some embodiments, rotation of the collar in a second direction engages the collar with a second surface of the ratchet assembly. The second surface can be adapted such that the engagement with the collar rotates the ratchet assembly, which can cause the basket unit to rotate from the first position to the second position.

Some embodiments of the machine include any one, or any combination, of any of the following. The basket unit can rotate less than about 45° when the collar rotates in the first direction. The basket unit can rotate at least about 180° when the collar rotates in the second direction. The collar can have a projection. The ratchet assembly can have an arm. The projection can engage the arm during the rotation of the collar. The first chamber can receive cartridges for brewed coffee beverages and the second chamber can receive cartridges for espresso beverages. In some variants, the basket unit and the collar are adapted to rotate about axes that are substantially perpendicular.

According to certain implementations, a method of preparing an individual serving of a beverage includes rotating a basket unit to a first configuration (e.g., in which a first chamber of the basket unit is located in a loading position). The method can include receiving a cartridge in the first chamber. Some variants of the method include introducing liquid into the cartridge in the first chamber to prepare the individual serving of the beverage. The method can include dispensing the individual serving of the beverage into a vessel. Some embodiments of the method include rotating the basket unit to a second configuration in which a second chamber of the basket unit is located in the loading position.

Certain embodiments of the method include any one, or any combination, of any of the following. Some variants include ejecting the cartridge during rotation of the basket unit to the second configuration. For example, the cartridge can be ejected into a waste bin. The method can include rinsing at least one of an interior surface of the first chamber and a seal surface of the first chamber. The method can include disposing of residual beverage fluid in the first chamber into the waste bin. In some embodiments, the method includes compressing the cartridge in the first chamber with a tamp assembly. Certain implementations of the method include rotating a collar in a first direction. Some embodiments include engaging the collar with a first surface of a ratchet assembly that is connected with the basket unit, which can result in rotation of the basket unit between the first and second configurations. Some embodiments include rotating the collar in a second direction. Some embodiments include sliding the collar along a second surface of the ratchet assembly, thereby not rotating the basket unit between the first and second configurations. In certain implementations of the method, the collar rotates about an axis of rotation that is substantially perpendicular to an axis of rotation of the basket unit.

In some embodiments, a machine for preparing beverages from cartridges has a basket unit and a rotation mechanism. The basket unit can have a first chamber for receiving a first single-serve cartridge configuration and a second chamber for receiving a second cartridge configuration. The basket unit can rotate within the machine between a first configuration and a second configuration. In certain variants, in the first configuration, the first chamber is oriented in an upward direction and the second chamber is oriented in a downward direction. In certain variants, in the second configuration, the second chamber is oriented in the upward direction and the first chamber is orientated in the downward direction. The rotation mechanism can be coupled to the basket unit. The rotation mechanism can be adapted to rotate the basket unit from the first configuration to the second configuration.

According to some embodiments, the machine can include any one, or any combination, of any of the following. Certain embodiments include a motor coupled with the rotation mechanism. In some embodiments, after insertion of a first single-serve cartridge into the first chamber, the rotation mechanism rotates the basket unit at least about 5 degrees in a clockwise direction and at least about 5 degrees in a counterclockwise direction. This can facilitate settling of the contents of the first single-serve cartridge. Some variants have a sensor for determining whether the basket unit is in the first configuration or the second configuration. Some embodiments include a controller that can receive an input from a user, such as a command to begin operation.

I. Overview

FIG. 1 illustrates a perspective view of an embodiment of a beverage preparation machine 100 that is configured to dispense a beverage into a cup 101 or other vessel. The beverage preparation machine 100 can include one or more of a main housing 105, liquid reservoir, and frother unit. In some embodiments, one or more of the components of the beverage preparation machine 100 are housed on and/or partially in a tray 120.

The liquid reservoir can be located within or external to the housing 105. The liquid reservoir can be in fluid communication (e.g., via tubing or pipes) with the main housing 105 to provide liquid (e.g., water) stored within the liquid reservoir to a chamber within the main housing 105 where the beverage is prepared. In various embodiments, the liquid is pre-heated before entering the chamber. For example, the liquid may be heated within a separate storage reservoir or within fluid supply lines as the liquid travels to the chamber. The amount of liquid (e.g., water) provided to the chamber from the liquid reservoir may be determined by the beverage recipe. The liquid reservoir may include a water level sensor configured to determine whether enough liquid is present in the liquid reservoir to prepare a requested beverage. The frother unit can cause the beverage to be dispensed with a froth of bubbles (e.g., a frothed milk). After dispensing a brewed beverage into the cup 101, the frothed liquid (e.g., frothed milk) can be poured into the beverage. The frother unit may include a control input to toggle the frothing on and off.

Figure 2:
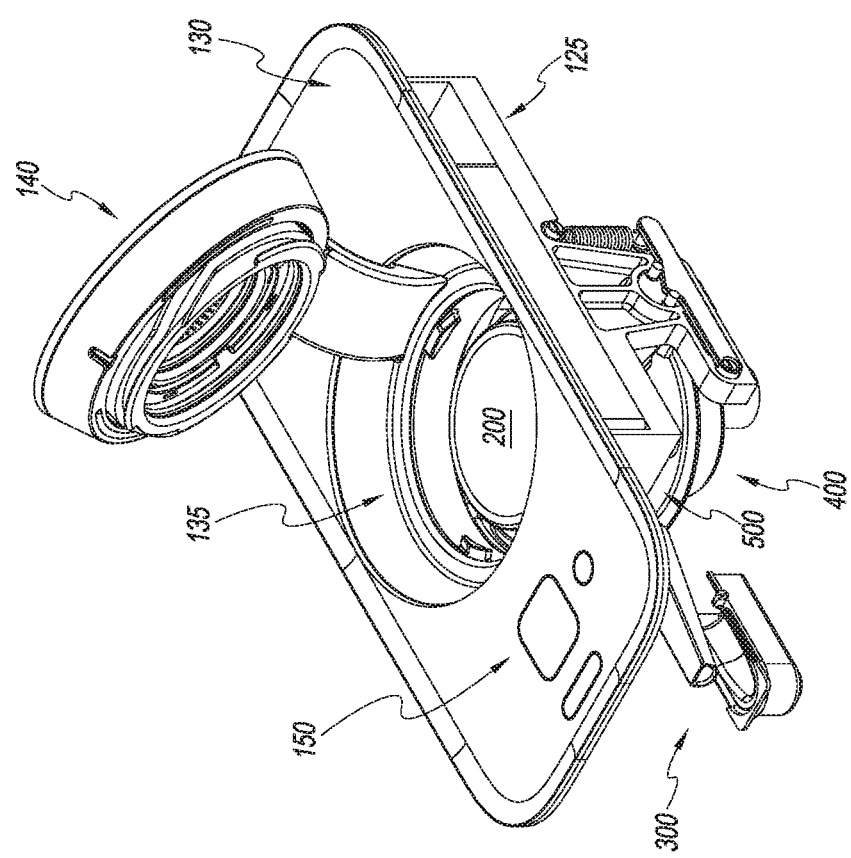
FIG. 2 illustrates a perspective view of an upper portion of the beverage production machine of FIG. 1, with a lid in an open position and a cartridge received in the main housing.
Figure 3:
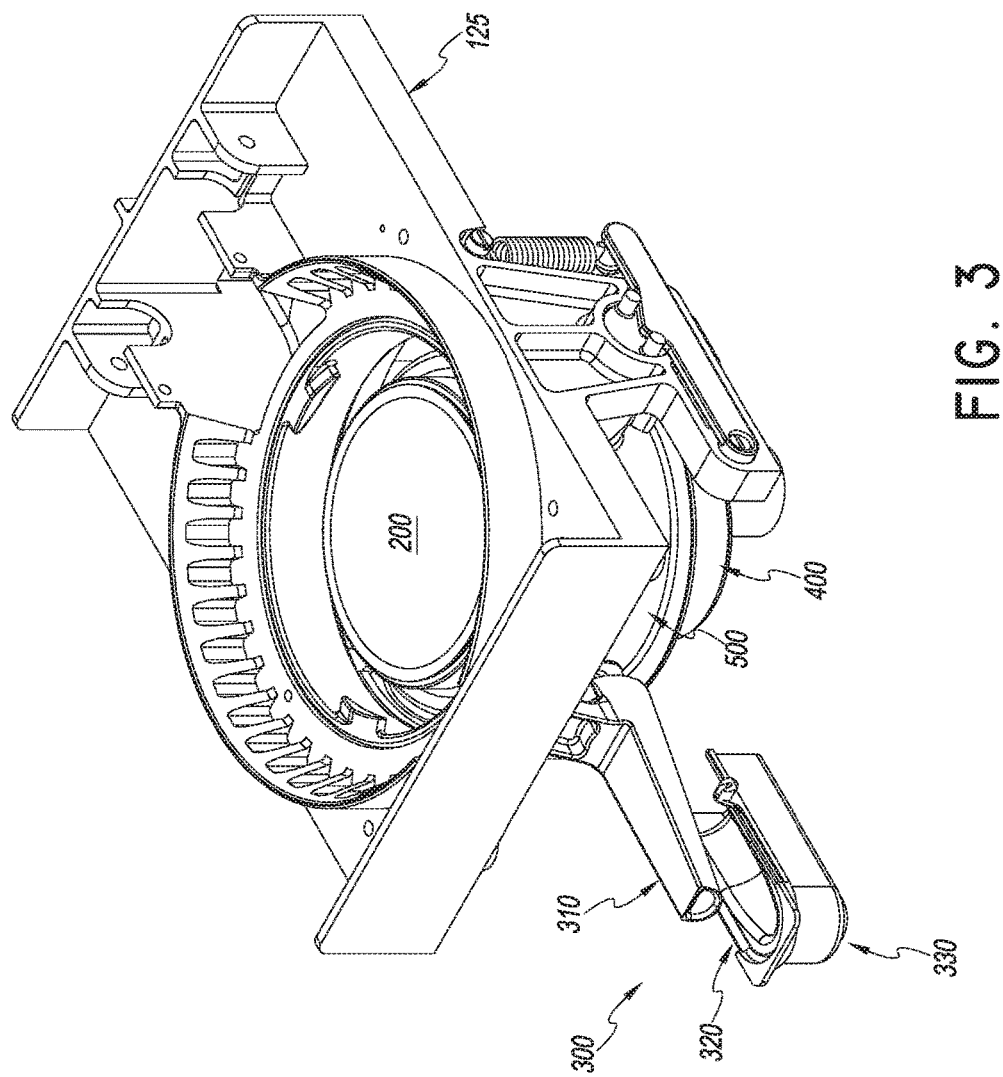
FIG. 3 illustrates a perspective view of a portion of the upper portion of the beverage production machine shown in FIG. 2, with certain features hidden to show a beverage production assembly and a frame.

As shown in FIGS. 2 and 3, the main housing 105 can include a frame 125 that supports a beverage production assembly 400 having a multi-chambered basket unit 500. As also shown, an upper portion of the main housing 105 can include a top 130 with an opening 135 to facilitate the loading of a single-serve beverage cartridge 200 (e.g., a single-serve cartridge with a porous upper and/or lower surface) into the basket unit 500. The opening 135 can be selectively opened and closed with a lid assembly 140. Additional details regarding single-serve beverage cartridges and the lid assembly 140 are disclosed in U.S. Application No. 61/786,072, filed Mar. 14, 2013, and U.S. application Ser. No. 14/191,225, filed Feb. 26, 2014, the entirety of each of which is hereby incorporated by reference.

In some embodiments, a single-serve beverage cartridge includes a cartridge body holding a beverage precursor. The cartridge body may comprise any suitable material, including but not limited to, plastic, metal, wood, bio-degradable polymers, etc. The cartridge body may be reusable, recyclable, biodegradable, compostable, commercially compostable, etc. The beverage precursor may comprise, for example, coffee grounds, tea leaves, powdered milk, milk, juice, tea, coffee, green coffee, green coffee extract, coffee extract, flavorings, other beverage materials, etc.

In various embodiments, the main housing 105 includes an input and output unit 150. For example, the input and output unit 150 can include an indicator (e.g., a light, display, dial, or otherwise) to indicate status information, such as whether the main housing 105 has power, is operating, requires maintenance, etc. The input and output unit 150 can include a user-interface member (e.g., a button or switch) to provide instruction to the main housing 105, such as a command to begin the beverage production process. The input and output unit 150 can be connected with a memory and/or a controller, such as a microprocessor.

In some variants, the input and output unit 150 includes a reader. The reader can be configured to read a code (e.g., optical code, one dimensional bar code, two dimensional bar code, etc.) and/or a tag (e.g., a radio frequency identification (RFID) tag or near field communication (NFC) tag) on the cartridge or associated packaging. This can allow the machine 100 to identify the type of beverage to be produced. For example, reading a cartridge containing espresso coffee ingredients (e.g., grounds) can identify to the machine 100 that an espresso beverage is to be produced. In several implementations, the beverage production assembly 400 is adjusted based on the type of beverage to be produced, as is discussed in more detail below. Additional details regarding the reader, as well as associated functions, are disclosed in U.S. application Ser. No. 14/205,198, titled "SINGLE-SERVE BEVERAGE PRODUCTION MACHINE," filed Mar. 11, 2014; the entirety of that application is hereby incorporated by reference.

In some implementations, when the cartridge 200 has been loaded into the basket unit 500 and the lid assembly 140 has been closed, a beverage preparation process can begin. In some embodiments of the beverage preparation process, liquid (e.g., hot water) is introduced into the cartridge 200 to produce a beverage, such as by a discharge head in the lid assembly 140. The beverage can exit the cartridge 200 and be conveyed to the cup 101 through portions of the main housing 105, such as via a dispensing assembly 300.

Figure 4:
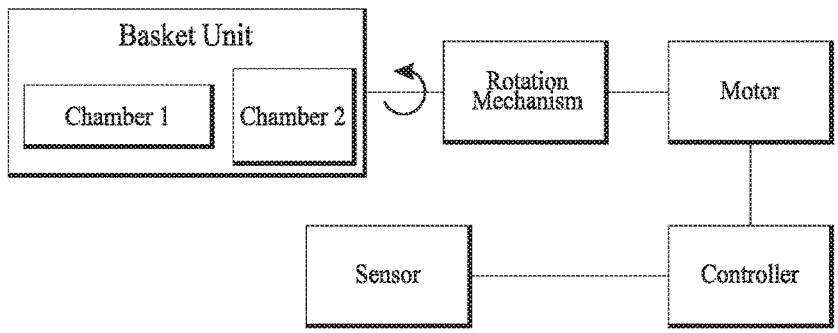
FIGS. 4, 4A, and 4B schematically illustrate certain embodiments of a beverage production assembly.

FIG. 4 schematically illustrates certain embodiments of the beverage production assembly 400. As shown, the beverage production assembly 400 can include the basket unit 500. The basket unit 500 can be configured to receiving at least two different types of cartridges, such as a first type in a first chamber and a second type in a second chamber. The basket unit 500 can be rotated, such as by a rotation mechanism that is coupled with a motor. In several embodiments, the rotation of the basket unit 500 facilitates loading of a cartridge into, and/or ejection of a cartridge from, the basket unit 500. In some implementations, the rotation of the basket unit 500 is controlled by a controller, which can be configured to operate (e.g., energize and de-energize) the motor. The controller can receive a signal from one or more sensors, such as sensors adapted to detect signs indicative of a position of the basket unit 500, rotation mechanism, or other components.

Figure 4A:
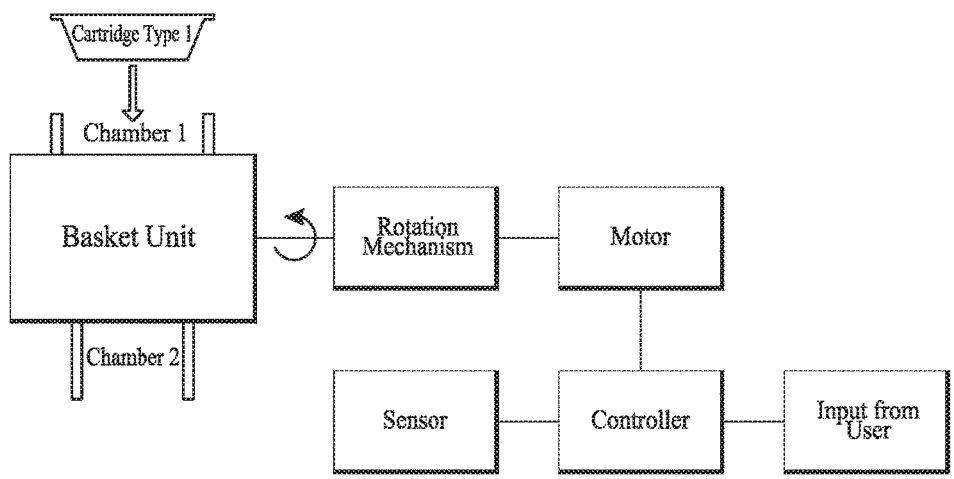
Figure 4B:
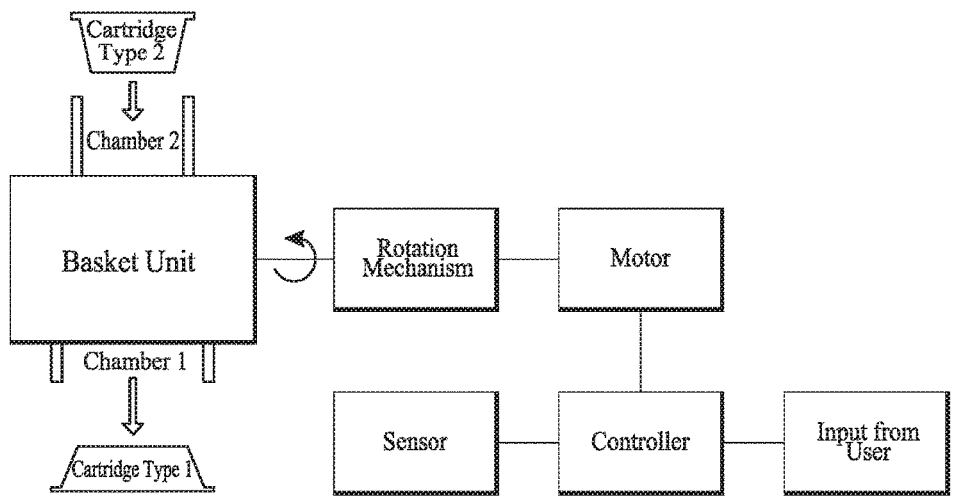

Further schematic embodiments of the beverage production assembly 400 are illustrated in FIGS. 4A and 4B. In a mode, the basket unit 500 can be positioned to receive a first cartridge type into a first chamber. The basket unit 500 can be moved (e.g., rotated) by a rotation mechanism coupled with a motor. This can put the basket unit 500 into another mode, such as the basket unit 500 being positioned to receive a second cartridge type into a second chamber and/or being positioned to eject the first cartridge type from the first chamber. In some implementations, the basket unit 500 can be further moved (e.g., rotated), such as to return the basket unit 500 to the position to receive the first cartridge type into the first chamber and/or to eject the second cartridge type from the second chamber. The rotation of the basket unit 500 can be controlled be a controller, which can receive a signal from one or more sensors. In some embodiments, the signal indicates the rotational position of the basket unit 500 (e.g., whether the first chamber or the second chamber is positioned to receive a cartridge). In certain embodiments, the controller is configured to receive an input from a user, such as the type of beverage the user desires to have produced and/or the type of cartridge the user desires to position in the basket unit (e.g., the first type or the second type).

An embodiment of the beverage production assembly 400 is illustrated in FIG. 4C. As noted above, the beverage production assembly 400 can include the multi-chambered basket unit 500. The beverage production assembly 400 can also include a ratchet assembly 600 and/or a collar 700. As discussed in further detail below, engagement between the ratchet assembly 600 and the collar 700 can facilitate movement (e.g., rotation) of the basket unit 500. This can allow the basket unit 500 to be selectively positioned to provide access to a desired chamber in the basket, such as for loading a cartridge.

II. Multi-Chambered Basket Unit

Figure 5:
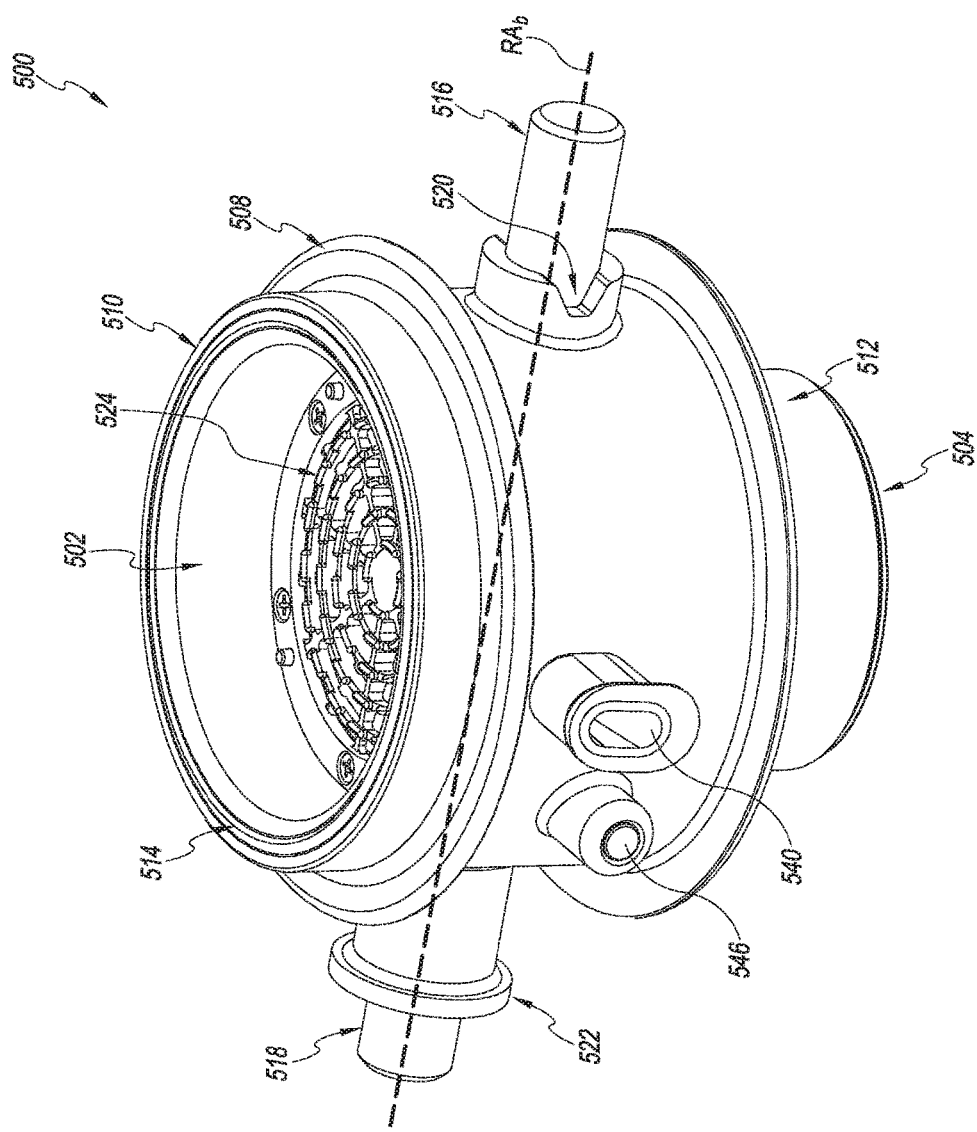
FIG. 5 illustrates a top front perspective view of the basket unit of FIG. 4C.
Figure 5B:
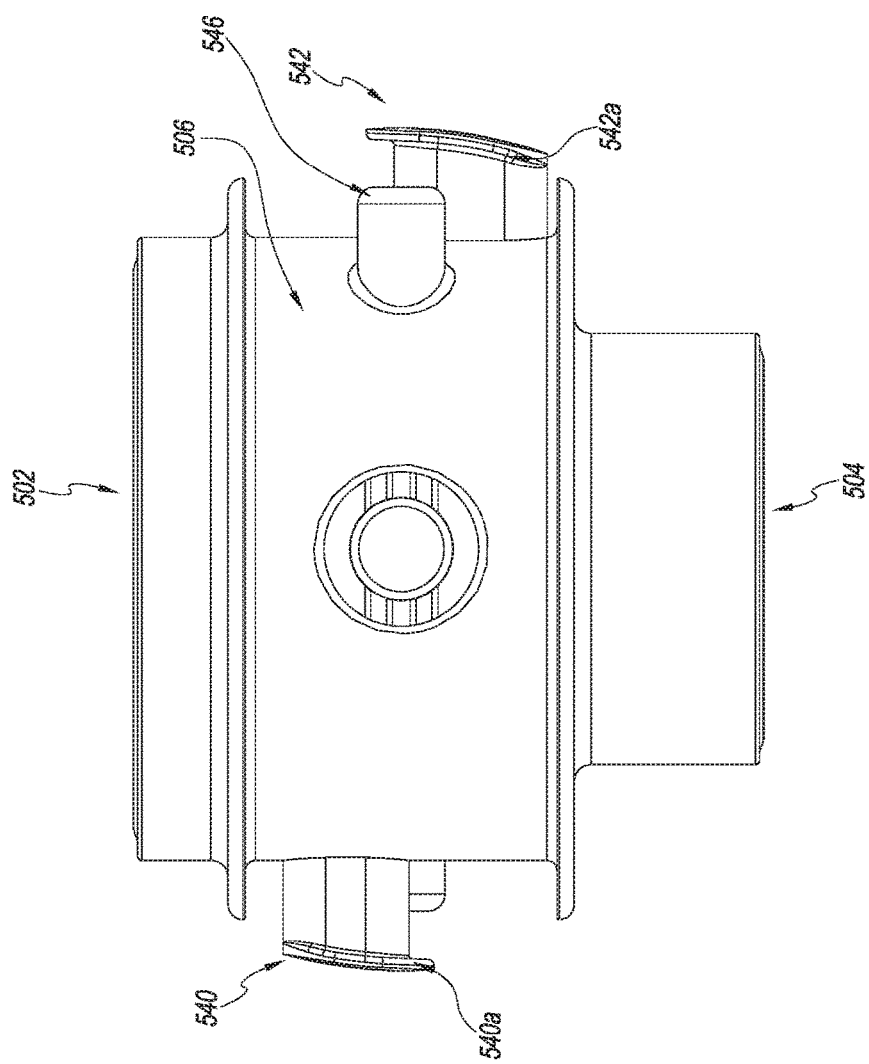
FIG. 5B illustrates a side view of the basket unit of FIG. 4C.
Figure 5C:
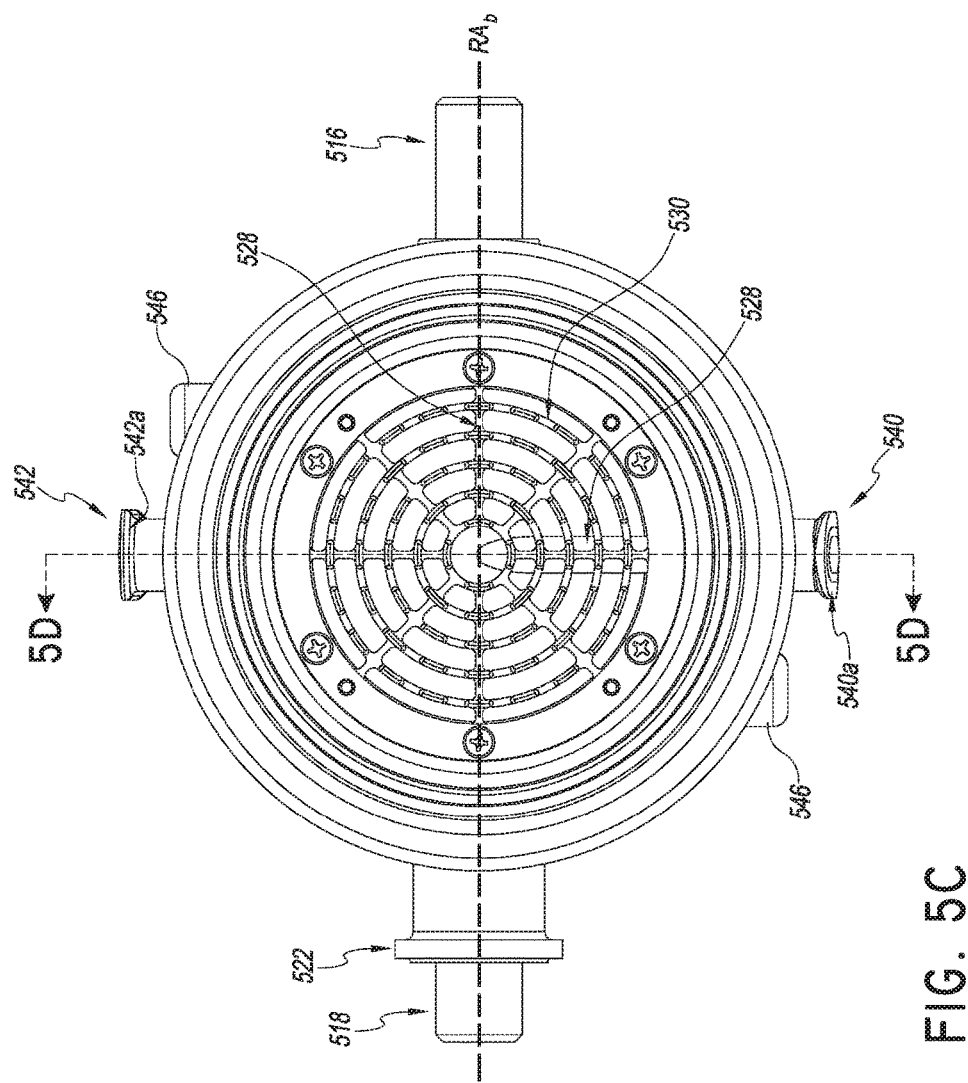
FIG. 5C illustrates a top view of the basket unit of FIG. 4C.
Figure 5D:
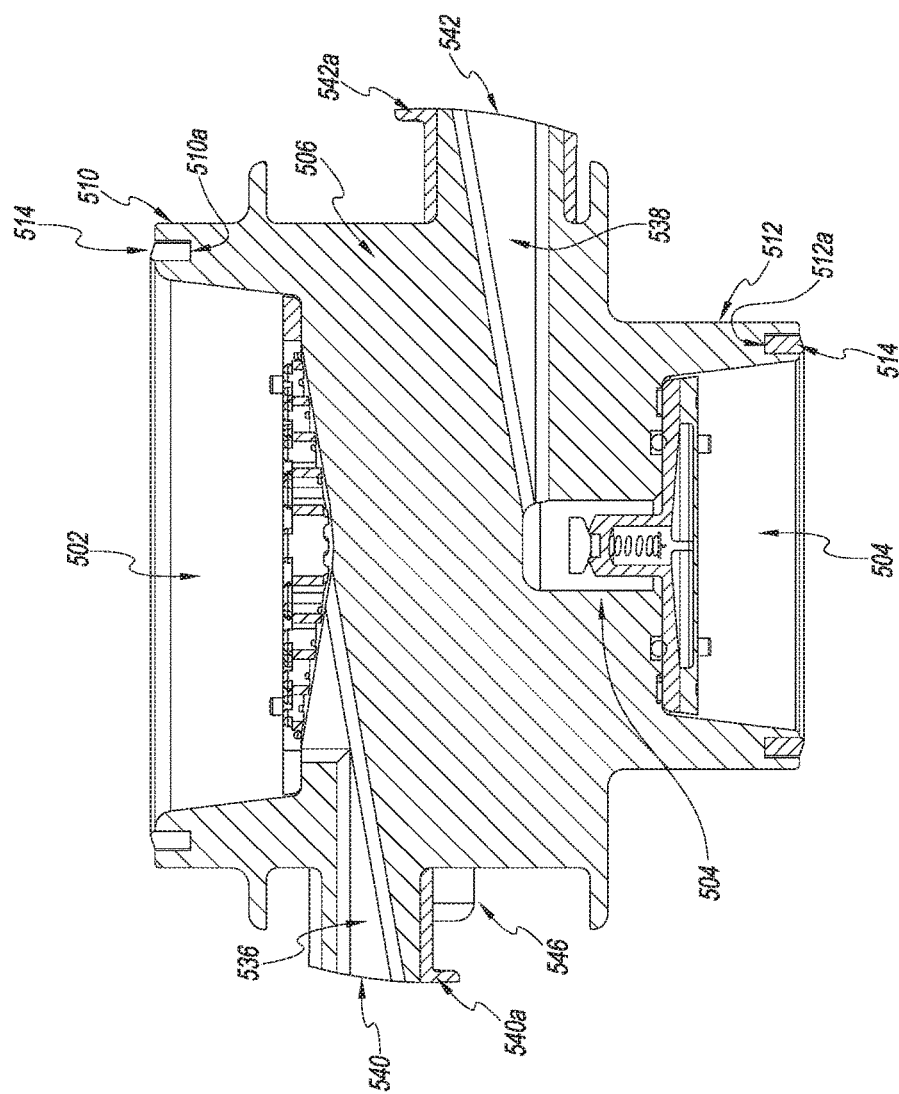
FIG. 5D illustrates a cross-sectional view of the assembly of FIG. 4C taken along the line 5D-5D.

FIGS. 5-5D illustrate an embodiment of the multi-chambered basket unit 500. In some embodiments, the basket unit 500 includes a body portion 506 with a first cartridge-receiving chamber 502 and a second cartridge-receiving chamber 504. As shown, the first chamber 502 can be located on a first side of the basket unit 500 and the second chamber 504 is disposed on a second side of the basket unit 500. For example, the first chamber 502 and the second chamber 504 can be positioned on generally opposite sides of the basket unit 500. Certain embodiments of the basket unit 500 have additional chambers, such as third, fourth, fifth, sixth, or otherwise chambers.

In some implementations, the basket unit 500 includes a body portion 506. The illustrated body portion 506 has a generally cylindrical shape, though many other shapes are contemplated as well. As shown, the first chamber 502 can be positioned at a first end of the generally cylindrical shape and the second chamber 504 can be positioned at a second end of the generally cylindrical shape. In some embodiments, the first and/or second chambers 502, 504 protrude into the body portion 506 (e.g., are recessed within).

In certain variants, the first and second chambers 502, 504 are configured to receive different types of cartridges. For example, the first chamber 502 can be configured to receive a first type of cartridge with a first size and/or shape and the second chamber 504 can be configured to receive a second type of cartridge a second size and/or shape. In some embodiments, the first chamber 502 is adapted for producing a first type of beverage from beverage component or precursor in the first cartridge type, and the second chamber 504 is adapted for producing a second type of beverage from beverage component or precursor in the second cartridge type. For example, first chamber 502 can receive a first type of cartridge containing a beverage component or precursor for the production of a brewed coffee beverage and the second chamber 504 can receive a second type of cartridge containing a beverage component or precursor for the production of an espresso coffee beverage (e.g., latte, macchiato, cappuccino, espresso shot, etc.). In certain variants, the first type of cartridge is for the production of an espresso coffee beverage and the second type of cartridge can be for the production of a brewed coffee beverage. In several implementations, at least one of the chambers 502, 504 is for producing a coffee beverage, such as a brewed coffee or espresso coffee beverage. In certain embodiments, at least one of the cartridges 502, 504 is for producing a non-coffee beverage, such as tea, hot chocolate, fruit or vegetable based drink (e.g., juice, cider, or the like), or otherwise.

In embodiments in which at least one of chambers 502, 504 is for preparing brewed coffee, that chamber may include structural features such as filtration elements, strainers, large exit apertures, etc. configured to facilitate brewing of coffee grounds. In embodiments in which at least one of chambers 502, 504 is for preparing espresso coffee, that chamber may be smaller in size (e.g., diameter, volume, or otherwise) than the brewed coffee chamber. In some implementations, the chamber for preparing espresso coffee beverages may include structural features configured to prepare the espresso beverage at a higher pressure than the brewed coffee beverage (for example, the espresso coffee chamber may include very small exit apertures or may be configured to receive a tamp that compresses the grounds in the cartridge). In some embodiments, the chamber for preparing espresso coffee beverages is configured to withstand at least about 130.5 psi (about 9 bar) of pressure and the chamber for preparing brewed coffee beverages is configured to withstand less than 130.5 psi of pressure (e.g., about 5 psi of pressure). In some embodiments, the chamber for preparing brewed coffee beverages is configured to withstand pressures of at least about 3 psi and/or less than or equal to about 4 psi. In some implementations, the chamber for preparing espresso coffee beverages is configured to withstand at least about 195 psi and/or the chamber for preparing brewed coffee beverages is configured to withstand at least about 4.5 psi.

The cartridges to be received in each such respective chambers may also include different structural features to facilitate preparation of different types of beverages. For example, a cartridge for use in preparing an espresso or other high pressure type beverage may be configured may to withstand a higher pressure being applied to its contents, rather than a cartridge used for preparing a brewed type coffee or other low pressure type beverage, in order to prepare an espresso beverage rather than a brewed coffee beverage. Thus, an espresso or "high pressure" cartridge may include a stretchable lid (for receiving a tamp that compresses the grounds in the cartridge), may include smaller exit apertures, or may be smaller in size, while a brewed coffee or "low pressure" cartridge may include large or more exit apertures, may include a non-deformable or stretchable lid, or may be larger in size.

Various embodiments of the basket unit 500 can include one or more bracing elements. For example, some embodiments of the basket unit 500 can include one or more radially outwardly extending annular flanges 508. Certain variants have one or more cartridge support members 510, 512, such as shoulders or walls, that surround a portion of the first and second chambers 502, 504. For example, the embodiment and configuration shown has a generally upwardly extending first wall bounding a portion of the first chamber 502 and a generally downwardly extending second wall that bounds a portion of the second chamber 504. The cartridge support members can be configured to support a cartridge that is received in the chamber, such as by engaging an outwardly-extending lip or flange on the periphery of the cartridge (not shown).

In certain implementations, one or more of the cartridge support members 510, 512 include a sealing member 514, such as a gasket made of plastic, rubber, or another elastomeric material. As shown, the sealing member 514 can be located at an end of the respective cartridge support member 510, 512. In certain variants, the sealing member extends generally vertically. In some embodiments, a portion of the sealing member 514 is received in a recess 510a, 512a in the respective cartridge support member 510, 512.

The sealing member 514 can be configured to facilitate a seal (e.g., a substantially liquid-tight seal and/or substantially gas-tight seal) between the respective cartridge support members 510, 512 and the cartridge. For example, in certain implementations, during the beverage production process the peripheral flange of the cartridge and one of the cartridge support members 510, 512 are pressed together, thereby resiliently deforming the sealing member 514 and providing a closure between the cartridge and the cartridge support member. In some embodiments, a tamping mechanism (e.g., in the lid assembly) depresses the cartridge against one of the cartridge support members 510, 512 (e.g., the cartridge support member oriented generally upwardly). Additional details regarding the tamping mechanism and the sealing member can be found in U.S. application Ser. No. 14/205, 241, titled "BEVERAGE PRODUCTION MACHINES AND METHODS WITH TAMPING ASSEMBLY," filed Mar. 11, 2014; the entirety of that application is hereby incorporated by reference.

With continued reference to FIGS. 5-5D, some embodiments of the basket unit 500 includes features that can facilitate movement (e.g., rotation) of the basket unit 500. For example, in the illustrated arrangement, the basket unit 500 can include first and second axle portions 516, 518. As shown, at least some of the axle portions 516, 518 can have a generally circular cross-section, which can aid in rotation about the axle portions. The axle portions 516, 518 can extend radially outwardly from, and be rigidly attached to, the body portion 506 of the basket unit 500. In some embodiments, the axle portions 516, 518 are positioned opposite each other around the periphery (e.g., circumference) of the body portion 506 and/or are aligned along a common axis $RA_b$. In various embodiments, the axle portions 516, 518 can facilitate rotation of the basket unit 500 about the axis $RA_b$, and relative to other components of the main housing 105, as described in further detail below. In some implementations, the axle portions 516, 518 are formed with the body portion 506 of the basket unit 500. In some variants, the axle portions 516, 518 are part of a unitary axle member that extends through the basket unit 500. In some embodiments, the axle member can be a separate component that fits into a mating cylindrical bore in the basket unit 500, e.g., along the axis $RA_b$.

According to some implementations, at least one of the axle portions includes a mating feature 520, such as a groove, notch, tooth, or otherwise. The mating feature can be configured to engage with a portion of the ratchet assembly 600. In some embodiments, at least one of the axle portions 516, 518 includes a stop member 522, such as a shoulder. The stop member 522 can engage a mating portion (e.g., a hole) of the frame 125 to inhibit or prevent translational movement of the basket unit 500 relative to the frame 125 along the axis $RA_b$.

In various embodiments, the basket unit 500 can include bottom portions 524, 526 that can define a bottom of each of the chambers. In some embodiments, each of the bottom portions 524, 526 are configured to support a cartridge placed in the respective chamber. For example, as shown in FIGS. 5, 5A, and 5C, the bottom portions 524, 526 can include a series or radial struts 528 and/or rings 530, or a perforated surface 532. In some embodiments, one or more of the bottom portions 524, 526 can include a center support, which can intersect with the radial struts 528 and/or one or more of the rings 530. In various embodiments, each of the bottom portions 524, 526 include one or gaps or apertures, which can allow liquid to flow therethrough to exit the respective chambers 502, 504. In some embodiments, each of the bottom portions 524, 526 are secured to the body portion 506 with one or more threads, fasteners (e.g., screws), adhesives, or otherwise.

In some embodiments, one or more of the bottom portions 524, 526 include a restriction assembly 534. The restriction assembly 534 can be configured to facilitate creating or providing an increase in pressure in one or more of the chambers 502, 504 during the beverage production process. This can be beneficial in producing certain types of beverages. For example, producing espresso at under elevated pressure conditions (e.g., about at least 9 bar) can yield an improved beverage. Additional details regarding restriction assemblies can be found in U.S. application Ser. No. 14/205, 232, titled "BEVERAGE PRODUCTION MACHINES AND METHODS WITH RESTRICTORS," filed Mar. 11, 2014; the entirety of that application is hereby incorporated by reference.

With regard to FIGS. 5B, 5C, and 5D, each of the chambers 502, 504 can have at least one conduit configured to convey liquid to a corresponding outlet during the beverage production process. For example, a first conduit 536 can fluidly connect the first chamber 502 with a first outlet 540, and a second conduit 538 can fluidly connect the second chamber 504 with a second outlet 542. This can provide a distinct flow path for each of the chambers 502, 504. As shown, in some embodiments, the outlets can extend outward from the body portion 506 in generally opposite directions. For example, the first outlet 540 can extend from a first side of the basket unit 500 and the second outlet 542 can extend from generally the opposite side of the basket unit 500. In various embodiments, the conduits 536, 538 are angled, such that a given conduit is inclined generally downwardly when its associated chamber is oriented generally upwardly. For example, in FIG. 5D, the first chamber 502 is oriented generally upwardly, and the first conduit is inclined generally downwardly. Such inclined conduits 536, 538 can encourage liquid (e.g., a beverage) to exit from the chambers 502, 504. In some embodiments, the first conduit 536 and/or the second conduit 538 can be angled relative to horizontal at least about: 1°, 5°, 10°, 20°, 30°, 45°, values between the aforementioned values, or otherwise.

In some embodiments, one or more of the outlets 540, 542 extend generally perpendicular to the axis $RA_b$. In certain variants, the outlets 540, 542 can extend generally parallel to, or at a slight angle (e.g., less than about: 5°, 10°, 15°, values between the aforementioned values, or otherwise) relative to, the axis $RA_b$. This can facilitate engaging the one or more of the outlets 540, 542 with the dispensing assembly 300 during a rotational operation of the basket unit 500, as is discussed in more detail below. In some implementations, each of the outlets 540, 542 include a mating member, such as a flange 540a, 542a. As shown in the side view of FIG. 5B, the flange can be curved. This can facilitate mating engagement with the dispensing assembly 300.

In some embodiments, the basket unit 500 includes features configured to indicate the position of the basket unit 500 relative to the frame 125 or other portions of the main housing 105. For example, the basket unit 500 can include one or more basket position elements 546, and the main housing 105 can include one or more basket position sensors (not shown) configured to detect the presence of the basket position elements 546. In some embodiments, the basket position elements 546 are magnetic markers and the basket position sensors are magnetic sensors. In certain variants, the basket position elements 546 are light reflective elements and the basket position sensors are configured to emit and detect a light signal (e.g., a light signal reflected off of the basket position elements). In various implementations, the basket position sensors are configured to determine the presence or non-presence of at least one of the basket position elements 546. For example, at least one of the basket position sensors can sense whether at least one of the basket position elements 546 is in close proximity to and/or is facing the basket position sensor.

In some embodiments, the basket position elements 546 are configured to indicate the position of the basket unit 500. For example, in the embodiment illustrated in FIG. 5c, a first basket position element can be located on a first side of the cross-sectional line 5D-5D and a second basket position element can be located on a second side of the cross-sectional line 5D-5D. When the basket unit 500 is rotated about the axis $RA_b$, the position of the basket position elements 546 changes as a function of which chamber is oriented generally upwardly. In some embodiments, one or more basket position sensors can detect the location of the basket position elements 546. For example, the basket position sensors can determine which side of the line 5D-5D that the basket position element that is facing the sensor is located on. This information can be provided to the controller in the machine 100 to monitor the position of the basket unit 500. In some embodiments, when a first sensor detects a first of the basket position elements 546, the first sensor can send a signal the controller indicating that the first side is oriented generally upwardly, and when a second sensor detects a second of the basket position elements 546, the second sensor can send a signal to the controller indicating that the second side is oriented generally upwardly. This can facilitate determining a position of the basket 500 and/or whether and which of the chambers is in the loading position.

III. Ratchet Assembly

Figure 6A:
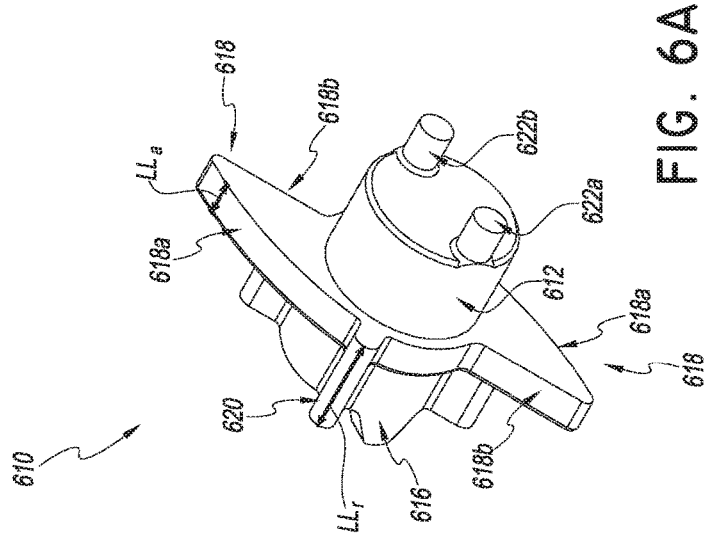
FIG. 6A illustrates a front perspective view of the ratchet member of FIG. 6.
Figure 6:
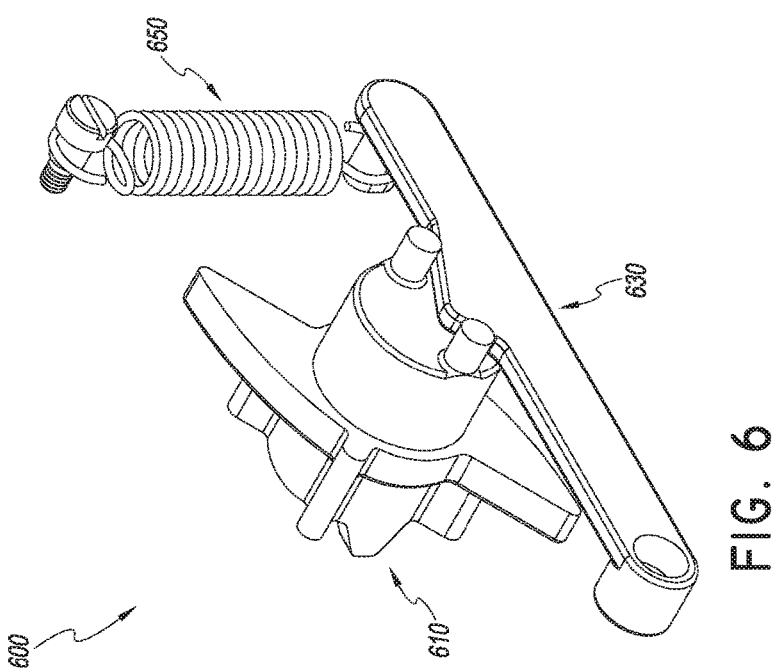
FIG. 6 illustrates a perspective view of the ratchet assembly of FIG. 4C, including a ratchet member, ratchet follower, and biasing member.

FIG. 6 illustrates an embodiment of the ratchet assembly 600, which can be used to rotate the basket unit 500. The ratchet assembly 600 can include one or more of: a ratchet member 610, a ratchet follower 630, and a biasing member 650. In some embodiments, the ratchet member 610 is integrated with the body portion 506 of the basket unit 500.

Figure 6C:
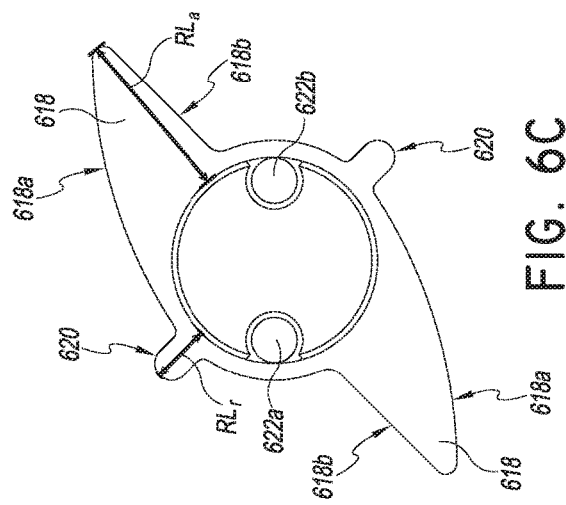
FIG. 6C illustrates a front view of the ratchet member of FIG. 6.
Figure 6D:
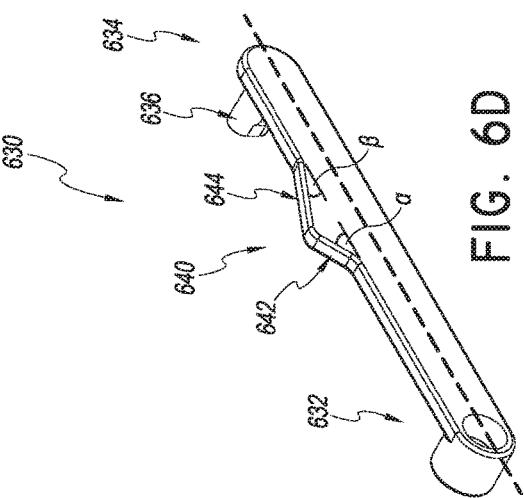
FIG. 6D illustrates a perspective view of a ratchet follower of FIG. 6.
Figure 6B:
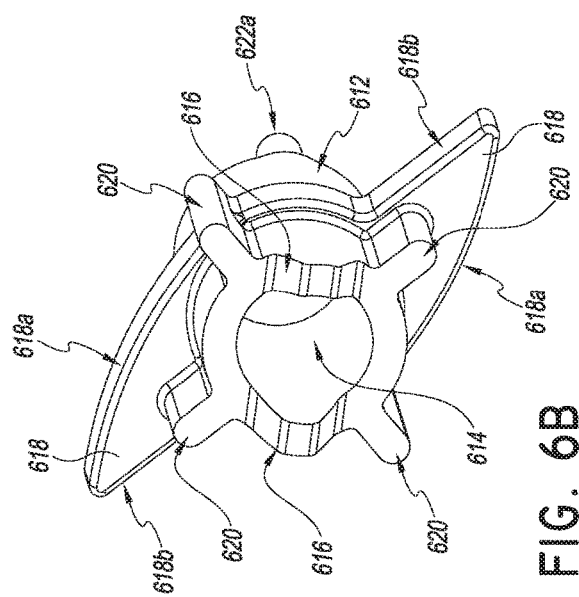
FIG. 6B illustrates a rear perspective view of the ratchet member of FIG. 6.

With reference to FIGS. 6A, 6B, and 6C, an embodiment of the ratchet member 610 is illustrated. In some embodiments, the ratchet member 610 comprises a main portion 612 that is configured to engage with the axle portion 516 of the basket unit 500. For example, the main portion 612 can include a channel 614 configured to receive a portion of the axle portion 516. In some implementations, the main portion 612 is configured to be received in and/or to rotate relative to the frame 125 (see FIG. 3). In some embodiments, the ratchet member 610 includes mating features 616, such as one or more notches, teeth, or otherwise. The mating features 616 of the ratchet member 610 can be configured to engage with the mating features 520 of the basket unit 500. Such engagement can inhibit the ratchet member 610 from rotating relative to the basket unit 500 such that movement of the ratchet member 610 can result in movement of the basket unit 500.

The ratchet member 610 can include one or more collar engaging members, such as arms 618 and/or ribs 620. In some embodiments, the ratchet member 610 includes at least one, two, three, four, five, six, seven, or eight arms 618 and/or at least one, two, three, four, five, six, seven, or eight ribs 620. For example, the embodiment shown includes two arms 618 and four ribs 620. In some implementations, the arms 618 are longitudinally spaced-apart (e.g., in a direction generally parallel to an axis of rotation of the ratchet member) from a rear portion of the ratchet member 610. For example, the arms 618 can be located at a central portion of the ratchet member 610. This can allow portions of the collar 700 to pass behind the arms 618, as discussed in more detail below.

As discussed in more detail below, when some variants are in certain configurations, the ribs 620 can engage with the collar 700. For example, in some embodiments, the ribs 620 engage with the collar 700 when a lid of the lid assembly 140 is in the open position. This can inhibit unintended rotation of the basket unit 500. In certain variants, when the lid is not in the open position, the ribs 620 do not engage with the collar 700, thereby allowing rotation of the basket unit 500.

As illustrated in FIGS. 6A, 6B, and 6C, various configurations of the arms 618 and ribs 620 are contemplated. In certain embodiments, the ribs 620 have a longitudinal length $LL_r$ that is greater than a longitudinal length $LL_a$ of the arms 618. As shown, in some variants, the ribs 620 extend at least from the rear portion of the ratchet member 610 to a front side of the arms 618. In some implementations, a radial length $RL_a$ of one of the arms 618 is greater than the longitudinal length $LL_a$ of that arm. In some embodiments, the longitudinal length $LL_r$ of one of the ribs 620 is greater than the radial length $RL_r$ of that rib. In certain variants, the arms 618 extend from the main portion 612 of the ratchet member 610 in generally opposite directions.

Each of the arms 618 can have a first surface 618a and a second surface 618b. As shown in FIG. 6B, in certain variants, the first surface 618a is curved and the second surface 618b is substantially straight. In some implementations, a first length measured along the first surface 618a is longer than a second length measured along the second surface 618b. In various embodiments, the first surface 618a is configured to facilitate sliding movement of a portion (e.g., a projection) of the collar 700 relative to the ratchet member 610, and/or the second surface 618b is configured to engage and/or move in conjunction with a portion of the collar 700, as discussed in further detail below.

As illustrated in FIG. 6A, the ratchet member 610 can include one or more follower-engaging members, such as projections or bosses 622. In certain implementations the bosses 622 have a substantially circular cross-sectional shape. As shown, certain embodiments include a plurality of bosses 622 that are spaced-apart from each other. For example, the illustrated embodiment includes a first boss 622a and a second boss 622b.

With regard to FIG. 6D, an embodiment of a ratchet follower 630 is shown. The ratchet follower 630 can include an elongate shape. In some embodiments, a first end 632 of the ratchet follower 630 is configured to be fixedly attached to a portion of the frame 125 (see FIG. 3) with a fastener, such as a screw, rivet, pin, or otherwise. In some embodiments, the ratchet follower 630 is biased by the biasing member 650, such as a tension spring, leaf spring, torsion spring, or otherwise. For example, a second end 634 of the ratchet follower 630 can connect to the biasing member 650. As shown, the second end 634 can include an arm 636 that engages with a hook or loop at an end of the biasing member 650. In some embodiments, a spring element (such as a torsion or compression spring) can be configured to interact on one or more surfaces on the ratchet follower 630 so as to bias the follower in one rotational direction.

As shown, the ratchet follower 630 can include a cam-following portion 640. In certain variants, the cam-following portion 640 includes a first ramp 642 and a second ramp 644. Relative to a longitudinal axis of the ratchet follower 630, the first ramp 642 can be at an angle α and the second ramp 644 can be at an angle β. In various implementations, the angle α is greater than or equal to the angle β. In some implementations, the angle α is less than or equal to the angle β. In some variants, the angles α, β are about equal.

IV. Collar

Figure 7:
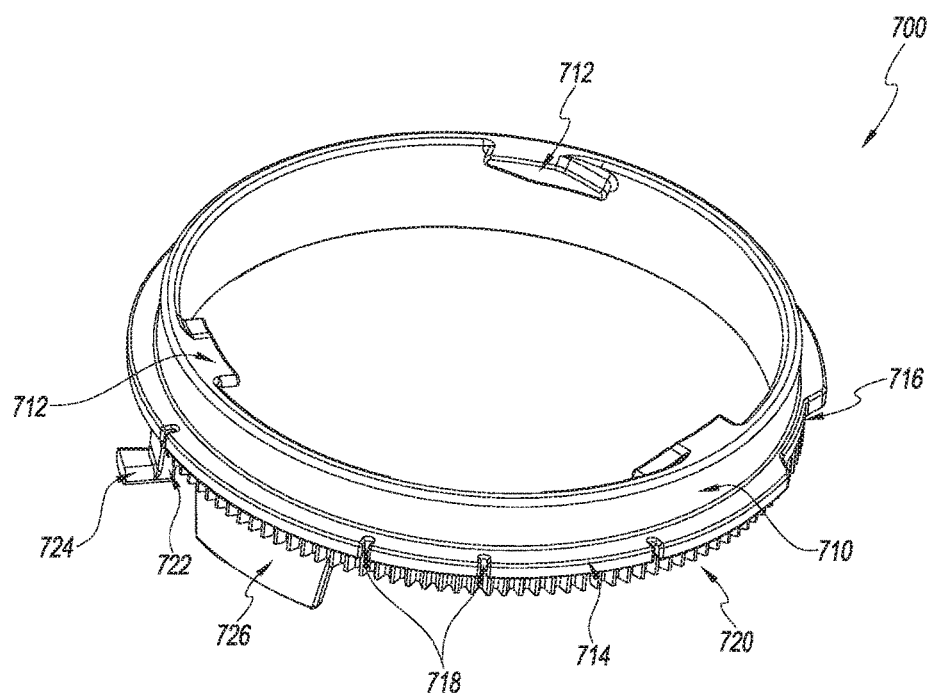
FIG. 7 illustrates a perspective view of the collar of FIG. 4C.
Figure 7A:
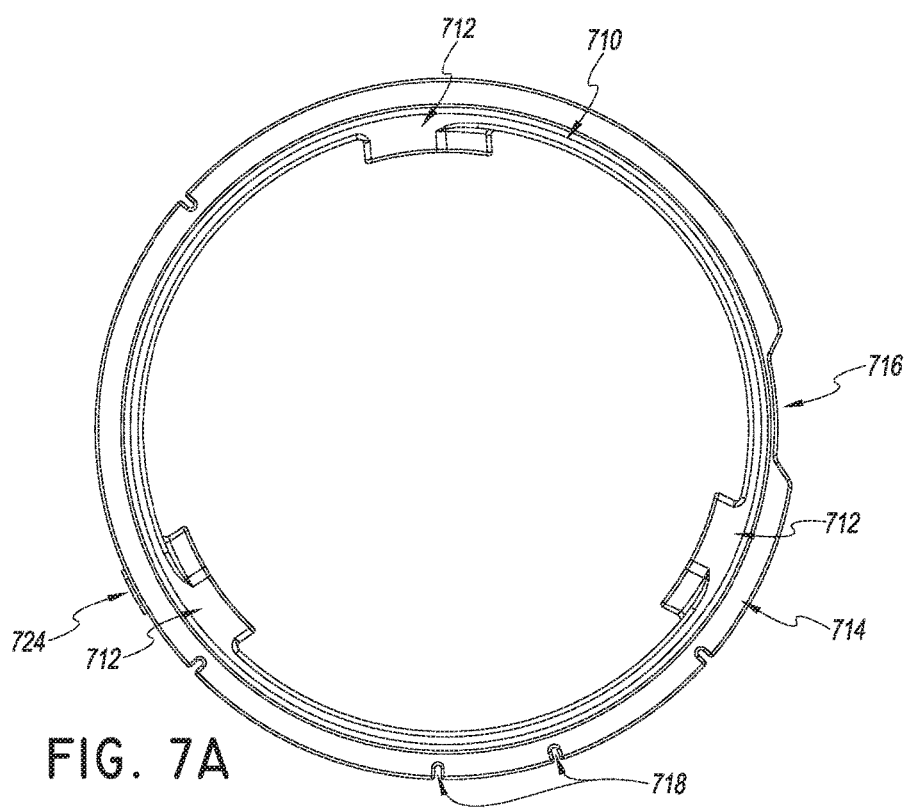
FIG. 7A illustrates a top view of the collar of FIG. 8.

With regard to FIGS. 7 and 7A, an embodiment of a collar 700 is illustrated. The collar 700 can include an annular body with a wall portion 710. In some embodiments, the wall portion 710 includes one or more cam teeth 712. For example, the cam teeth 712 can be positioned on a radially inner side of the wall portion 710. In some embodiments, one or more of the cam teeth 712 engage a cam track (e.g., in the lid assembly, see FIG. 2) to facilitate securing the lid assembly 140 and/or for tamping of the cartridge. Further details in that regard can be found in U.S. application Ser. No. 14/205,241, titled "BEVERAGE PRODUCTION MACHINES AND METHODS WITH TAMPING ASSEMBLY," which is filed on the same day as the present application.

As shown, the collar 700 can include a radially outwardly extending flange 714. In some embodiments, the flange 714 includes a circumferentially-extending notch 716. Certain variants of the flange 714 have one or more position indication features 718, such as tick marks, dimples, or grooves. In some embodiments, the main housing 105 includes a rotation detection sensor (not shown) that is configured to detect the position indication features 718. The sensor can send a signal to the controller in the main housing 105, which can use that signal to discern the rotational position of the collar 700 relative to other portions of the main housing 105 (e.g., the basket unit 500).

In various embodiments, the collar 700 is configured to be rotatably driven by a motor (not shown). For example, the collar 700 can include a plurality of gear teeth 720 adapted to engage with a gear or gear train that engages with a shaft of the motor. The motor can drive the gear or gear train, which in turn rotates the collar 700 about the axis $RA_c$.

Several embodiments of the collar 700 include one or more ratchet engaging members. For example, certain embodiments of the collar 700 include a leg 722 with a projection 724 (e.g., a tab, bump, finger, or otherwise). In some implementations, the leg 722 extends generally downward and/or the projection 724 extends radially outwardly. In some embodiments, the collar 700 includes a wing 726. In some embodiments, the wing 726 is positioned radially inward of the leg 722 and/or the projection 724. As discussed in further detail below, in some variants, to facilitate rotation of the basket unit 500, the projection 724 can be configured to engage with the arms 618 of the ratchet member 610 and/or the wing 726 can be configured to engage with the ribs 620 of the ratchet member 610.

As noted above, when some variants are in certain configurations, the ribs 620 can engage with the collar 700. For example, when the lid is in the open position, the collar 700 can be rotatably positioned such that the wing 726 and the ribs 620 of the ratchet member 610 are engaged. This engagement can inhibit unintended rotation of the basket unit 500. In certain variants, when the lid is not in the open position, the ribs 620 do not engage with the wing 726, thereby allowing rotation of the basket unit 500.

V. Beverage Production Assembly

Figure 8:
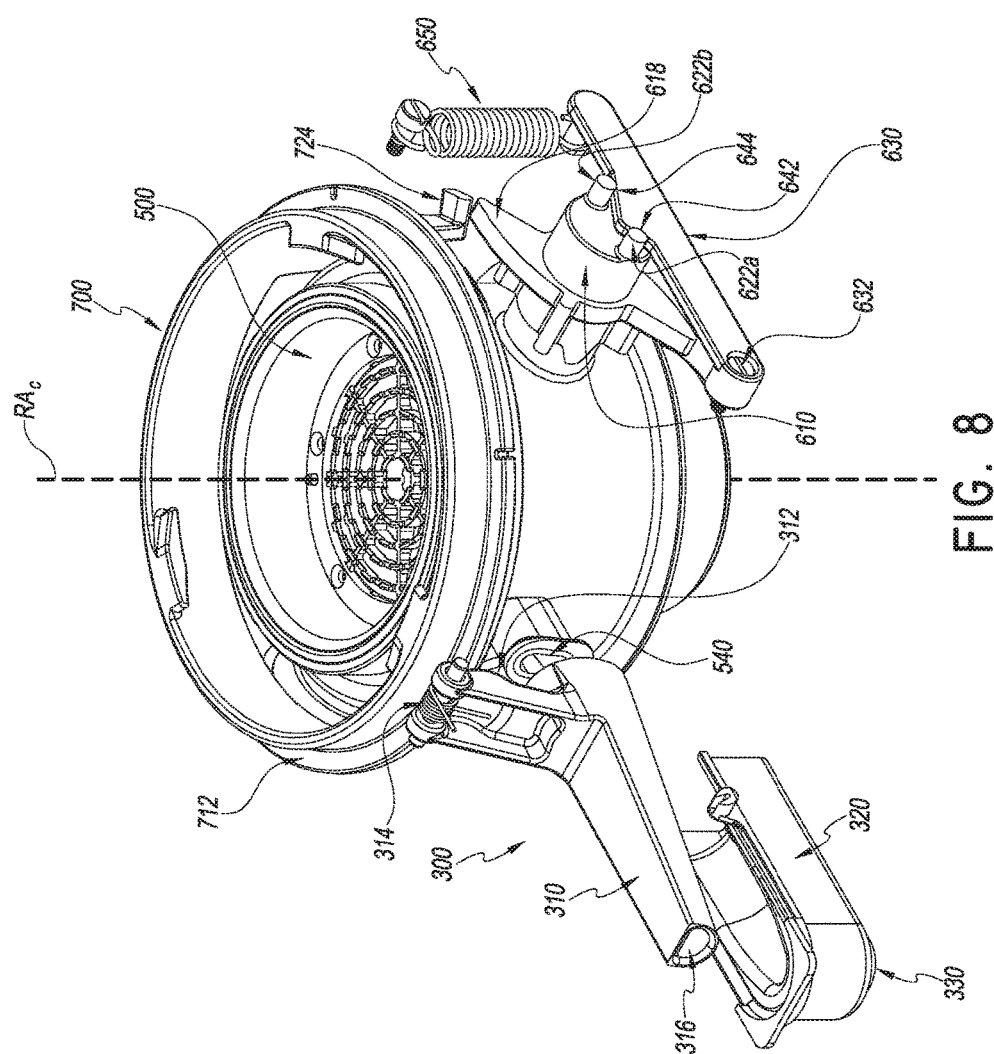
FIG. 8 illustrates a perspective view of the beverage production assembly of FIG. 4C in a position to accept a first type of cartridge for producing a first type of beverage.

With reference to FIG. 8, an embodiment of the beverage production assembly 400 is illustrated. As previously noted, the beverage production assembly 400 can include the basket unit 500, the ratchet assembly 600, and the collar 700. In some variants, the beverage production assembly 400 includes a controller (not shown) configured to receive a signal from and a sensor (not shown). In the embodiment illustrated, the first chamber 502 is oriented generally upwardly and the second chamber 504 is oriented generally downwardly. This can facilitate loading of the first cartridge (e.g., not shown) into the first chamber 502, provided that the lid assembly is open, such as is shown in FIG. 2. As such, the chamber that is oriented generally upwardly is said to be in the "loading position." Also, the cartridge that is oriented generally downwardly can be said to be in the "inverted position." As will be discussed in detail below, the basket unit 500 of the beverage production assembly can be configured to rotate to selectively position one of the first and the second chambers 502, 504 in the loading position and/or to selectively position the other of the first and the second chambers 502, 504 in the inverted position.

In some embodiments, the collar 700 is positioned and adapted such that cartridges can be passed through the collar 700 for receipt into one of the chambers. For example, as shown, the collar 700 can surround an upper portion of the basket unit 500 while also allowing access to the chamber that is in the loading position. In certain variants, an axial centerline of the collar 700 is collinear with a line drawn between the centers of the first and second chambers 502, 504.

As noted above, the beverage production assembly 400 can include a motor (not shown). The motor can drive (e.g., rotate) the collar 700, such as via a gear or gear train. In turn, the collar 700 can drive other components of the beverage production assembly. For example, the collar 700 can engage the ratcheting assembly 600 and/or the dispensing assembly 300, which can result in movement of those components as well as other components (e.g., the basket unit 500). As described in more detail below, rotation of the collar 700 about a rotational axis $RA_c$ can result in one or more of the following: rotational movement of the ratchet member 610 relative to the collar 700, rotational movement of the basket unit 500 relative to the collar 700, pivoting movement of the ratchet follower 630, energizing of the biasing member 650, and pivoting movement of a component of the dispensing assembly 300 relative to the collar 700. As also described below, in various embodiments, the projection 724 and/or the wing 726 of the collar 700 engages the ratchet member 610. In the state shown in FIG. 8, however, the projection and the wing 726 are spaced apart from the ratchet member 610.

As illustrated, the ratchet assembly 600 can engage with the body portion 506 of the multi-chamber basket unit 500. In some embodiments, one of the axle portions 516, 518 is partly received into the channel in the ratchet member 610. As shown, the mating features 616 (e.g., teeth) of the ratchet member 610 can engage with the corresponding mating features 520 (e.g., grooves or notches) in the axle portion 516 of the basket unit 500. In certain implementations, the engagement facilitates a generally rigid connection between the ratchet member 610 and the body portion 506 of the basket unit 500. In various embodiments, the engagement of the ratchet member 610 and the body portion 506 inhibits rotation of the ratchet assembly 600 and the basket unit 500 relative to each other. The engagement can result in rotation of the ratchet assembly 600 being transferred to the body portion 506 of the basket unit 500. This can facilitate rotation of the basket unit 500, as will be discussed in further detail below.

To facilitate clarity of presentation, some components of the upper portion of the main housing are not shown in FIG. 8. For example, the frame 125 and lid assembly 140 are not shown. Nevertheless, some portions of the illustrated components may be connected to the frame 125. For example, a first end 632 of the ratchet follower 630 can be hingedly connected to the frame 125, such as with a fastener (e.g., a screw). This can facilitate hinged movement of a portion of the ratchet follower 630 relative to the frame, other portions of the ratchet assembly 600, or otherwise. In some embodiments, the first end 632 of the ratchet follower 630 is pinned to the frame and the second end 634 of the ratchet follower 630 is able to pivot about the first end 632.

As previously discussed, the arm 636 at the second end 634 of the ratchet follower 630 can be connected with the biasing member 650. As shown, the biasing member 650 can also be connected with a mount or fastener 652, such as a hook or screw, which in turn is connected with the frame. As such, downward pivoting movement of the ratchet follower 630 (e.g., about the first end 632) can energize the biasing member 650, thereby producing a restoring force on the second end 634 of the ratchet follower 630.

VI. Dispensing Assembly

FIG. 8 also illustrates an embodiment of the dispensing assembly 300. In some embodiments the dispensing assembly 300 includes a pivoting member 310, catch member 320, and dispensing nozzle 330. The pivoting member 310 can be pivotally connected with the frame 125 (not shown in FIG. 8 for clarity of presentation). This can allow the rear portion of the pivoting member 310 to rotate into and out of engagement with the outlet ports 540, 542 of the basket unit 500. In certain embodiments, the pivoting member 310 can rotate along an axis that is generally parallel with the axis $RA_b$ and/or generally perpendicular with the axis $RA_c$. In the state illustrated, the pivoting member 310 is spaced apart from the outlet ports of the basket unit 500. This is because the flange 714 on the collar 700 engages with a cam 312 on the pivoting member 310, thereby pushing the pivoting member 310 outward relative to the basket unit 500. In some embodiments, the pivoting member 310 is biased to pivot generally toward the basket unit 500, such as by a biasing member 314 (e.g., a torsion spring).

In various embodiments, the pivoting member 310 includes a passage 316. As discussed in further detail below, the passage 316 can convey liquid beverage from the basket unit 500 to the catch member 320. When the pivoting member 310 is not in a position to convey the beverage to the catch member 320, it can be configured to inhibit dripping outside the machine 100. For example, the pivoting member 310 can be positioned such that the rear portion of the passage 316 is inclined downward and/or away from the catch member 320. This can inhibit or prevent liquid residue in the passage 316 from flowing into the catch member 320, and thus can reduce the chance of unintentional liquid discharge (e.g., drips) from the dispensing nozzle 330. In some embodiments, when the pivoting member 310 is not in a position to convey the beverage to the catch member 320, it can be configured to route drips to a reservoir (not shown), such as a waste bin located below the basket unit 500.

VII. Rotation from First Chamber to Second Chamber

FIGS. 9-12A illustrate the beverage production assembly 400 during various stages of rotation of the basket unit 500. Such a rotational movement can facilitate loading a cartridge into the basket unit 500 by orienting a desired one of the chambers 502, 504 generally upwardly, near an upper portion of the machine 100, and/or in a direction generally toward the user. For example, when a beverage that is prepared using the second chamber 504 is desired, but the first chamber 502 is in the loading position, the basket unit 500 can rotate so that the second chamber 504 is in the loading position. This can allow the cartridge to be loaded into the second chamber 504 and the beverage prepared. In some embodiments, the amount of rotation of the basket unit 500 is about 180° (and thus can be called a "half flip" of the basket unit 500).

In some embodiments, rotation of the basket unit 500 can aid in ejecting or otherwise removing a used or unwanted cartridge from one of the chambers 502, 504. For example, after a cartridge that was loaded into one of the chamber has been used to prepare a beverage, that chamber can be rotated to eject the cartridge from the chamber. This is because, as a result of the rotation, the chamber that was in the loading position has been moved to a generally downwardly oriented position (e.g., the inverted position), thereby facilitating ejection (e.g., by force of gravity or otherwise) of the cartridge in that chamber. More details about cartridge ejection mechanisms and features can be found in U.S. application Ser. No. 14/205,261, titled "CARTRIDGE EJECTION SYSTEMS AND METHODS FOR SINGLE-SERVE BEVERAGE PRODUCTION MACHINES," filed Mar. 11, 2014; the entirety of that application is hereby incorporated by reference. In certain embodiments, after ejection of the cartridge from a chamber, liquid (e.g., water) is introduced into that chamber to rinse away debris and/or residual beverage. In certain such implementations, an interior surface of the chamber (e.g., a radially inwardly facing surface) and/or one of the sealing members 510, 512 can be rinsed with the introduced liquid.

Figure 9A:
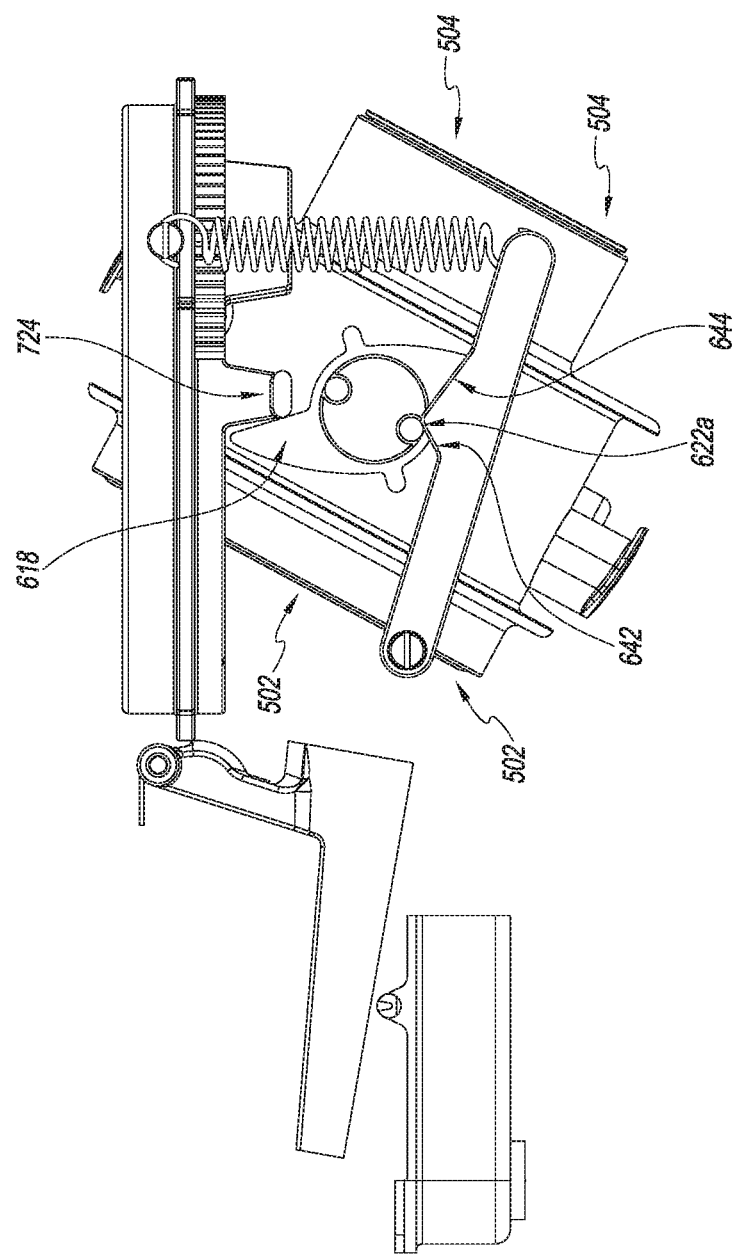
FIGS. 9A, 10A, 11A, and 12A illustrate side views of the beverage production assembly of FIGS. 9-12, respectively.
Figure 10:
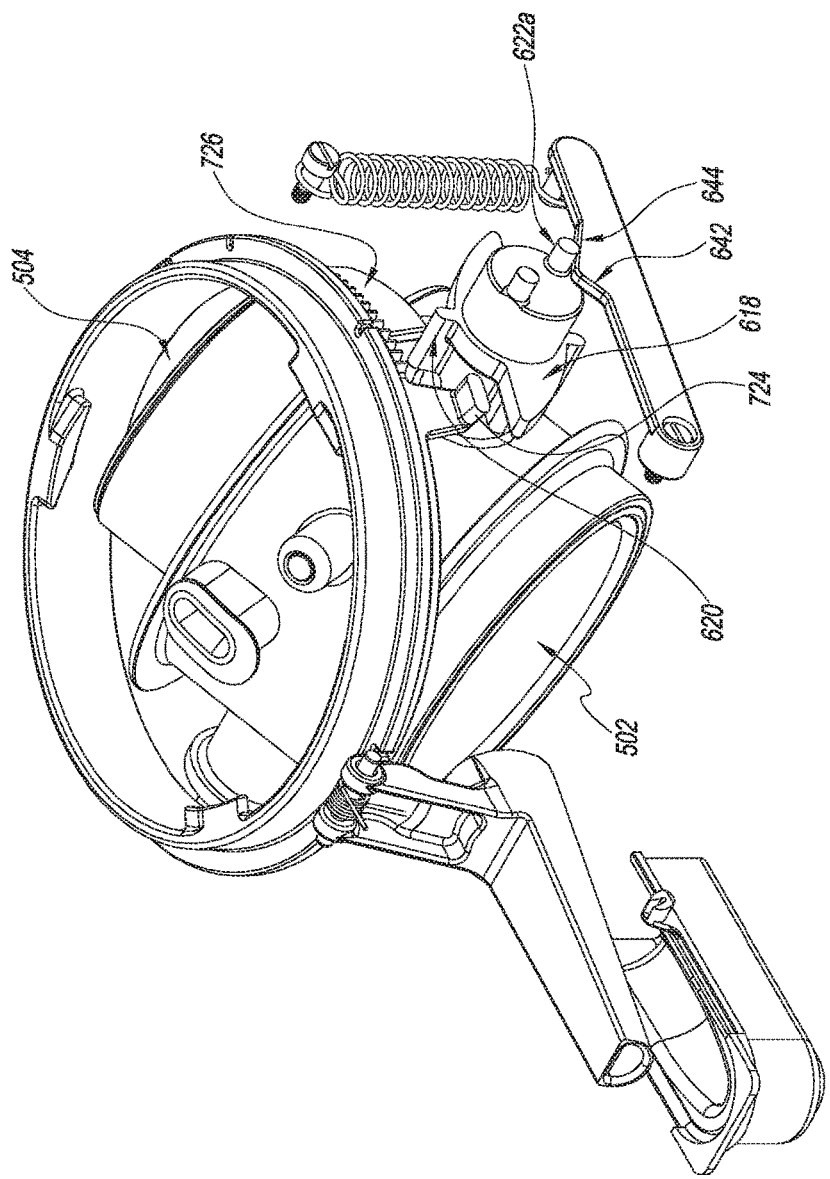
Figure 10A:
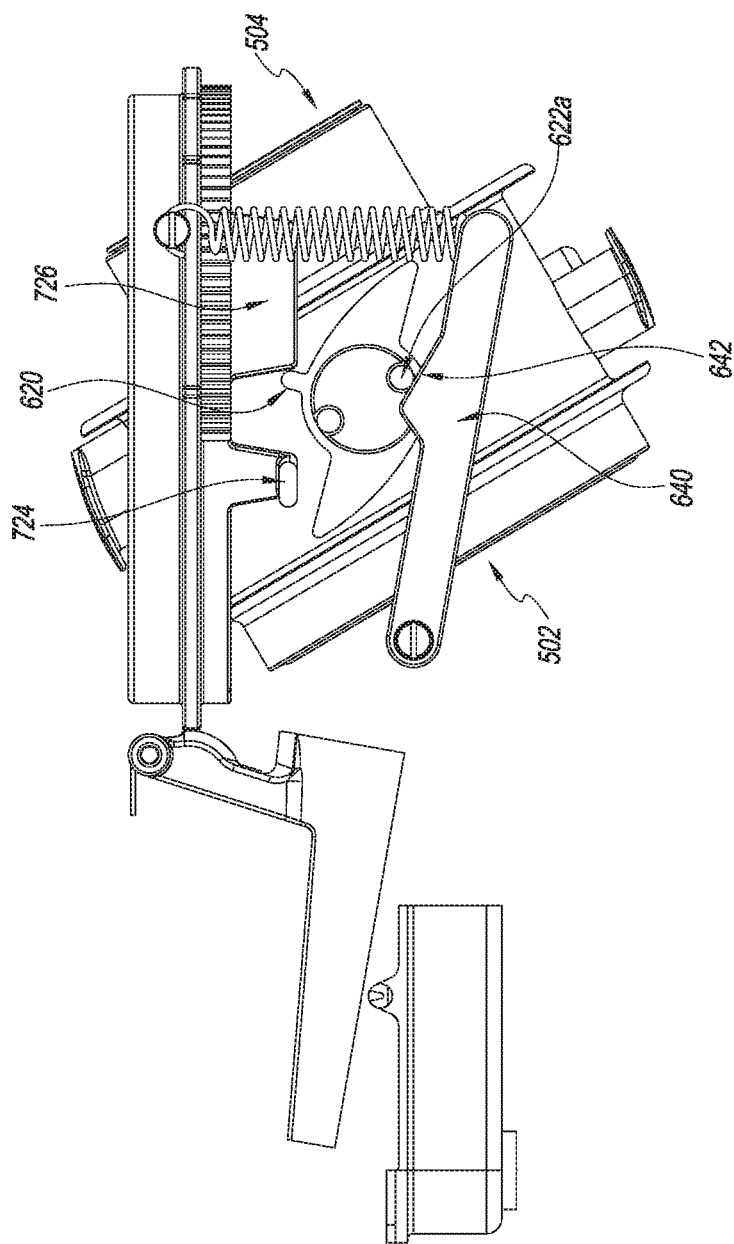
Figure 11:
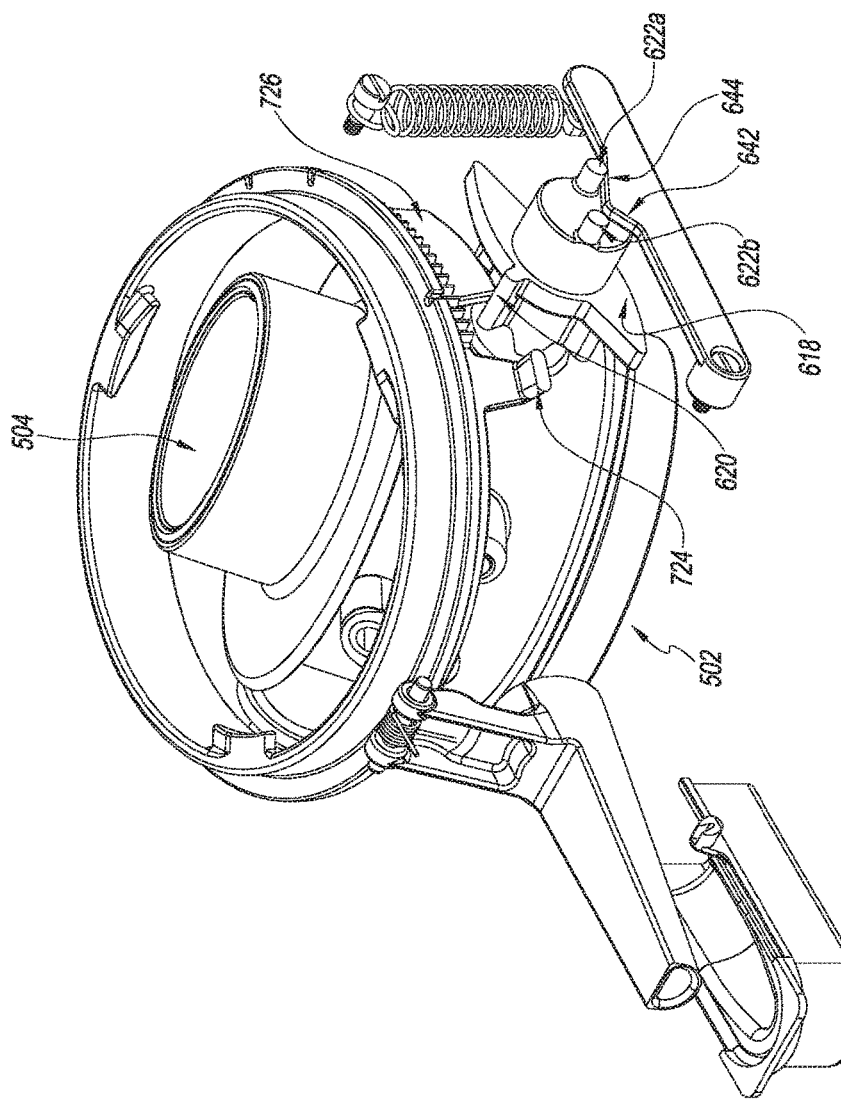
Figure 11A:
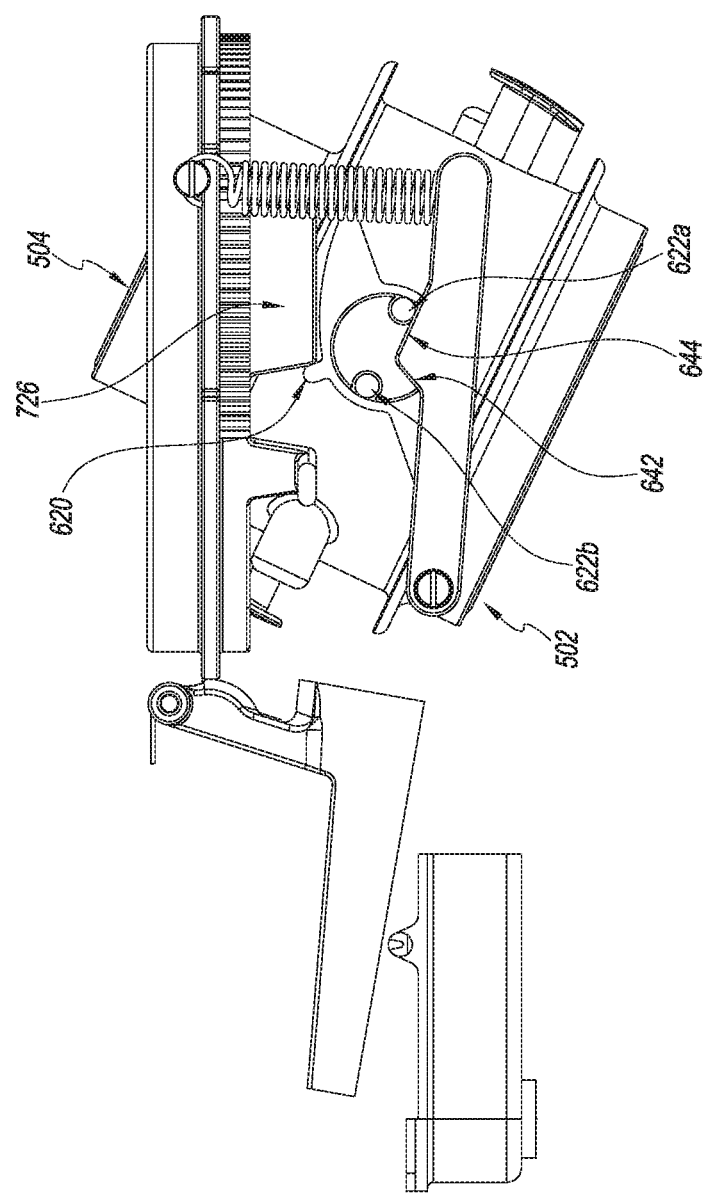
Figure 12:
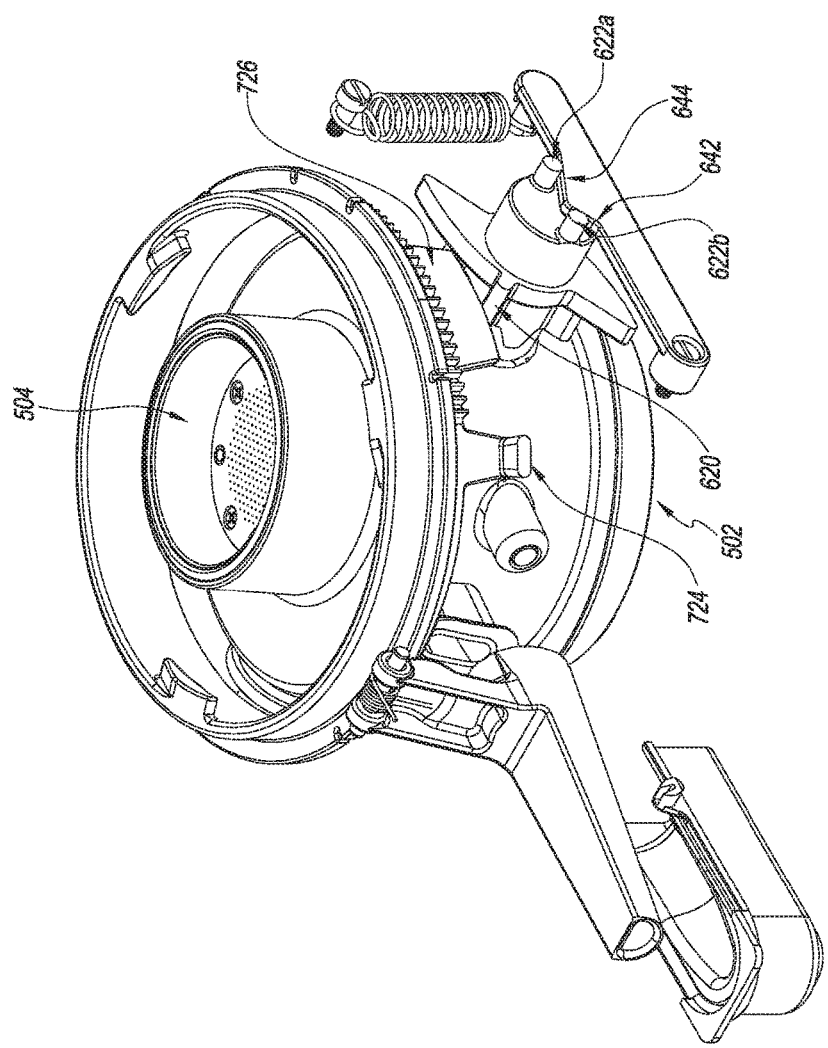
Figure 12A:
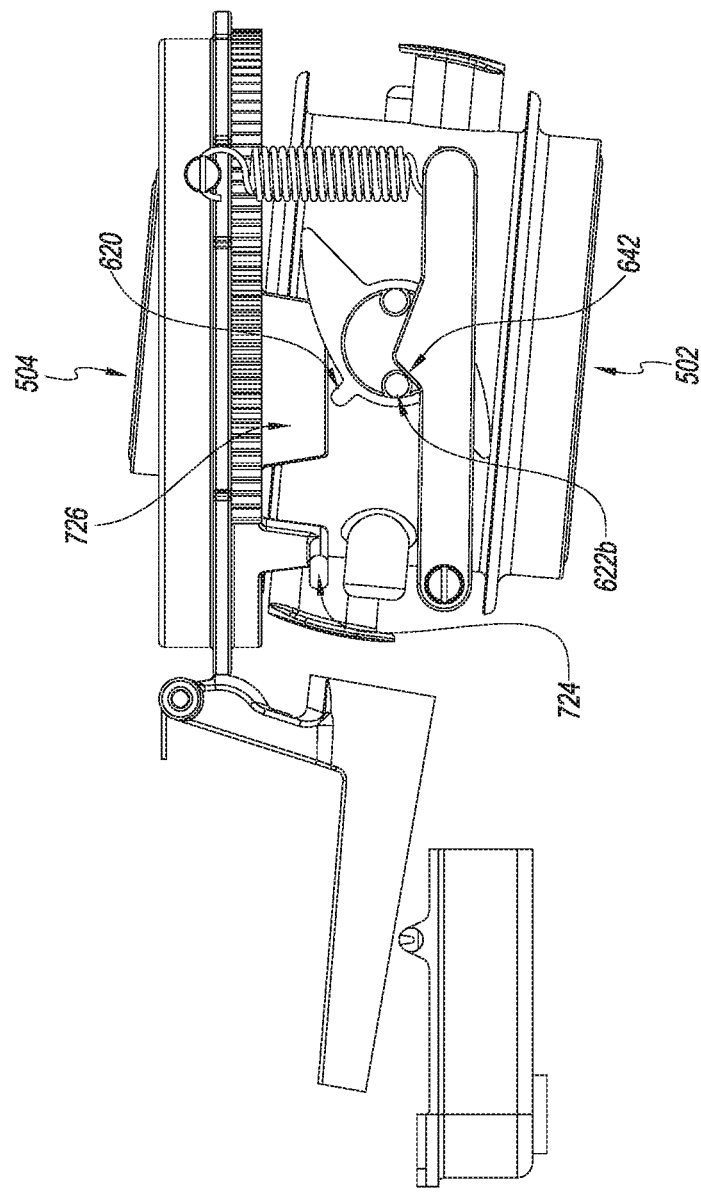

As shown in FIGS. 9 and 9A, the collar 700 has rotated (e.g., in a clockwise direction) about the axis $RA_c$ that is generally perpendicular to the axis $RA_b$ of rotation of the basket unit 500. This has engaged the projection of the collar 700 with the arm of the ratchet member 610, which has rotated about the axis $RA_b$ (e.g., in a counterclockwise direction). As previously noted, because of the engagement of the mating features of the basket unit 500 and the ratchet member 610, rotation of the ratchet member 610 can result in rotation of the basket unit 500 as well. As such, the rotation of the ratchet member 610 has resulted in the basket unit 500 being rotated about the axis $RA_b$ as well. In some implementations, the axis of rotation $RA_b$ passes between sidewalls of the main housing 105 (e.g., in FIG. 1, between a wall near the liquid reservoir and frother and a wall on the opposite side of the main housing 105). In certain variants, the axis of rotation $RA_b$ passes between a front and rear of the main housing 105.

As shown due to the rotation of the ratchet member 610, the bosses 622a, 622b on the ratchet member 610 have been rotated relative to the ratchet follower 630. This rotation has resulted in one of the bosses 622b being separated from the ramps 642, 644 of the ratchet follower 630, and the other of the bosses 622a being moved along the first ramp 642 of the ratchet follower 630. As shown, the boss 622a is positioned at about an apex between the ramps 642, 644. As will be discussed below, with continued rotation of the collar 700 and ratchet assembly 600, the boss 622a will pass the apex and begin to descend along the second ramp 644.

As shown, the movement boss 622a of the ratchet member 610 along the ramp 642 of the ratchet follower 630 has resulted in the second end 634 of the ratchet follower 630 being pivoted (e.g., generally downwardly) relative to the first end 632 of the ratchet follower 630. In some embodiments, such movement of the second end 634 of the ratchet follower 630 is against the bias of the biasing member 650, which tends to energize (e.g., elongate the longitudinal length of) the biasing member 650. For example, in the position shown in FIG. 9, the biasing member 650 has an elongated length spanning from the fastener connected with frame 125 to the arm 636 of the ratchet follower 630. Such elongation of the biasing member 650 can produce a biasing force, such as a force encouraging the second end 634 of the ratchet member 610 generally upwardly.

With reference to FIGS. 10, 10A, 11, and 11A, the collar 700 has been further rotated (relative to FIGS. 9 and 9A). As shown, the projection 724 is no longer in engagement with the arm 618 of the ratchet member 610. In some embodiments, the wing 726 on the collar 700 engages one of the ribs 620 on the ratchet member 610. In some variants, further rotation of the collar 700 about the rotational axis $RA_c$ can result in additional rotation of the ratchet member 610 about the rotational axis $RA_b$, which in turn can result in further rotation of the basket unit 500.

In some embodiments, the biasing member 650 can motivate at least one of the bosses 622a, 622b on the ratchet member 610 to traverse along (e.g., slide relative to) the second ramp 644. This is because the biasing force from the biasing member 650 is encouraging the second end 634 of the ratchet follower 630 generally upwardly. That force can be transmitted through the ratchet follower 630 to the engagement between the second ramp 644 and the boss 622a. As the second ramp 644 is at an angle relative to the direction of the transmitted biasing force, the boss 622a can be encouraged to traverse (e.g., slide down) a portion of the second ramp 644. In some embodiments, movement of the boss 622a along the second ramp 644 results in further rotation of the ratchet member 610, and thus the basket unit 500. In some embodiments, such rotation of the ratcheting member 610 via the engagement of the boss 622a and the second ramp 644 rotates the ratchet member 610 even when the projection 724 and/or wing 726 of the collar 700 are not engaged with the arm of the ratchet member 610.

Figure 13:
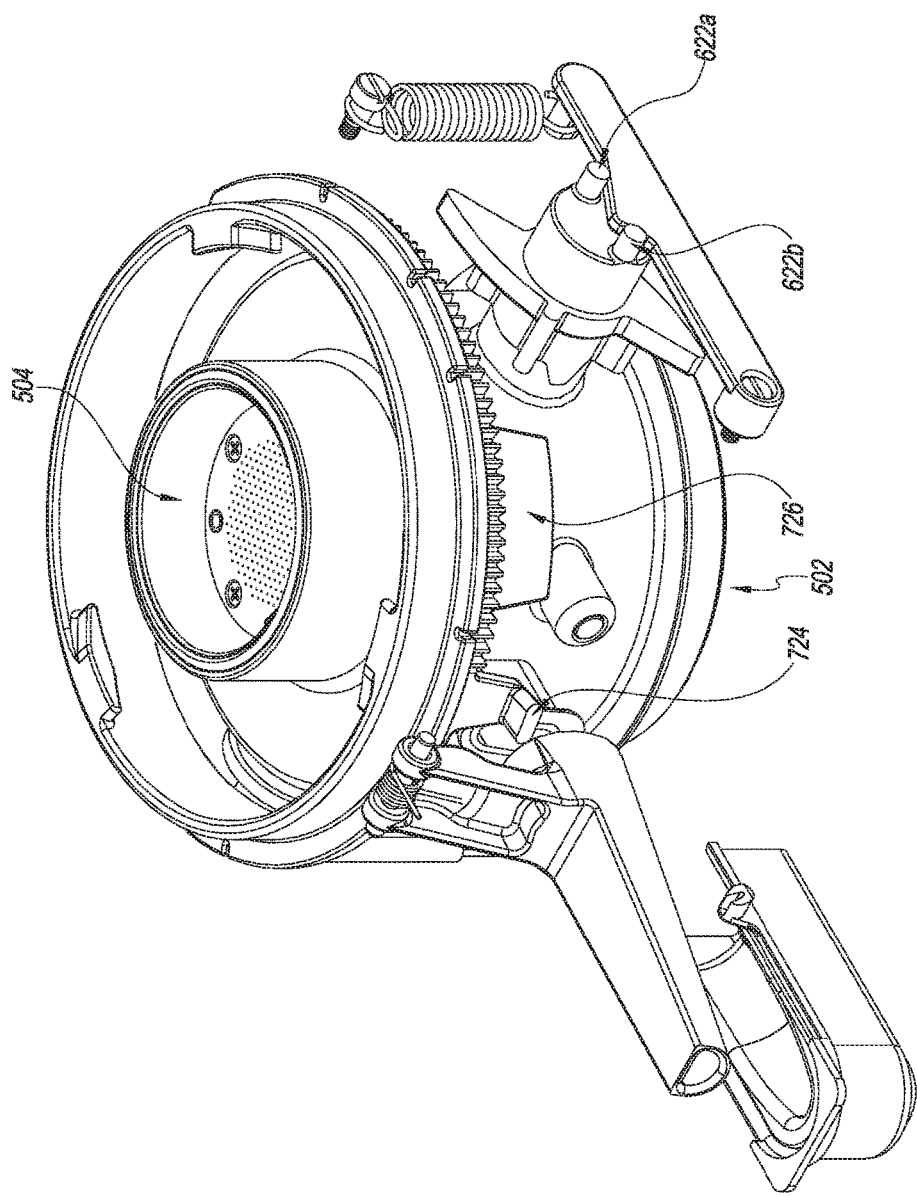
FIG. 13 illustrates a perspective view of the beverage production assembly of FIG. 4C in a position to accept a second type of cartridge for producing a second type of beverage.

As shown in FIGS. 13 and 13A, as the basket unit 500 nears the end of the rotational movement, the boss 622b that had been separated from the ratchet follower 630 can engage the first ramp 642. This can aid in stabilizing the basket unit 500 and/or ratchet member 610, and/or can facilitate additional rotational movements, as discussed in further detail below.

FIGS. 13 and 13A illustrate the basket unit 500 at the conclusion of the rotational movement discussed above. As shown, the second chamber 504 is oriented generally upwardly and the first chamber 502 is oriented generally downwardly. Thus, between FIGS. 9 and 13A, the basket unit 500 has made approximately one half of a complete revolution (also called a half flip).

VIII. Second Chamber Dispensing

Figure 14B:
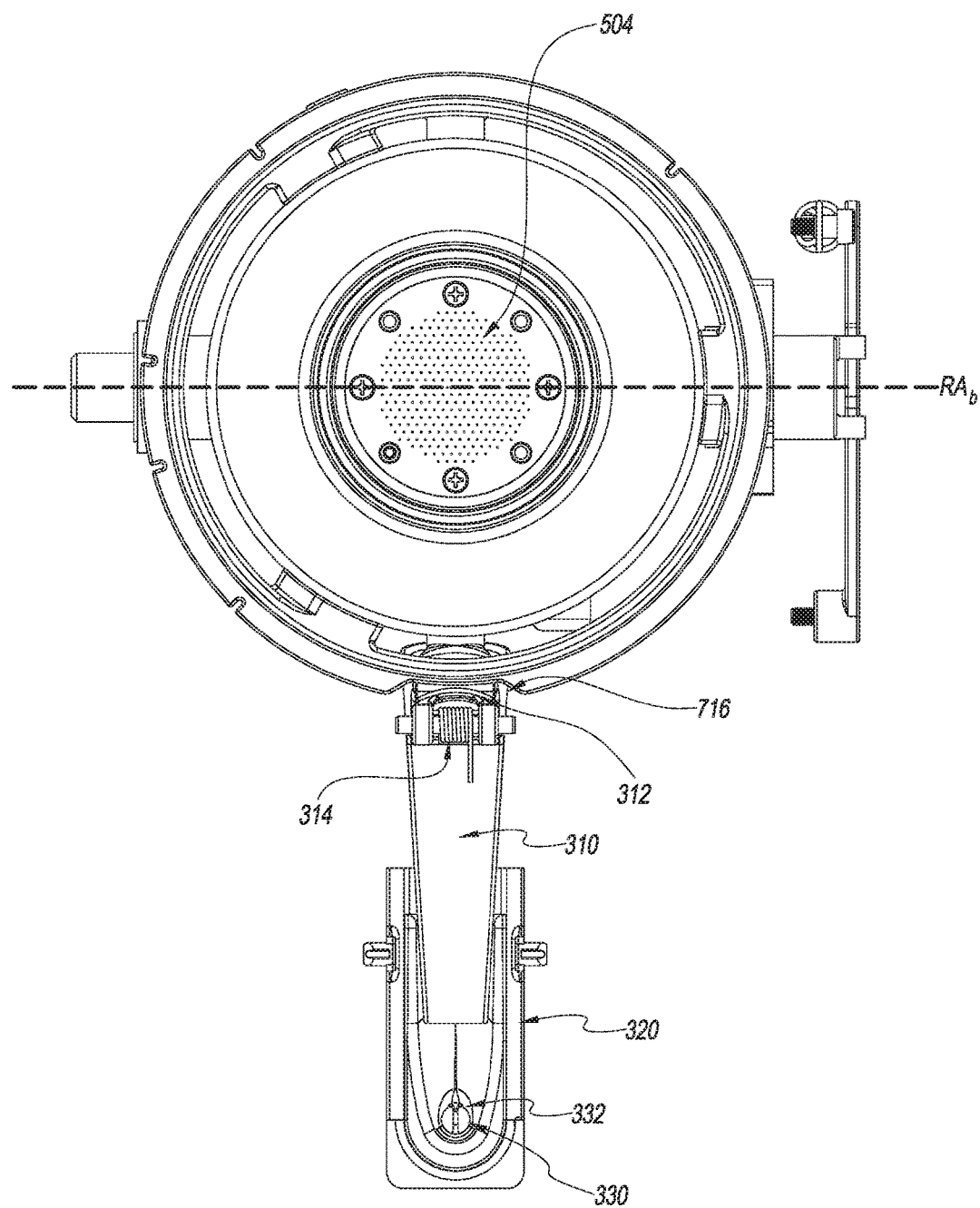
FIG. 14B illustrates a top view of the beverage production assembly of FIG. 14.
Figure 15:
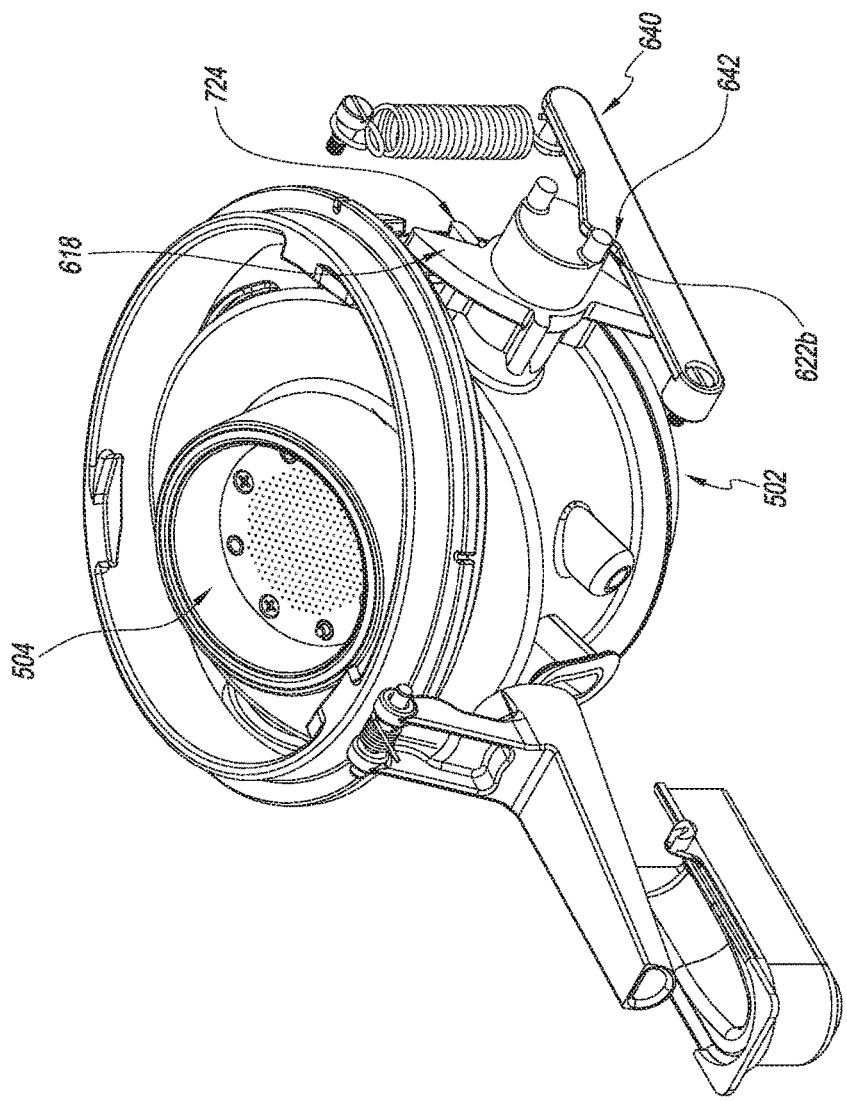
FIGS. 15, 16, 17, and 18 illustrate perspective views of the beverage production assembly of FIG. 4C in various stages of another rotating operation.
Figure 15A:
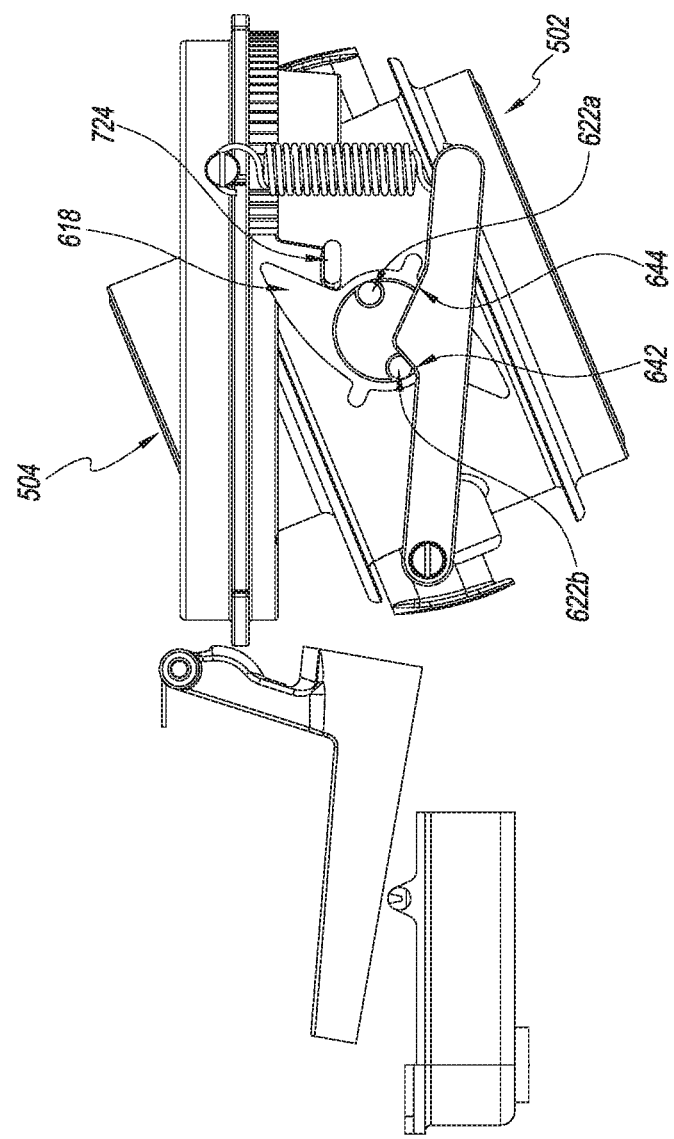
Figure 16:
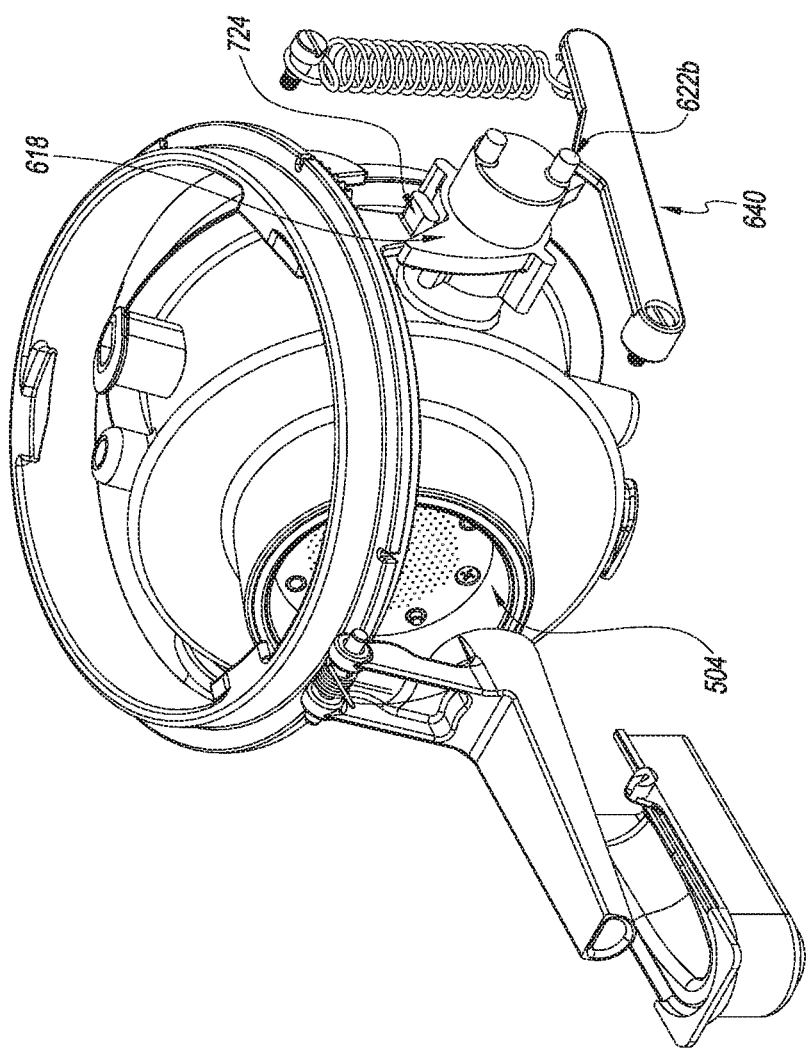
Figure 16A:
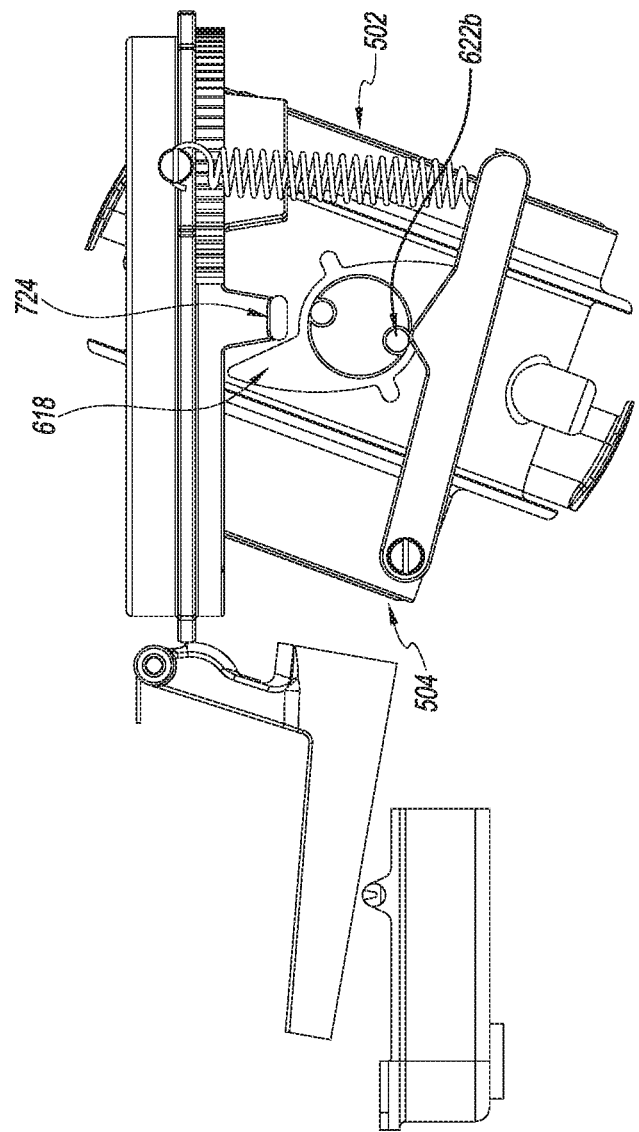

With regard to FIGS. 14, 14A, and 14B, the beverage production assembly 400 is shown in a state for dispensing a liquid beverage from the second chamber 504. In this state, the dispensing assembly 300 is in fluid communication with the second outlet port 542 of the basket unit 500. In various embodiments, a liquid (e.g., water) can be introduced into a cartridge (not shown) located in the second chamber 504 to produce the beverage. The beverage can exit the cartridge (e.g., via a porous bottom), pass through the bottom of the second chamber 504, through the second conduit 538, and into the passage in the pivoting member 310. In some embodiments, during the dispensing process, the beverage flows from the basket unit 500 to the dispensing assembly 300 in a direction substantially perpendicular to the axis $RA_b$. In certain variants, during the dispensing process, the beverage flows from the basket unit 500 to the dispensing assembly 300 in a direction that is not perpendicular to (e.g., generally parallel with) the axis $RA_b$.

In some embodiments, whether the dispensing assembly is in fluid communication with the basket unit 500 is a function of the position of the collar 700. For example, in the illustrated embodiment, the collar 700 has rotated into a position such that the notch 716 in the flange 714 of the collar 700 is circumferentially aligned with the cam 312 on the pivoting member 310 of the dispensing assembly 300. This can result in the bias of the biasing member 314 (e.g., torsional spring) encouraging the cam 312 into the notch 716, which in turn can result in the pivoting member 310 moving toward the second outlet port 542 of the basket unit 500. This can provide a fluid communication path between the second outlet port 542 of the basket 500 and the passage of the pivoting member 310 of the dispensing assembly 300. As shown, in certain embodiments, the pivoting member 310 can receive some or all of the second outlet port 542 of the basket 500. As shown, the pivoting member 310 is angled downward, thereby allowing the liquid to flow down the passage 316 and into the catch member 320 by force of gravity. The liquid can flow from the catch member 320 to the dispensing nozzle 330 for dispensing to the cup 101 or other vessel.

In certain variants, the catch member 320 is configured to encourage the liquid to flow toward and out of the dispensing nozzle 330. For example, the catch member 320 can be configured to pivot such that an end of the catch member 320 with the dispensing nozzle 330 is lower than an opposite end of the catch member 320. For example, the catch member 320 can include hinge features, such as pins, that pivotally connect with other portions of the machine 100, such as with the frame 125. During the dispensing portion of the beverage preparation process, the catch member 320 can be pivoted (e.g., by an actuator or other mechanism) such that gravity encourages the liquid to flow toward and through the dispensing nozzle 330.

In some implementations, the catch member 320 can include a funnel member 322 in communication with the pivoting member 310 during dispensing of the beverage. The funnel member 322 can be inclined, with a lower portion at or near an inlet 332 of the dispensing nozzle 330, thereby allowing gravity to encourage the liquid to flow toward and out of the dispensing nozzle 330. In certain embodiments, because the funnel member 322 is configured to encourage flow of the liquid in the funnel member 322 during dispensation to the cup 101, the funnel member 322 can reduce the likelihood of liquid remaining in the catch member 320. This can inhibit or avoid dripping from the funnel member 322 and/or the dispensing nozzle 330. In some embodiments, the funnel member 322 includes a low friction material and/or coating, which can reduce the chance and/or amount of liquid residue remaining in the funnel member 322.

IX. Rotation from Second Chamber to First Chamber

FIGS. 15-18A illustrate an another rotational operation of the multi-chamber basket 500. In these figures, the second chamber 504 is rotated from an upward position to a downward position, and the first chamber 502 is rotated from a downward position to an upward position. Thus, at the conclusion of FIGS. 15-18A, the first and second chambers 502, 504 return to approximately the position shown in FIG. 8. During the rotating operation of FIGS. 15-18A, the basket unit 500, ratchet assembly 600, and collar 700 undergo similar movements to those described above in connection with FIGS. 9-12A.

For example, as shown in FIGS. 15, 15A, 16, and 16A, rotational movement of the collar 700 engages the projection 724 of the leg of the collar 700 with the arm 618 of the ratchet member 610. This can transfer the rotational movement of the collar 700 along the axis $RA_C$ into rotational movement of the ratchet assembly 600 and basket unit 500 along the axis $RA_B$. The rotation of the ratchet member 610 can rotate the bosses 622*a*, 622*b* on the ratchet member 610 relative to the ratchet follower 630. This results in at least one of the bosses 622*a*, 622*b* (e.g., the second boss 622*b*) sliding up the first ramp 642, which encourages the ratchet follower 630 to move against the bias of the biasing member 650.

Figure 17:
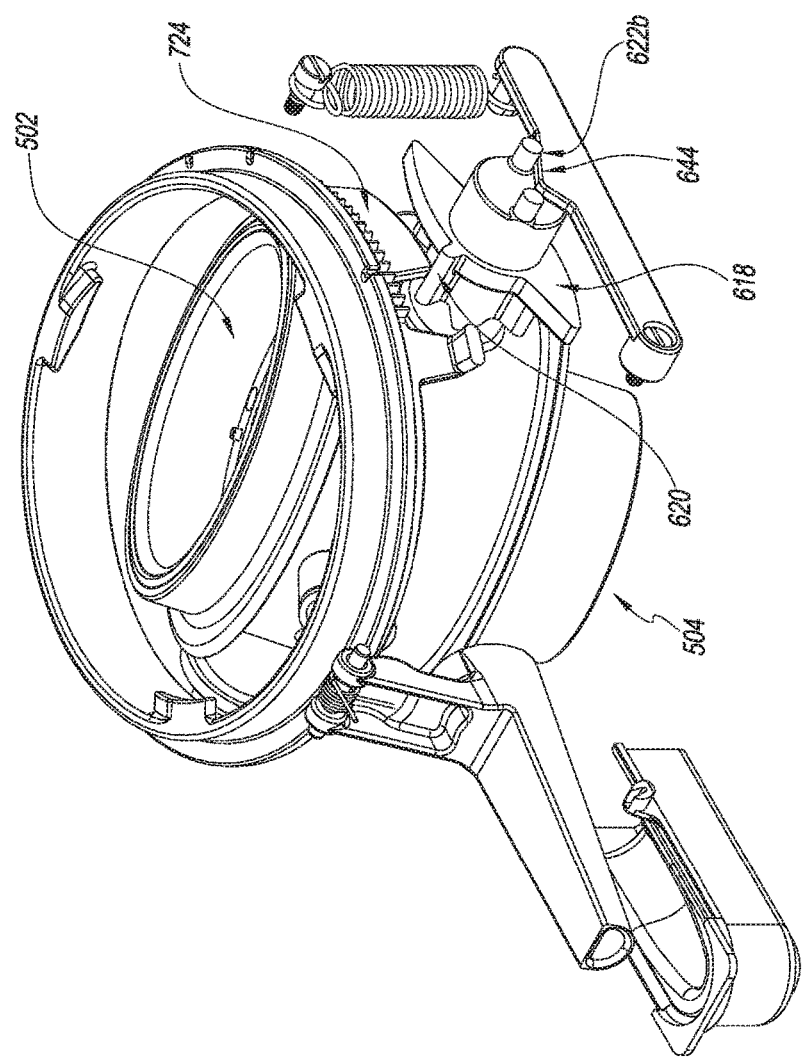

As shown in FIGS. 17 and 17A, further rotation of the collar 700 engages the wing 724 of the collar 700 against the rib of the ratchet assembly 600. Such engagement can further rotate the ratchet assembly 600 and basket unit 500. Moreover, further rotation of the collar 700, and thus the ratchet member 610, can cause the boss 622*b* can slide down the second ramp 644, which allows the biasing member 650 to move (e.g., pivot) the ratchet follower 630, such as pivoting generally upwardly.

Figure 18:
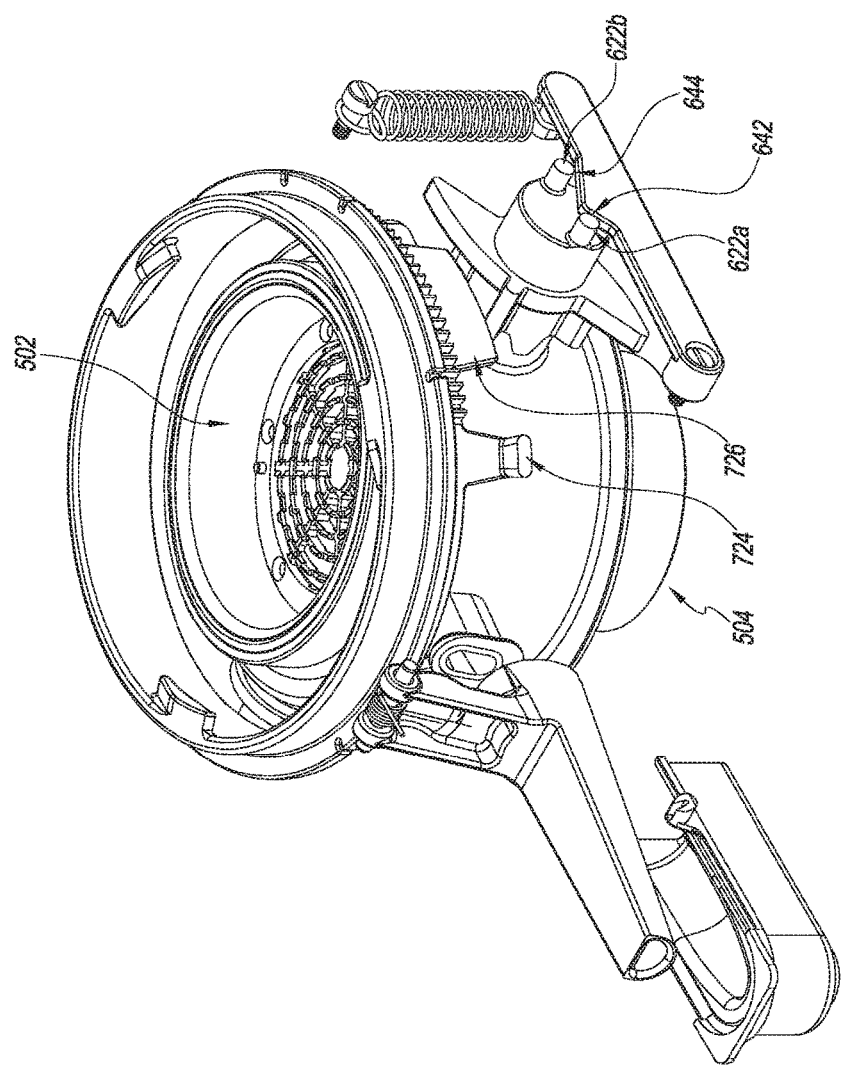

In some embodiments, rotation of the ratchet assembly 600 and basket unit 500 are further encouraged by the bias of the biasing member 650 on the second end 634 of the ratchet follower 630 and/or because of the engagement between at least one of the bosses 622*a*, 622*b* on the ratchet assembly 600 and at least one of the ramps 642, 644 on the ratchet follower 630. For example, as shown in FIGS. 18 and 18A, even when the collar 700 is not engaged with the ratchet member 610, the cam action between at least one of the bosses 622*a*, 622*b* on the ratchet assembly 600 and at least one of the incline ramps 642, 644 on the ratchet follower 630 (e.g., because of the biasing force provided by the biasing member 650) can facilitate rotation of the ratchet member 610 and basket unit 500.

Figure 19:
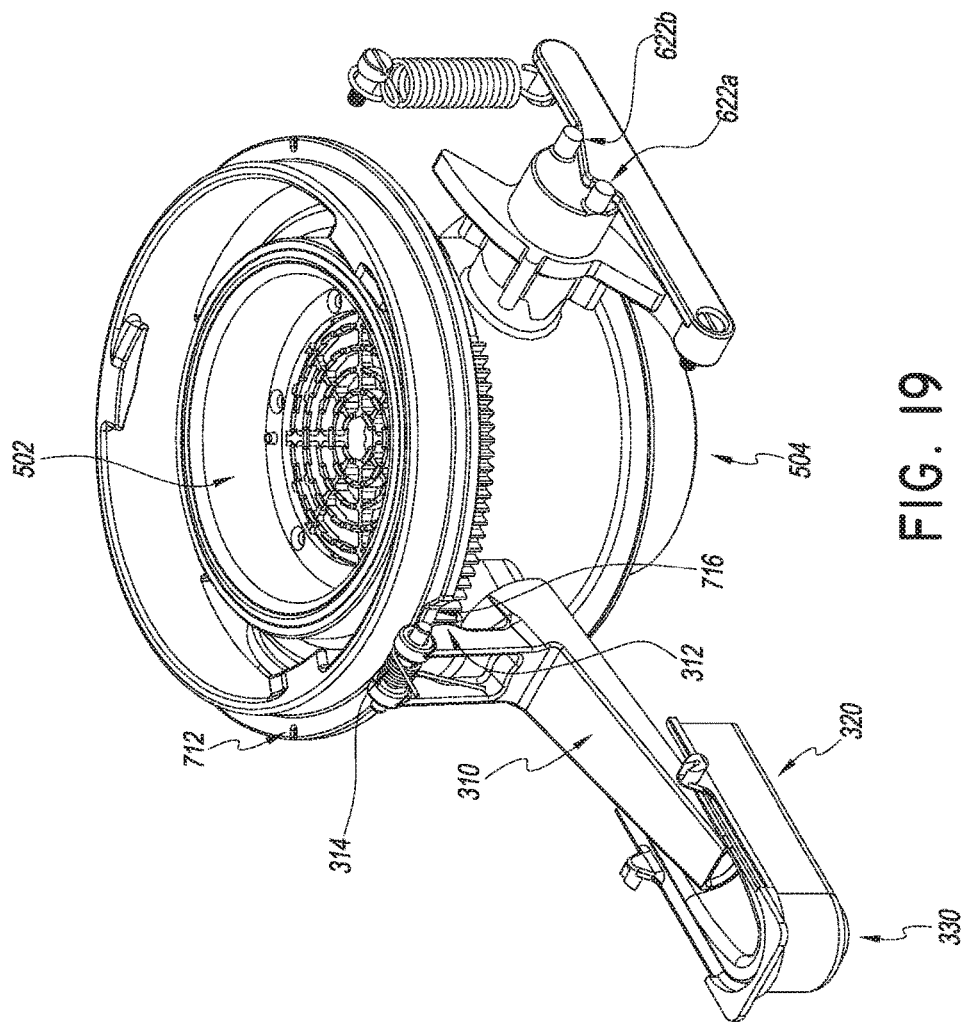
FIG. 19 illustrates a perspective view of the beverage production assembly of FIG. 4C in a configuration for dispensing the first type of beverage.
Figure 19B:
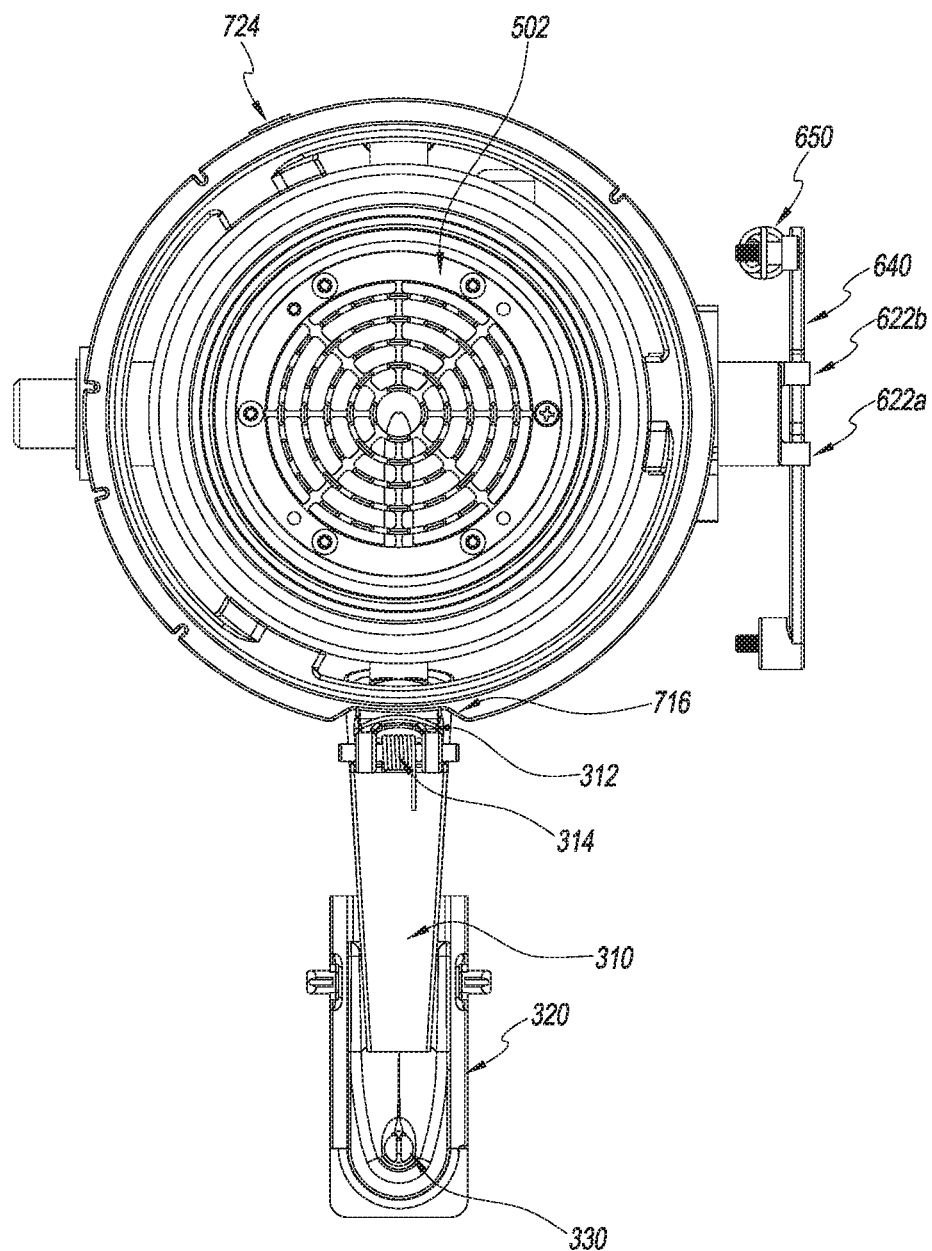
FIG. 19B illustrates a top view of the beverage production assembly of FIG. 19.

With reference to FIGS. 19, 19A, and 19B, the basket unit 500 is shown in a state at the conclusion of the rotational operation of FIGS. 15-18A. In this state, the basket unit 500 has returned to the state of FIG. 8. For example, the first chamber 502 is oriented generally upwardly and the second chamber 504 is oriented generally downwardly. As such, between FIGS. 15 and 18A, the basket unit 500 has made approximately a second half of a complete revolution. Moreover, between FIGS. 8 and 18A, the basket unit 500 has made approximately one complete revolution (also called a full flip).

X. First Chamber Dispensing

FIGS. 19, 19A, and 19B also illustrate that the dispensing assembly 300 can move into a position for dispensing a liquid beverage from the first chamber 502. As shown, the collar 700 can be rotated such that the notch 716 on the flange 714 is circumferentially aligned with the cam 312 on the pivoting member 310 of the dispensing assembly 300. This can result in the cam 312 being partially received in the notch 716 (e.g., due to the bias of the biasing member), thereby allowing the pivoting member 310 to rotate toward the basket unit 500. This can place the passage of the pivoting member 310 in fluid communication with the first outlet port 540 of the basket unit 500.

Similar to the description above in connection with FIG. 14, liquid (e.g., water) can be introduced into a cartridge in the first chamber 502 to produce a beverage. The beverage can exit the cartridge (e.g., via a porous bottom), flow through the bottom of the chamber 502, and pass through the first conduit 536 to the first outlet 540. The beverage can continue through the passage in the pivoting member 310 of the dispensing assembly 300 and into the catch member 320. As shown, the pivoting member 310 can be angled downward, which can encourage the flow of beverage through the passage 316 by force of gravity. The beverage can flow out of the dispensing nozzle into the cup 101 or other vessel.

XI. Reset Operations

Figure 20A:
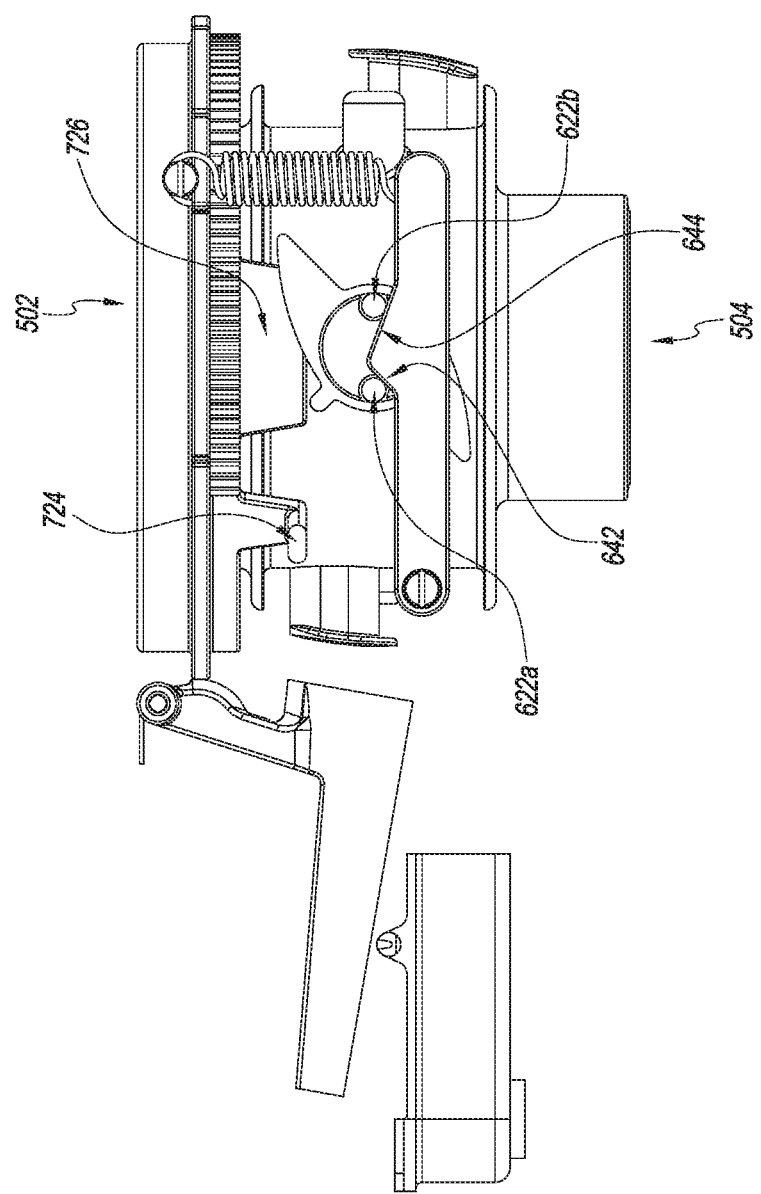

In certain implementations, the beverage production assembly can perform a reset operation. During the reset operation the rotational direction of the collar 700 is reversed. For example, the collar 700 can rotate a first direction (e.g., clockwise) during the flip operations (e.g., the half flip of FIGS. 9-12A, the half flip of FIGS. 15-18A, and/or the full flip of FIGS. 9-12A and 15-18A), and can rotate a second direction (e.g., counterclockwise) during the reset operation. FIG. 20 illustrates an example of the collar 700 undergoing reverse rotation.

In various implementations, during the reverse-rotation of the collar 700, engagement between certain components can be reduced or avoided. This can facilitate circumferentially positioning the collar 700 relative to the ratchet member 610 without flipping the basket unit 500. For example, in some embodiments, during the reverse-rotation of the collar 700, the wing 726 can rotate beyond the ratchet member 610 without flipping the basket unit 500. In some embodiments, the wing 726 of the collar 700 is configured to pass behind the arm 618 of the ratchet assembly 600 (e.g., between the arm and the basket unit 500), thereby not engaging the arm 618. In some embodiments, the wing 726 can pass over (e.g., be vertically spaced apart from) the rib 620 of the ratchet assembly 600, thereby not engaging the rib 620.

Figure 21:
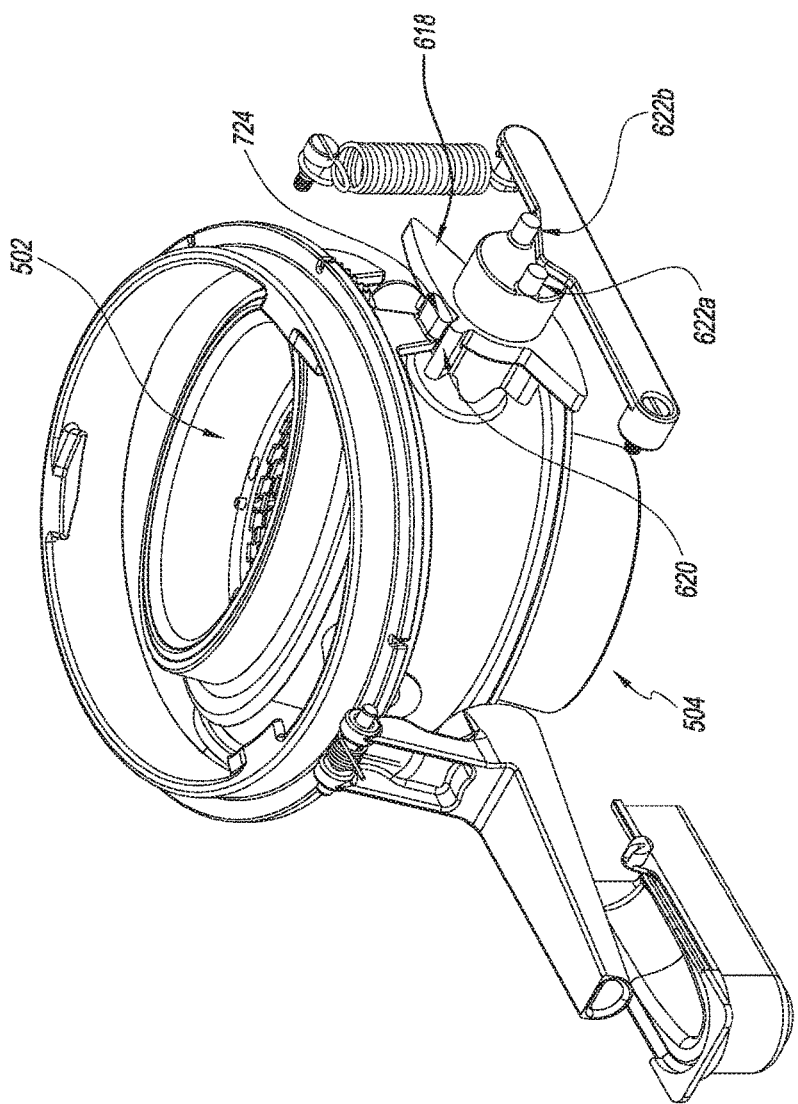
Figure 21A:
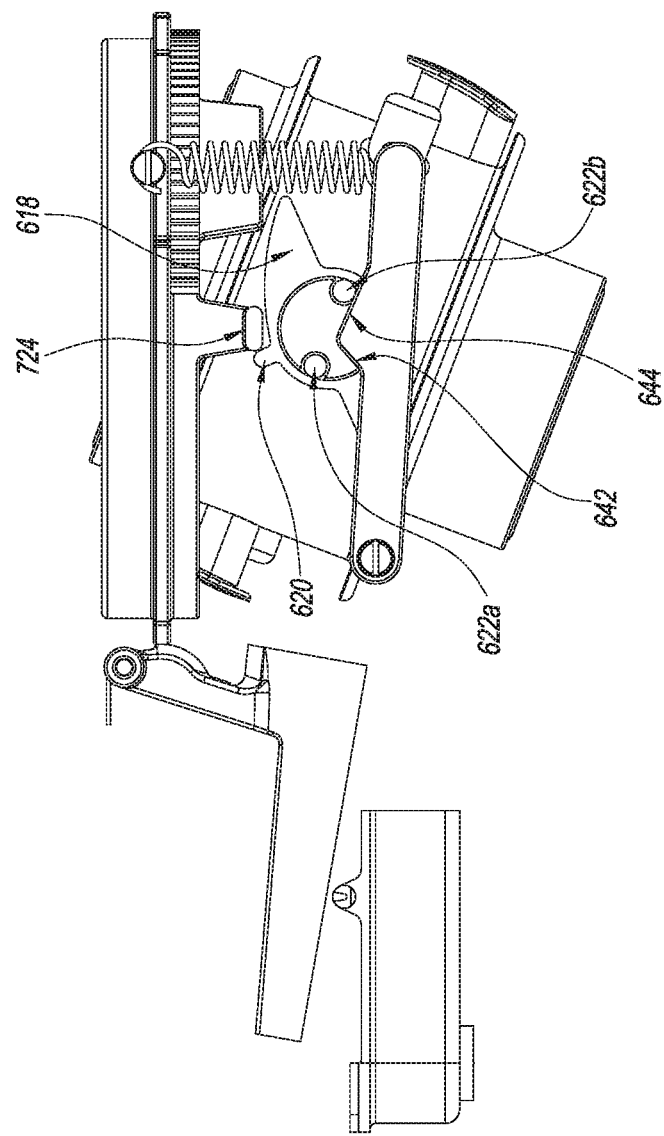
Figure 22:
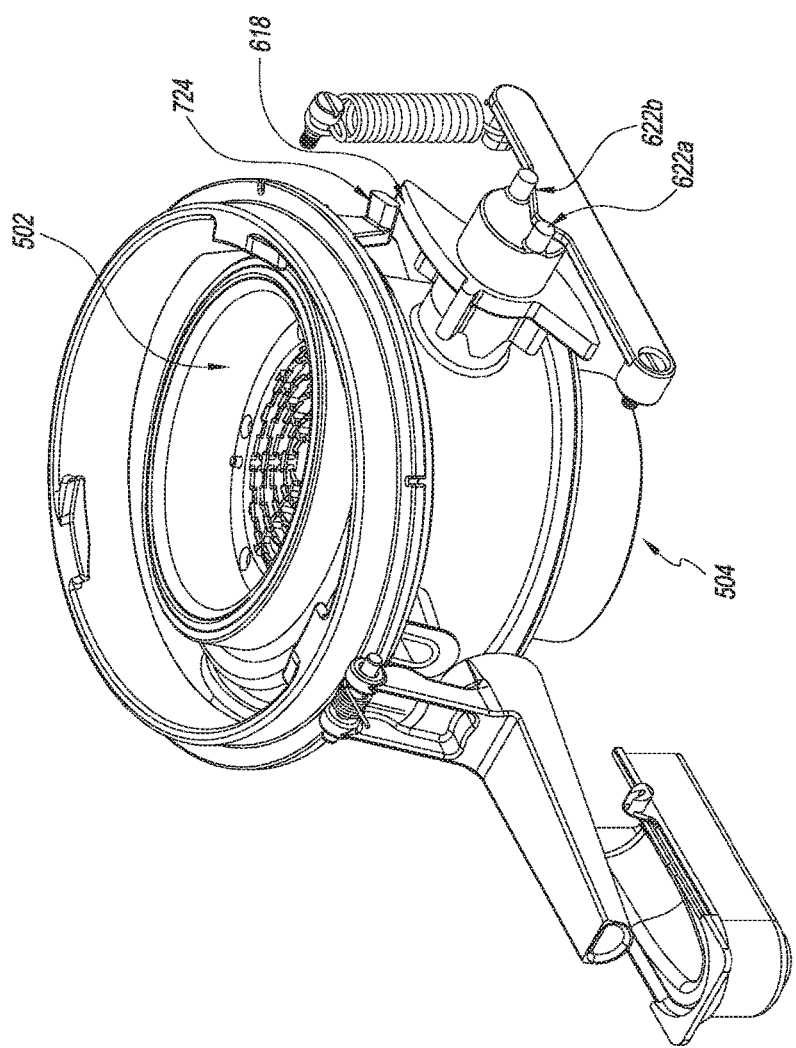
Figure 22A:
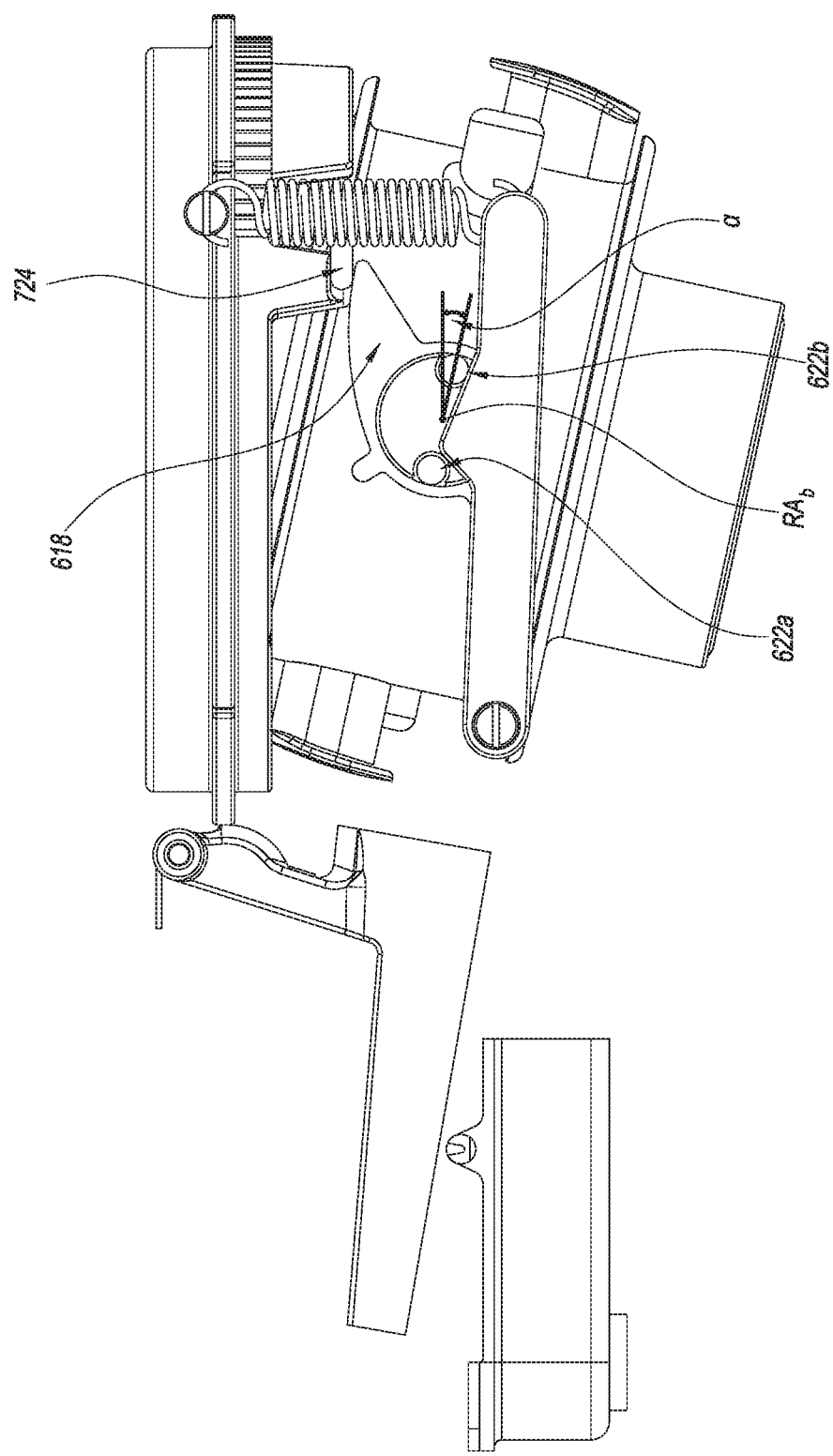
Figure 24:
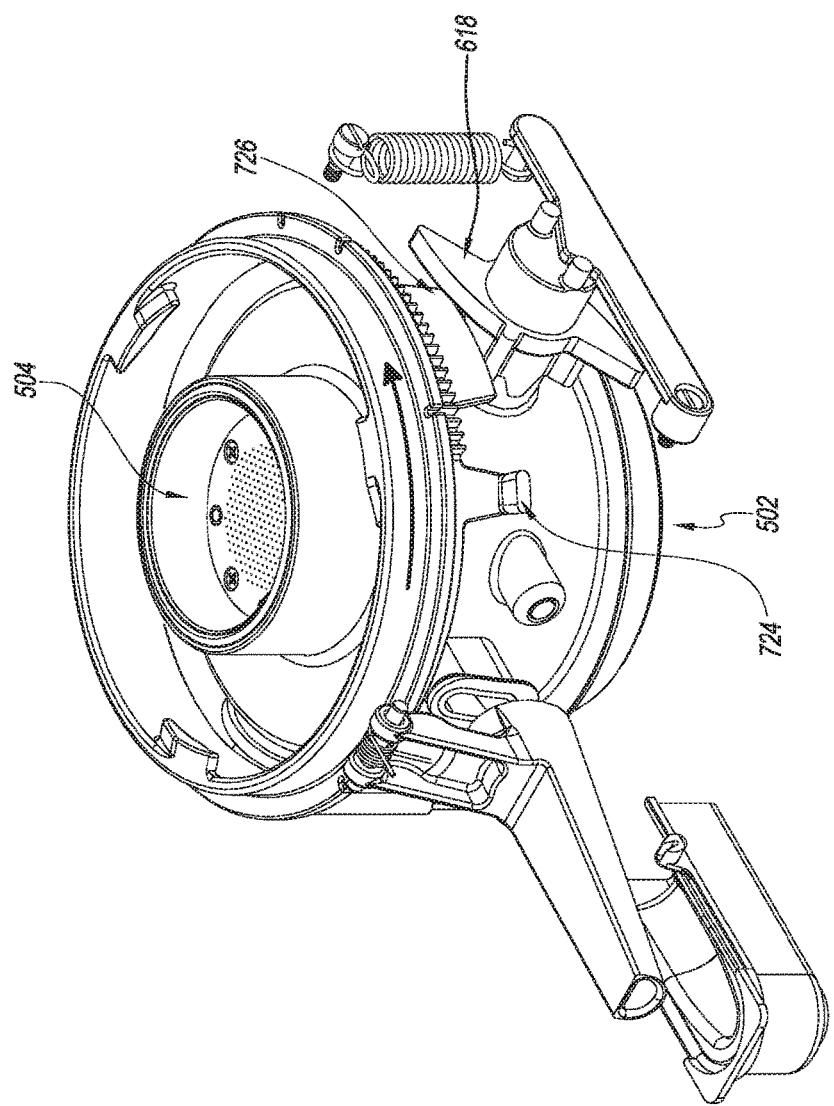
Figure 24A:
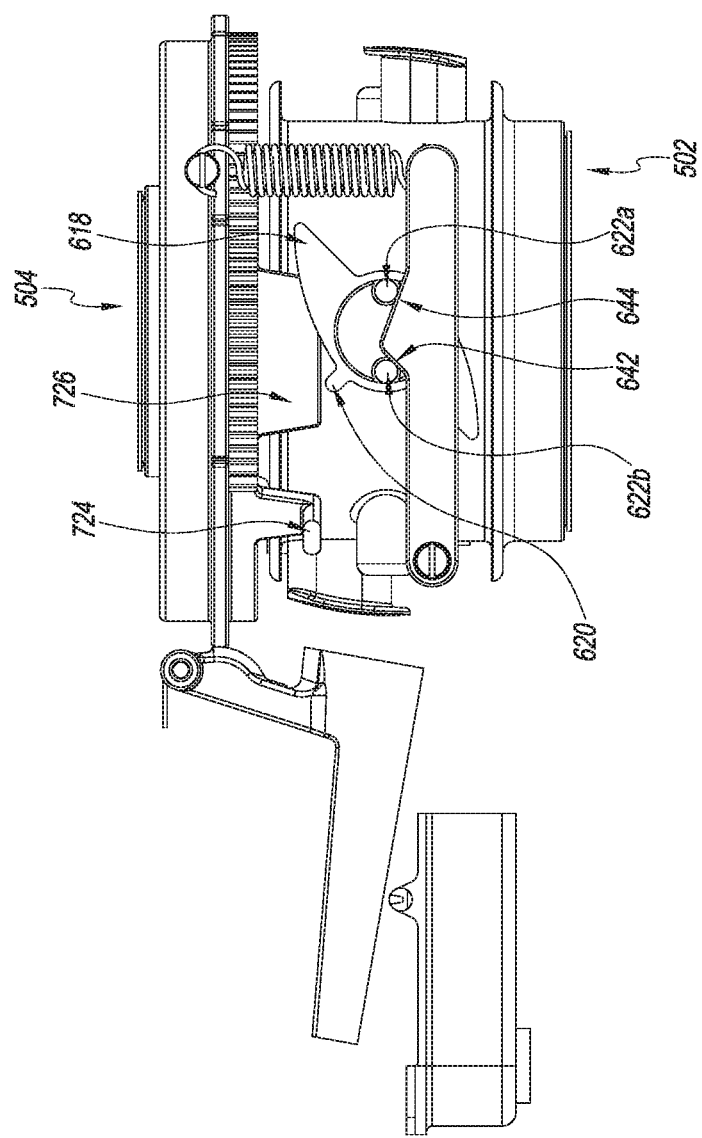
FIGS. 24A, 25A, 26A, and 27A illustrate side views of the beverage production assembly of FIGS. 24-27, respectively.
Figure 25A:
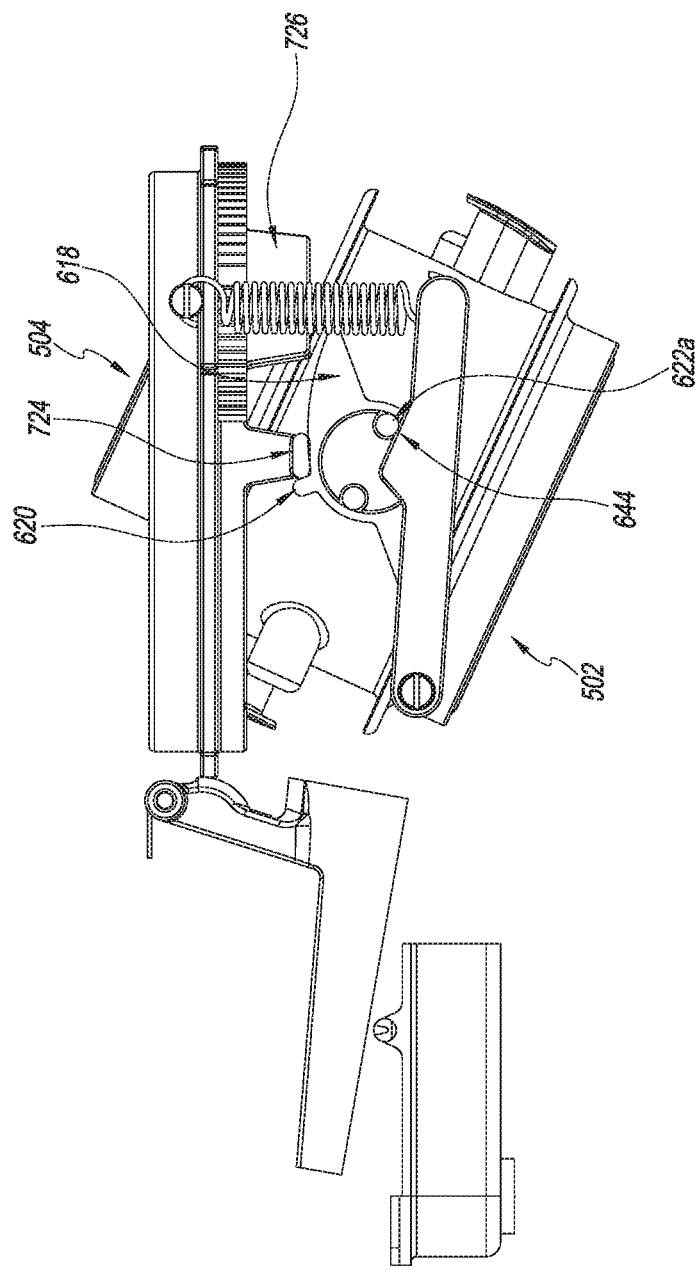
Figure 26:
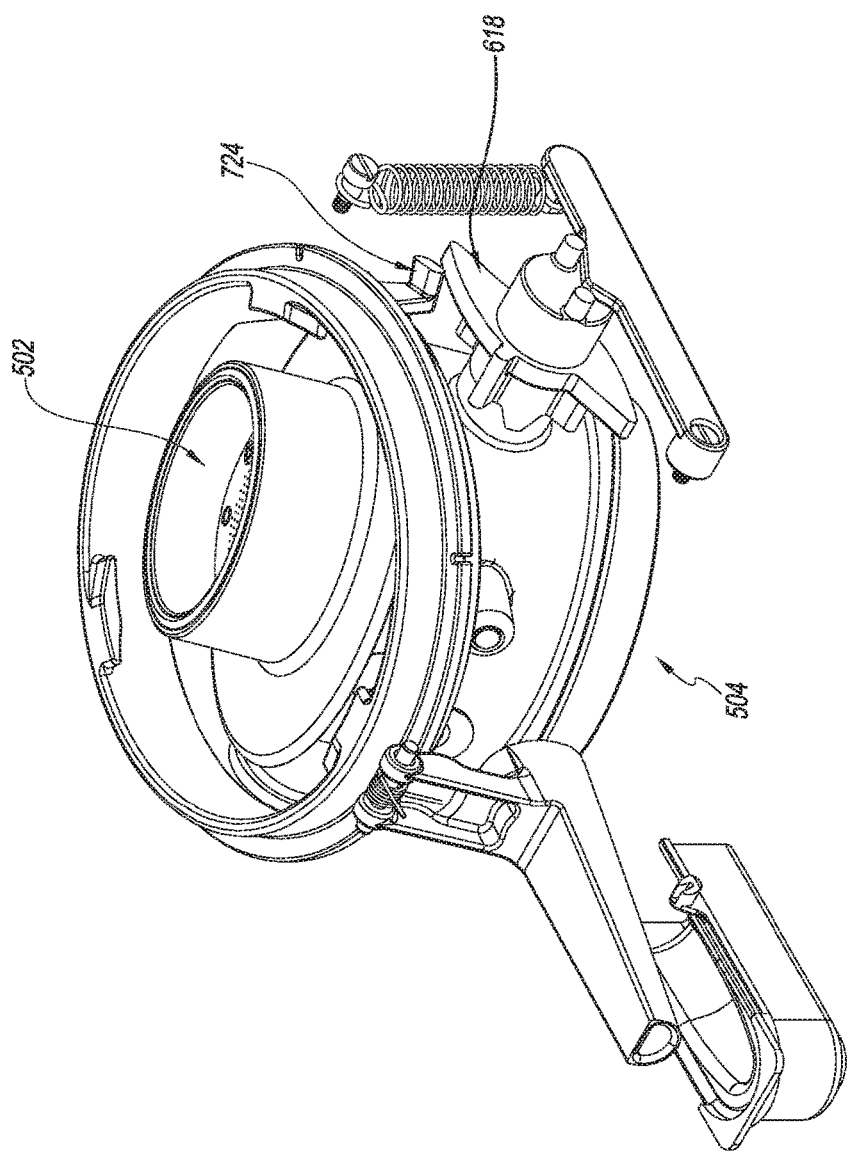
Figure 26A:
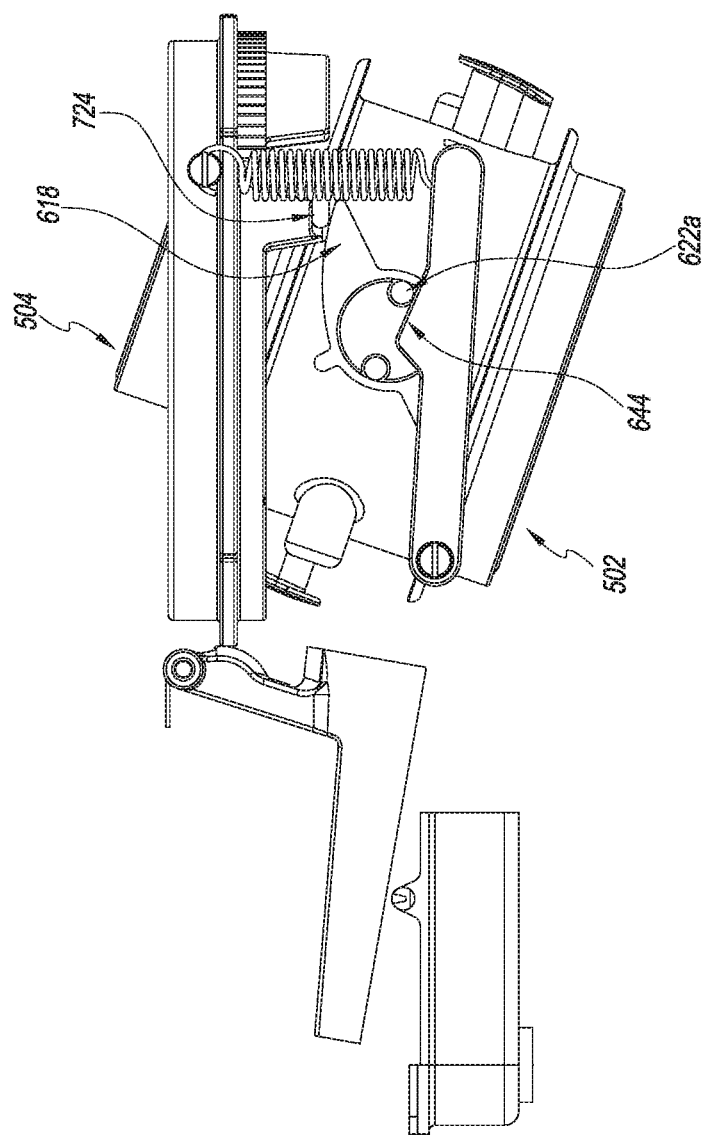

FIGS. 20-23A illustrate a reset operation when the first chamber 502 is oriented generally upwardly. As shown in FIGS. 21-22A, the reverse-rotation of the collar 700 engages the projection 724 on the collar 700 with the first surface 618*a* on the arm 618 of the ratchet assembly 600. As the collar 700 continues to reverse-rotate, the projection 724 slides along the first surface 618*a* of the arm 618. This can result in a slight reverse-rotation of the ratchet member 610, as well as the basket unit 500. As shown in FIG. 22A, the basket 500 can reverse-rotate an angle γ, which is the angular displacement of the basket unit 500 from the horizontal position (as shown in FIG. 20A). In some embodiments, the angle γ of the basket unit 500 is less than or equal to about: 10°, 15°, 20°, 25°, 30°, 45°, values between the aforementioned values, or otherwise. As shown, the reverse-rotation of the ratchet member 610 can cause one of the bosses 622*a*, 622*b* to slide generally upwardly along the second ramp 642. This encourages the ratchet follower 630 to pivot (e.g., generally downwardly) against the bias of the biasing member 650.

As illustrated in FIGS. 23 and 23A, with still further reverse-rotation of the collar 700, the projection 724 on the collar 700 can disengage from the arm 618 on the ratchet member 610. As such, the projection 724 of the collar 700 no longer presents an interference with the arm 618 of the ratchet member 610. In some such instances, the biasing member 650 encourages movement of the ratchet follower 630 (e.g., generally upward), which results in the boss 622*b* sliding down the second ramp 644. This results in the ratchet member 610 rotating back to its rest position, as shown. The collar 700 thus has rotated beyond the ratchet member 610 without flipping the basket unit 500. As shown, after the reset operation, the projection 724 on the collar 700 is positioned so as to readily engage the second surface 618b of the arm 618 of the ratchet member 610. Thus, the projection 724 can be positioned to execute a flip operation, as discussed above in connection with FIGS. 9-12A.

Figure 27:
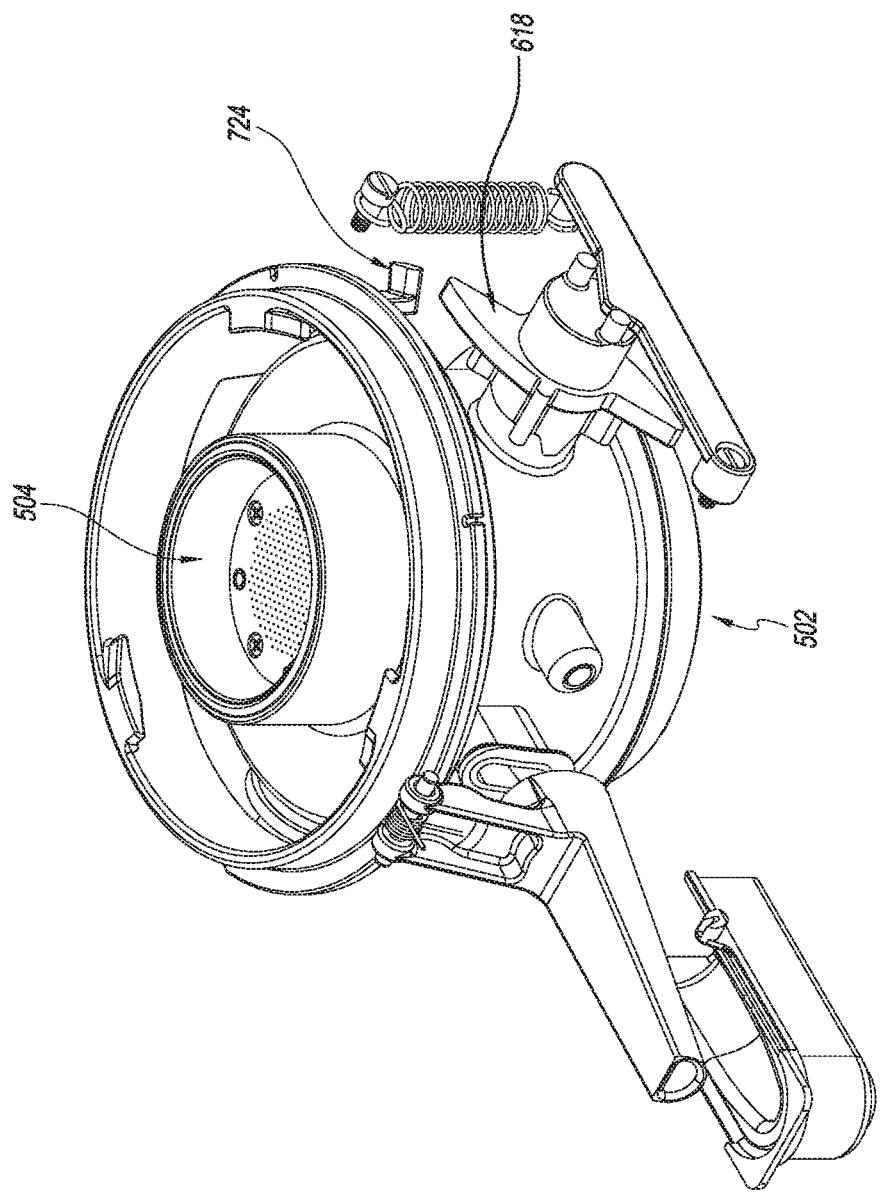
Figure 27A:
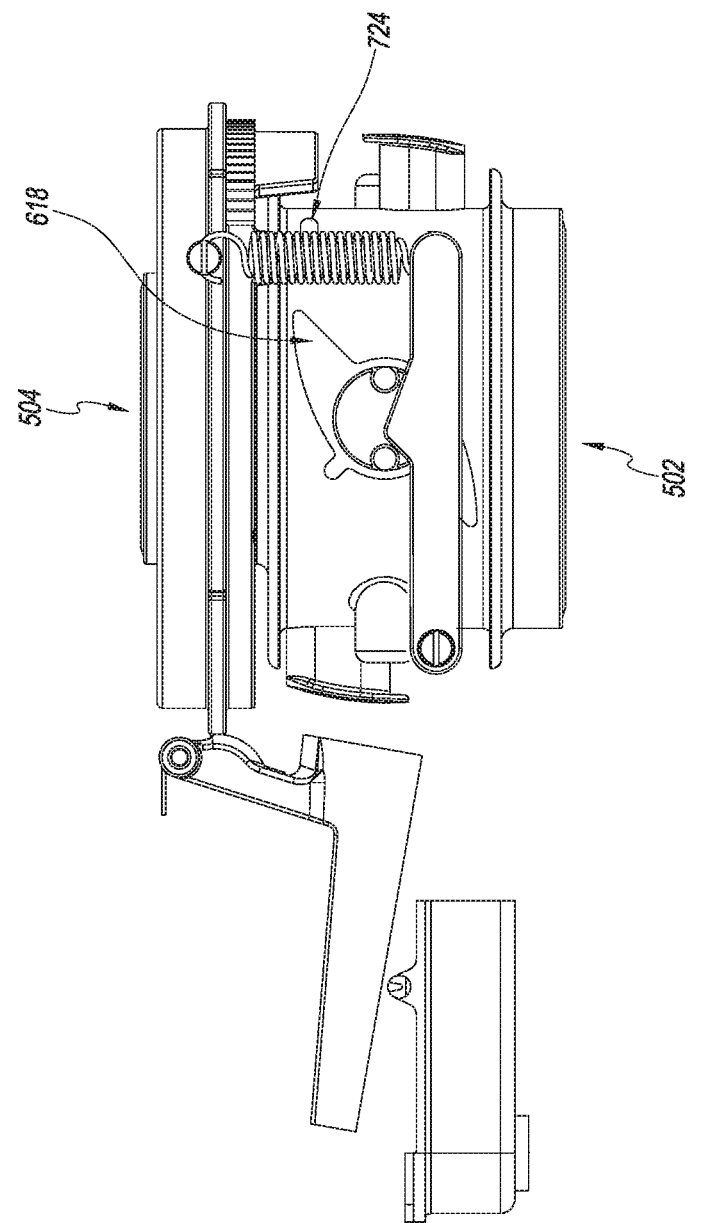

FIGS. 24-27A illustrate a reset operation when the second chamber 504 is oriented generally upwardly. The reset operation shown in FIGS. 24-27A is similar to the reset operation discussed above in connection with FIGS. 20-23A. For example, when the collar 700 reverse-rotates, the projection 724 on the collar 700 can engage the first surface 618a of the arm on the ratchet member 610. This can result in a slight reverse-rotation of the ratchet member 610, as well as the basket unit 500, during the engagement of the projection 724 and the arm 618. When the projection 724 rotates out of engagement with the arm 618 of the ratchet assembly 600, the bias of the biasing member 650 on the ratchet follower 630 can encourage the ratchet member 610 and basket unit 500 to return to the rest position, as shown in FIGS. 27 and 27A.

XII. Certain Operational Modes

As noted above, embodiments of the beverage production assembly 400 can produce multiple types of beverages. In some embodiments, the first chamber 502 is adapted for producing a first type of beverage type and the second chamber 504 is adapted for producing a second beverage type. For example, the first chamber 502 in the basket unit 500 can be for producing brewed coffee beverages and the second chamber 504 can be for producing espresso beverages. The rotation of the basket unit 500 can facilitate producing such a multiplicity of beverage types and/or can transition the beverage production assembly 400 from being configured to produce one beverage type to being configured to produce another beverage type.

For example, in the situation that the first cartridge 502 is in the loading position, yet the beverage desired is prepared using the second chamber 504, the basket unit 500 can rotate (e.g., at least about 170°) to bring the second chamber 504 to the loading position. An example of such a rotational operation is shown above in FIGS. 9-13A, in which the first chamber 502 rotates from the top portion to the bottom portion of the basket unit 500 (e.g., from the loading position to the inverted position), and the second chamber 504 rotates from the bottom portion to the top portion of the basket unit 500 (e.g., from the inverted position to the loading position). The second chamber 504 can thus be positioned for loading of the desired cartridge, after which the beverage production process can proceed.

In the reverse situation, in which the second cartridge 504 is in the loading position, yet the beverage desired is prepared using the first chamber 502 (e.g., a brewed coffee drink), the basket unit 500 can rotate (e.g., at least about 180°) to bring the first chamber 502 to the loading position. Such a rotational operation is shown above in FIGS. 15-18A, in which the second chamber 504 rotates from the loading position to the inverted position, and the first chamber 502 rotates from the inverted position to the loading position. The first chamber 502 can thus be positioned for loading of the desired cartridge, after which the beverage production process can proceed.

In several embodiments, when rotating from one chamber being in the loading position to another chamber being in the loading position, the basket unit 500 rotates at least about: 45°, 90°, 135°, 170°, 175°, 180°, 185°, 190°, 225°, 270°, values between the aforementioned values, or otherwise.

As noted above, after a cartridge has been loaded in the chamber that is appropriate for the type of beverage to be made, the beverage production process can proceed. After that process has occurred and the beverage has been dispensed, the beverage production assembly 400 can be moved into a configuration to expediently execute another rotation of the basket unit 500. This can reduce the time a user may have to wait before being able to load another cartridge into the basket unit 500. For example, after the dispensing operations shown in FIGS. 15B and 19B, the projection 724 on the collar 700 can be rotated so as to be positioned at or near the ratchet member 610, such as the position of the collar 700 shown in FIG. 8. This can aid in readying the beverage production assembly 400 for a further rotational operation.

In certain situations, a user may wish to produce multiple consecutive beverages of the same type. For example, a first brewed coffee beverage may have been produced, then the user may scan (e.g., by providing the cartridge to the reader) another cartridge to instruct the machine 100 to produce another brewed coffee beverage. In some embodiments, when that situation occurs, the basket unit 500 makes a two half rotations (also called one full rotation) of the first chamber 502 after the first beverage has been produced and dispensed. The first half rotation includes moving the first chamber 502 from the loading position to the inverted position, as is shown in FIGS. 9-13A. The second half rotation includes moving the first chamber 502 from the inverted position to the loading position, as is shown in FIGS. 15-18A.

In some embodiments, for the first half rotation, the projection 724 on the collar 700 is already in position for engaging the ratchet member 610. For example, as such was previously discussed, after preparing the first brewed coffee beverage, the projection 724 can be rotated so as to be positioned at or near the ratchet member 610, such as the position of the collar 700 shown in FIG. 8. Thus, the projection 724 can be positioned to readily engage the ratchet member 610 to execute the first half rotation.

As shown in FIG. 13, at the conclusion of the first half rotation, the projection 724 is not in a position to readily engage the ratchet member 610 to execute a rotation of the basket unit 500. To alleviate this, in some embodiments, the collar 700 rotates as normal to put the projection 724 in position of FIG. 8. Certain other embodiments reverse the rotation of the collar 700 with the reset operation, as previously discussed and shown in FIGS. 20-23A. This can decrease the circumferential distance traveled by the projection 724 and/or the amount of time required to put the projection in position to readily engage the ratchet member 610 to execute the second half rotation of the basket unit 500.

In various embodiments, the two half (or one full rotation) operation described above can aid in ejecting or otherwise removing the cartridge in the first chamber 502. For example, when the first chamber 502 is oriented downward (e.g., in the inverted position or otherwise tilted downward), the cartridge can be encouraged out of the chamber by force of gravity. As such, when the first chamber 502 is returned to the loading position, it can be configured to accept another cartridge.

Although the example above involves preparing consecutive beverages using the first chamber 502, similar operations could be used to prepare consecutive beverages using the second chamber 504. For example, in the first half rotation, the second chamber 504 can be rotated from the loading position to the inverted position, as is shown in FIGS. 15-18A. During the second half rotation, the first chamber 502 can be rotated from the inverted position to the loading position, as is shown in FIGS. 8-13A. In some embodiments, after the first half rotation, the direction of rotation of the collar 700 is reversed with the reset operation, as previously discussed and shown in FIGS. 24-27A. This can put the projection 724 in a position to engage the ratchet member 610 to execute the second half rotation. This can return the second chamber 504 to the loading position, thereby positioning the second chamber 504 to accept another cartridge.

Figure 8A:
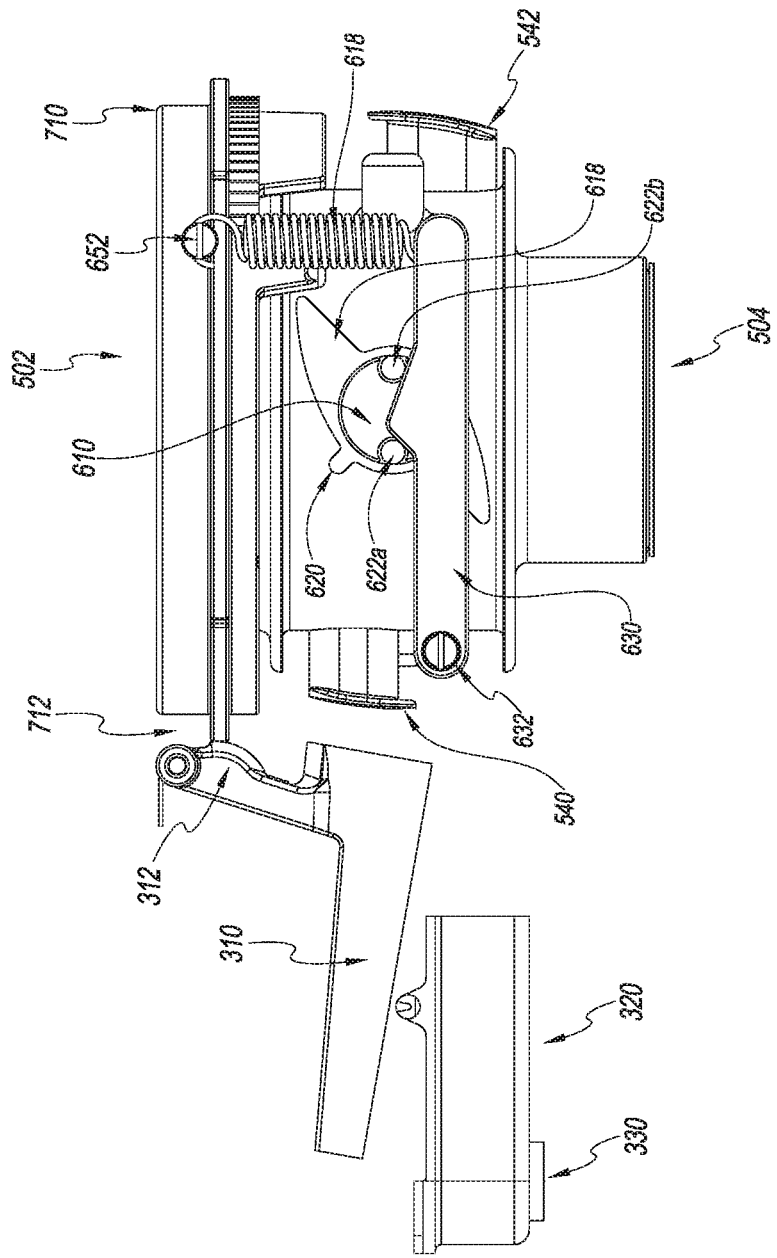
FIG. 8A illustrates a side view of the beverage production assembly of FIG. 8.

In some embodiments, the beverage production assembly 400 is configured to facilitate settling (e.g., a generally equally distribution of) the contents of a cartridge inserted into the basket unit 500. In certain instances, such as if the cartridge was stored on its side, more coffee grounds may be located on one side of the cartridge than the other. This can hinder beverage production, such as by reducing extraction efficiency. As such, it can be desirable to distribute the grounds generally equally on the bottom of the cartridge. In some embodiments, after insertion of a cartridge into one of the chambers 502, 504, the basket unit 500 is rotated back-and-forth (clockwise and counterclockwise) to encourage settling of the contents of the cartridge. For example, the basket unit 500 can be rotated in a clockwise direction less than or equal to about: 45°, 30°, 25°, 20°, 15°, 10°, 5°, 3°, 1°, values between the aforementioned values, or otherwise. The basket unit 500 can be rotated in a counterclockwise direction less than or equal to about: 45°, 30°, 25°, 20°, 15°, 10°, 5°, 3°, 1°, values between the aforementioned values, or otherwise. In some embodiments, during the settling operation, the basket unit 500 is rotated between about 10° and about 20° in the counterclockwise direction and between about 10° and about 20° in the clockwise direction. In some embodiments, during the settling operation, the basket unit 500 is rotated less than about 5° in the counterclockwise direction and less than about 5° in the clockwise direction. In several embodiments, during the settling operation, the basket unit 500 is not rotated a sufficient amount to flip the basket unit 500. In various implementations, after the settling operation, the basket unit 500 is returned to a generally level position (e.g., as shown in FIGS. 8A and 13A) and the brewing process commences.

XIII. Swinging Spout

Figure 28A:
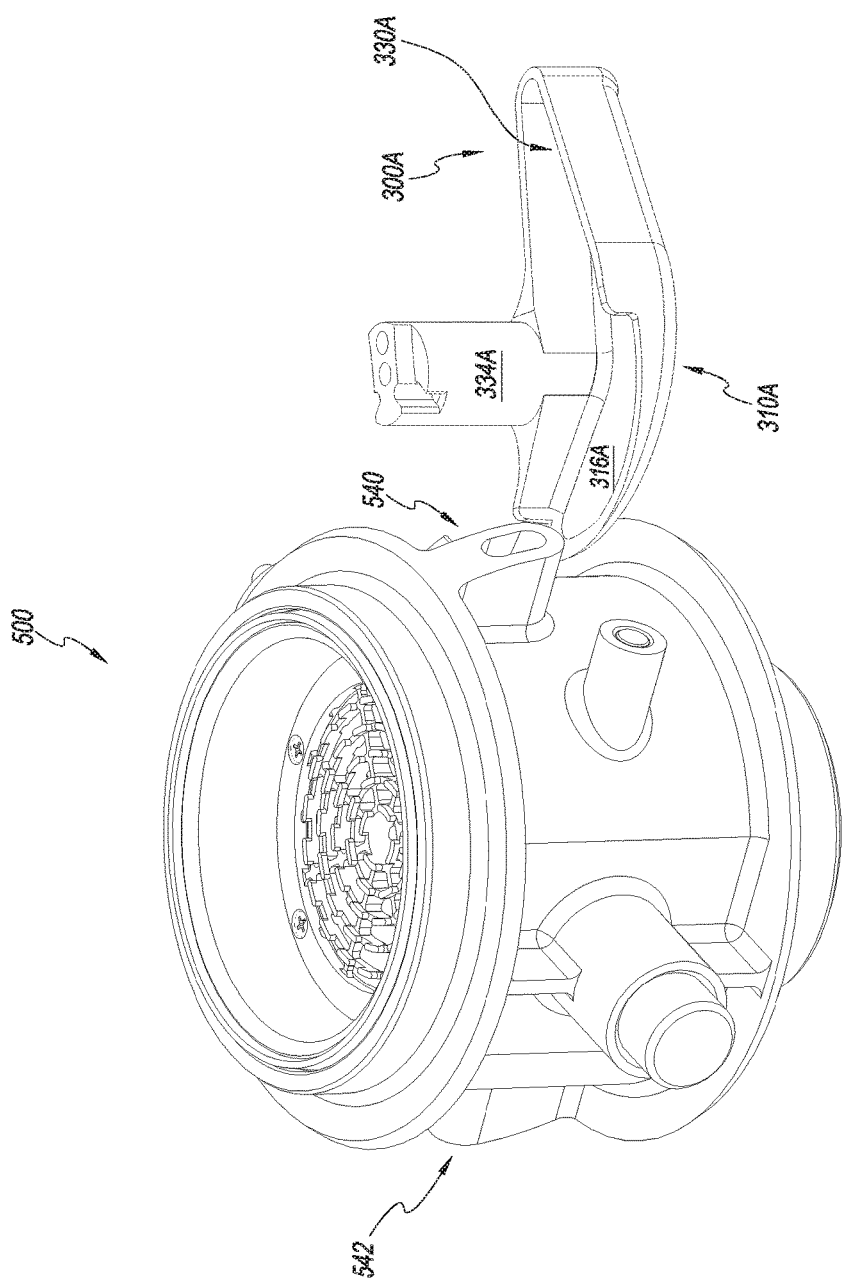

With regard to FIGS. 28 and 28A, an illustrative alternative dispensing assembly 300A is shown. The dispensing assembly 300A can include any of the features of the dispensing assembly 300. The dispensing assembly 300A can be used with any embodiment of the beverage production assembly 400.

As illustrated, the dispensing assembly 300A includes a pivoting member 310 with a passage 316A and a nozzle 330A. The passage 316A can be bounded on one or more sides by walls, which can aid in containing liquid flow. The passage 316A can be angled downwardly to facilitate liquid flow to the nozzle 330A by gravity. The dispensing assembly 300A can be rotatably connected to the housing 105, such as by a support column 334A.

In various embodiments, the dispensing assembly 300A can be selectively rotated into and out of engagement with the outlet ports 540, 542 of the basket unit 500. For example, as shown in FIG. 28, the pivoting member 310A can be rotated out of engagement with the basket unit 500. This can place the dispensing assembly 300A in a position that does not interfere with the basket unit 500 during rotation of the basket unit 500 (e.g., flipping of the basket unit 500). As shown, in FIG. 28A, the pivoting member 310A can be rotated into engagement with the basket unit 500. This can provide a fluid communication path for liquid (e.g., beverage) to exit the basket unit 500 (e.g., via one of the outlet ports 540, 542) and to flow to the nozzle 330A for dispensing. In some embodiments, the pivoting member 310A rotates along an axis that is generally parallel with the axis $RA_c$ and/or generally perpendicular with the axis $RA_b$.

In certain embodiments, the dispensing assembly 300A engages with the collar 700. For example, the pivoting member 310A can include features (e.g., one or more cams) that engage with the collar 700 (e.g., one or more tabs or slots). In some embodiments, rotation of the collar 700 to a first circumferential position results in the pivoting member 310A swinging into engagement with one of the outlet ports 540, 542 of the basket unit 500. In certain variants, rotation of the collar 700 to a second circumferential position results in the pivoting member 310A swinging out of engagement with one of the outlet ports 540, 542 of the basket unit 500. A biasing member (not shown), such as a spring, can bias the dispensing assembly 300A toward the non-engaged position.

XIV. Ratchet Assembly with Cam Member

Figure 29A:
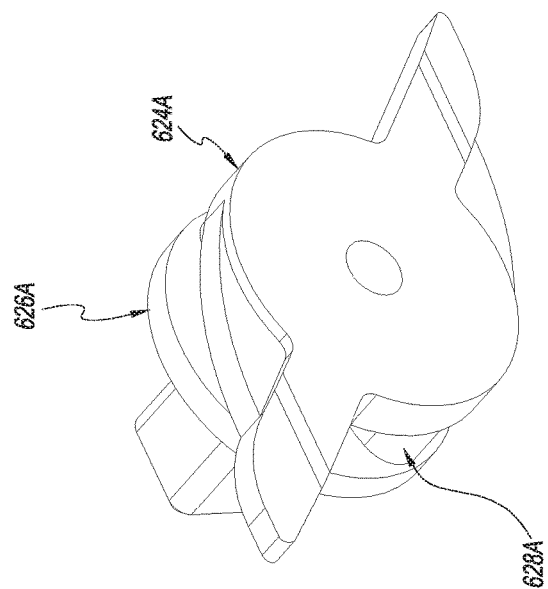
Figure 29:
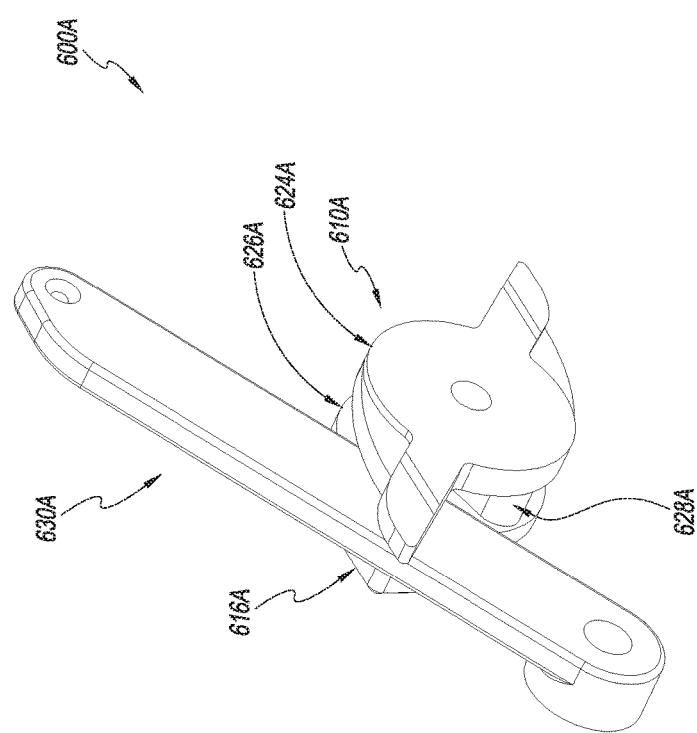
Figure 29B:
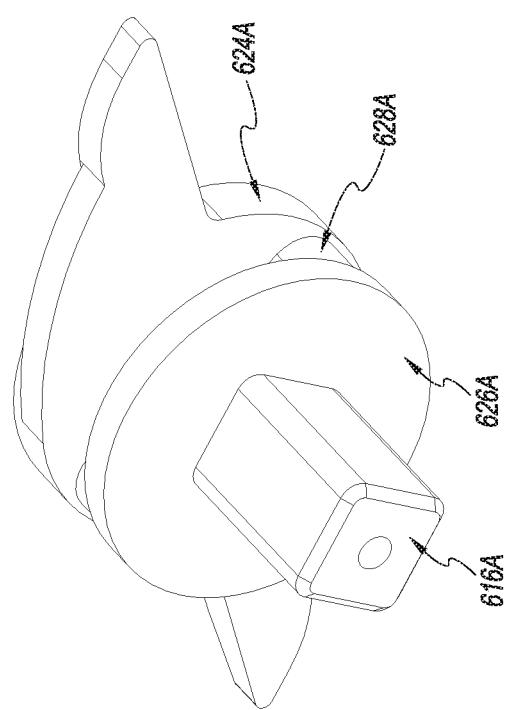

FIGS. 29-29D show an illustrative alternative ratchet assembly 600A. The ratchet assembly 600A can include any of the features of the ratchet assembly 600, such as arms configured to engage the collar 700. The ratchet assembly 600A can be used with any embodiment of the beverage production assembly 400.

As shown, the ratchet assembly 600A can include a ratchet member 610A and a ratchet follower 630A. Some embodiments also include a biasing member (not shown). The ratchet member 610A can be configured to engage with the basket unit 500. For example, the ratchet member 610A can include one or more mating features 616A, such as a projection with a non-circular cross-section that is configured to engage a corresponding recess in the axle portion 516 of the basket unit 500.

The ratchet member 610A can include a first portion 624A and a second portion 626A. In some embodiments, the first and second portions 624A, 626A are spaced-apart by a cam member 628A. As shown, the ratchet follower 630A can be received into the space between the first and second portions 624A, 626A. The biasing member can bias the ratchet follower 630A into engagement with the cam member 628A.

As shown in the cross-sectional view of FIG. 29D, the cam member 628A can have an elongate cross-sectional shape. The cam member 628A can have a length $L_c$ that is greater than its width $W_c$. In certain variants, the ratio of length $L_c$ to width $W_c$ is at least about: 2:1, 3:1, 4:1, 5:1, values between the aforementioned values, or otherwise. In some implementations, the cam member 628A has rounded or chamfered ends, which can facilitate engagement with the ratchet follower 630A.

During rotation of the ratchet assembly 600A with the collar, the ratchet member 610A can be rotated. This can result in the cam member 628A rotating with respect to the ratchet follower 630A. Similar to the previously-described way that rotation of the bosses 622a, 622b deflects the ratchet follower 630A, rotation of the cam member 628A deflects the ratchet follower 630A. This, in turn, can energize the biasing member.

In certain implementations, when the collar 700 has rotated sufficiently so as to disengage with the ratchet member 610A, then the cam member 628A has rotated to a position such that the rounded or chamfered ends are engaged with the ratchet follower 630A. In certain embodiments, when the collar 700 has rotated out of engagement with the ratchet member 610A, a region of engagement between the cam member 628A and the ratchet follower 630A has crossed-over a longitudinal centerline $CL_c$ of the cam member 628A. In some variants, after the collar 700 has rotated out of engagement with the ratchet member 610A, the bias of the biasing member encourages the ratchet follower 630A against the cam member 628A, which can cause the cam member 628A to slide with respect to the ratchet follower 630A. This can result in the ratchet member 610A being further rotated (e.g., by the bias of the basing member acting on the cam member 628A via the ratchet follower 630A). For example, the region of engagement between the cam member 628A and the ratchet follower 630A can slide down the rounded or chamfered end, which can cause further rotation of the ratchet member 610A. In various implementations, rotation of the cam member 628A also rotates the ratchet member 610A and basket unit 500 a corresponding amount.

Thus, according to some embodiments, the engagement between the collar 700 and the ratchet member 610A provides a first amount of rotation of the basket unit 500, and the bias of the basing member acting on the cam member 628A via the ratchet follower 630A provides a second amount of rotation of the basket unit 500. In various embodiments, total of the first amount of rotation and the second amount of rotation of the basket unit 500 is at least about 170° and/or less than or equal to about 190°. Such total rotation is preferably equal to about 180°.

XV. Certain Translating Features

FIGS. 30-30C illustrate an illustrative alternative beverage production assembly 1400. Many of the features of the beverage production assembly 1400 are the same as or similar to the features described above in connection with the beverage production assembly 400. Indeed, the beverage production assembly 1400 can include one or more of any of the features of the beverage production assembly 400, including all combinations and sub-combinations.

Figure 30A:
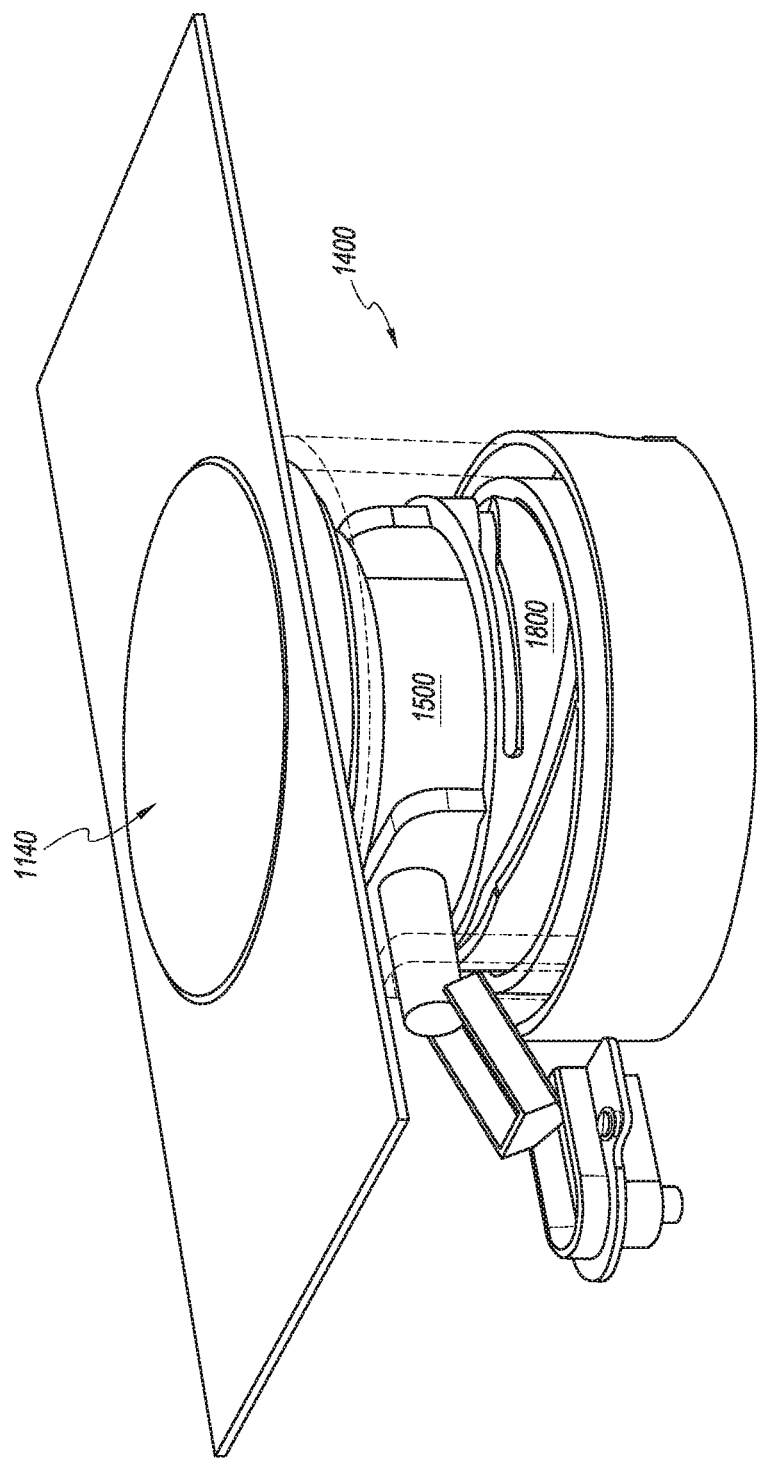

The beverage production assembly 1400 can include a multi-chambered basket unit 1500. The basket unit 1500 includes a first chamber (not shown) and a second chamber 1504, which can be generally opposite the first chamber. As shown, a lid assembly 1140 can be opened to facilitate loading of a cartridge into the chamber 1504. As shown in FIG. 30A, the lid assembly 1140 can be closed for the beverage preparation process.

In some embodiments, the basket unit 1500 can rotate to selectively orient one of the first and second chambers to the loading position. For example, FIG. 30 illustrates the second chamber 1504 in a loading position. In various embodiments, the basket unit 1500 is configured to rotate about one or more axle portions 1516. In certain implementations, the basket unit 1500 can rotate about an axis of rotation $RA_b$ that passes between a front and rear wall of the main housing 105. For example, the axis $RA_b$ can pass through a generally vertical front face of the main housing 105. In certain variants, during the dispensing process, the beverage flows from the basket unit 1500 to a dispensing assembly 1300 in a direction that is not perpendicular to (e.g., parallel with) the axis $RA_b$. For example, the basket unit 1500 can include first conduit 1536 (not shown) in fluid communication with the first chamber 1502 and a second conduit 1538 (not shown) in fluid communication with the second chamber 1504. The conduits 1536, 1538 can pass through the one or more axle portions 1516.

As illustrated, an outlet of at least one of the conduits 1536, 1538 can engage with the dispensing assembly 1300. The dispensing assembly 1300 can include a pivoting member 1310 (e.g., an anti-drip unit), catch member 1320, and outlet 1330. The pivoting member 1310 can be pivotally connected with the catch member 1320 or a frame 1125, such as by a pinned connection.

In some variants, the basket unit 1500 is configured to translate, such as moving substantially vertically. As shown, the basket unit 1500 is connected with a cam collar 1800. The cam collar 1800 in turn can engage with a collar 1700 (not shown), which can be rotated (e.g., by a motor and/or gearing) about the axis $RA_c$. The engagement between the collar 1700 and cam collar 1800 can provide substantially vertical translation of the basket unit 1500, such as between the upper position of FIG. 30A and the lower position of FIG. 30C.

In certain embodiments, the cam collar 1800 has one or more cam tracks 1810 that are configured to receive one or more cam teeth 1712 (not shown) on the collar 1700. The cam tracks 1810 can include angled tracks 1810a, which form a portion of a helix on a periphery of the collar 1800. The cam tracks 1810 can also include non-angled tracks 1810b, which extend around a portion of the periphery of the collar 1800 generally parallel to a circumferential axis of the collar. As shown, the angled tracks 1810a and non-angled tracks 1810b can intersect. For example, the cam tracks 1810 can include an angled track 1810a portion and then a non-angled track portion 1810b.

During rotation of the collar 1700 about the axis $RA_c$, the cam teeth 1712 travel along the cam tracks 1810. When the teeth travel along the angled tracks 1810a, the cam collar 1800 is drawn toward or away from the collar 1700, depending on the direction of rotation of the collar 1700. Because the cam collar 1800 is connected with the basket unit 1500, such vertical movement of the cam collar 1800 also vertically moves the basket unit 1500. In some implementations, the basket unit 1500 translates vertically (e.g., downward) during rotation of the basket unit 1500 about the axis $RA_b$.

Figure 30B:
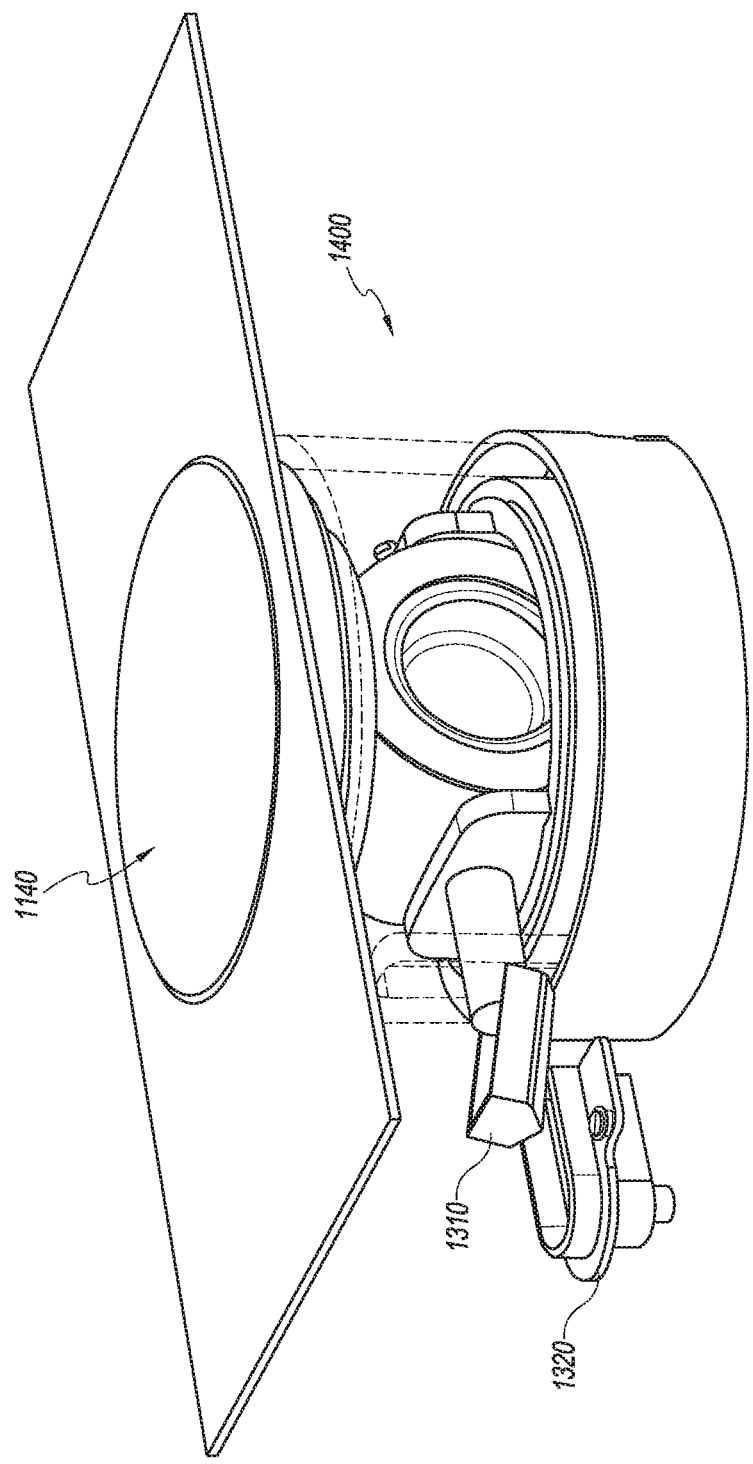

Vertical movement can be beneficial, for example, to inhibit or prevent dripping. For example, as shown in FIG. 30B, when the basket unit 1500 is moved downward, the pivoting member 1310 can pivot away from the catch member 1320. This can direct liquid (e.g., residual beverage liquid) toward a waste bin or other location, and thus decrease the chance of that liquid dripping outside the main housing 105. In some embodiments, the pivoting member is biased (e.g., toward the position shown in FIG. 28B).

FIG. 30C shows the basket unit 1500 after a half-flip operation has been completed. In various implementations, at the conclusion of the half-flip operation, the cartridge that was previously generally downwardly-oriented is now generally upwardly-oriented and the cartridge that was previously generally upwardly-oriented is now generally downwardly-oriented. This can facilitate loading a cartridge into the newly generally upwardly-oriented chamber. Moreover, this can facilitate ejecting a used or unwanted cartridge from the chamber that was previously-upwardly oriented (e.g., the second chamber 504 in the embodiment shown) by force of gravity or otherwise.

In the embodiment illustrated, the collar 1700 and the cam collar 1800 is shown at least partly below the basket unit 1500. However, in some embodiments, the collar 1700 and the cam collar 1800 are located at least partly above the basket unit 1500. For example, the collar 1700 can be positioned similarly to what is shown in FIG. 8, and the cam collar 1800 can be located in the lid assembly 1140. In some implementations, the lid assembly 1140 receives a portion of the cam collar 1800.

In certain variants, the cam collar 1800 is connected with a tamp assembly rather than or in addition to the basket unit 1500. Translation of the cam collar 1800 can result in translation of the tamp assembly relative to a cartridge in one of the chambers. This can facilitate compressing beverage component or precursor components (e.g., espresso grounds) in the cartridge. Translation of certain components in a main housing, as well as tamping functionality, is discussed in more detail in U.S. application Ser. No. 14/205, 241, titled "BEVERAGE PRODUCTION MACHINES AND METHODS WITH TAMPING ASSEMBLY," filed Mar. 11, 2014; as noted above, that application is incorporated by reference herein in its entirety.

Figure 31B:
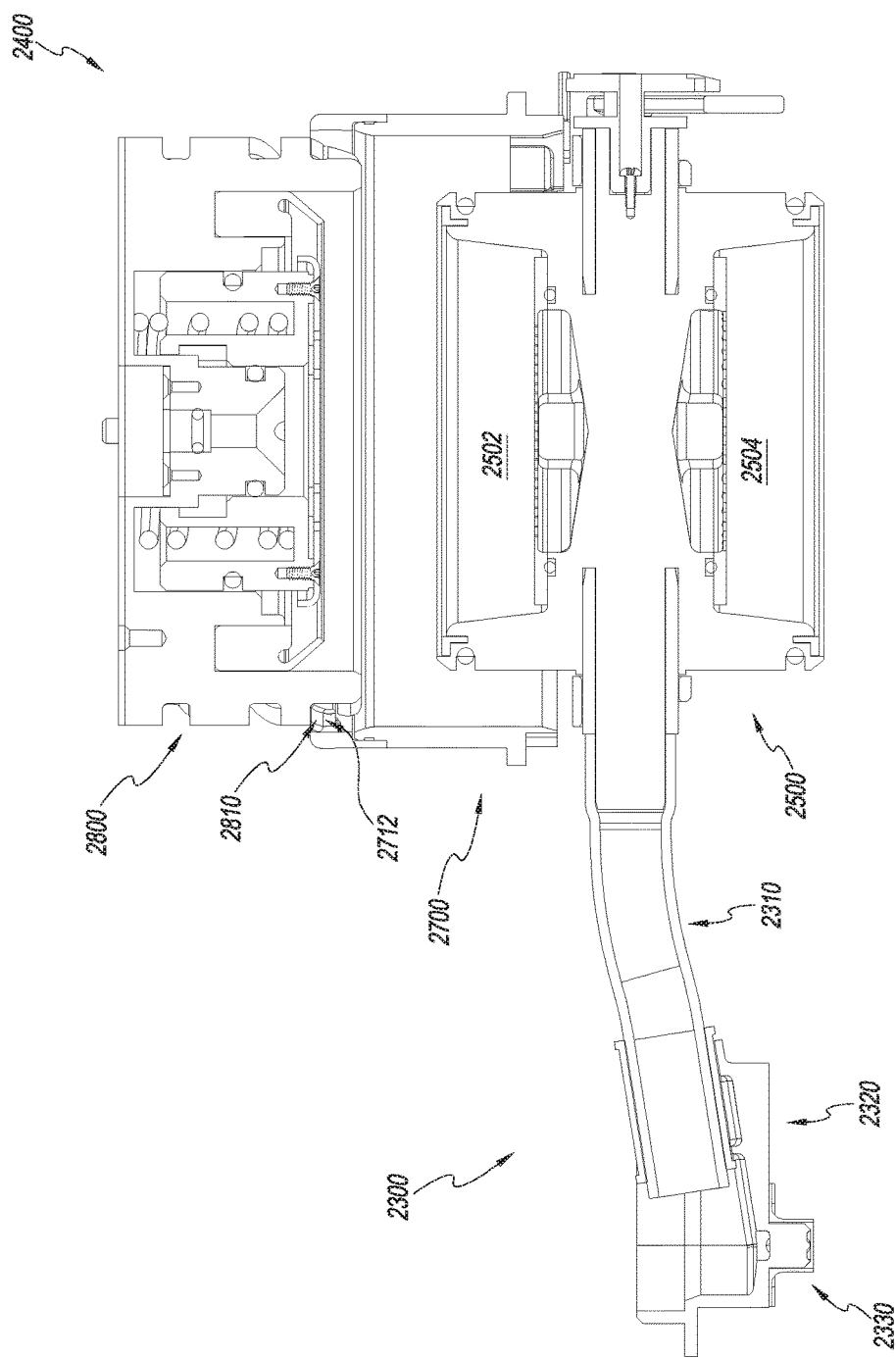

FIGS. 31-31B illustrate another example of an alternative beverage production assembly 2400. Many of the features of the beverage production assembly 2400 are the same as or similar to the features described above in connection with the beverage production assemblies 400, 1400. Indeed, the beverage production assembly 2400 can include one or more of any of the features of the beverage production assemblies 400, 1400, including all combinations and sub-combinations.

As shown, the beverage production assembly 2400 can include a multi-chambered basket unit 2500, ratchet assembly 2600, and/or collar 2700. The collar 2700 can engage with a lid portion 2800. For example, one of the collar 2700 and the lid portion 2800 can include one or more teeth 2712 that can be received in one or more cam tracks 2810 in the other of the collar 2700 and the lid portion 2800. As shown, a portion of the cam tracks 2810 are at an angle relative to an axis of rotation of the collar 2700. In some variants, the cam tracks 2810 form a portion of a substantially helical shape.

In certain embodiments, rotation of the collar 2700 can result in the teeth moving along the tracks 2810. Due to the angle of the cam tracks 2810, this can cause translational movement between the collar 2700 and the lid portion 2800. In some implementations, the collar 2700 is generally translationarily stationary relative to the housing 105 and the lid portion 2800 translates. In certain implementations, the lid portion 2800 is generally translationarily stationary relative to the housing 105 and the collar 2700 translates. In some variants, both the collar 2700 and the lid portion 2800 translate relative to each other and to the housing 105.

In certain variants, the lid portion 2800 is connected with a tamp assembly. In various embodiments, the translation of the collar 2700 and/or the lid portion 2800 can cause the tamp assembly to move relative to (e.g., into and/or out of engagement with) a cartridge in one of the chambers. This can facilitate compressing beverage component or precursor components (e.g., espresso grounds) in the cartridge. As noted above, translation of certain components in a main housing, as well as tamping functionality, is discussed in more detail in U.S. application Ser. No. 14/205,241, titled "BEVERAGE PRODUCTION MACHINES AND METHODS WITH TAMPING ASSEMBLY," filed Mar. 11, 2014, as noted above that application is incorporated by reference herein in its entirety.

With continued reference to FIGS. 31-31B, the beverage production assembly 2400 can include a discharge assembly 2300. As shown, the discharge assembly 2300 can include a conduit 2310, catch member 2320, and outlet 2330. The conduit 2310 can be in fluid communication with chambers 2502, 2504 of the basket unit 2500. For example, the basket unit 500 can include one or more internal passages (not shown) that connect the chambers 2502, 2504 with the conduit 2310.

In some implementations, the conduit 2310 is flexible and/or resilient. In certain embodiments, this can aid in translation of the basket unit 2500. For example, in some embodiments in which the basket unit 500 can translate relative to the outlet 2330, the conduit 2310 can flex to maintain a liquid flow path between the basket unit 2500 and the outlet 2330.

In certain embodiments, the flexible and/or resilient conduit 2310 can facilitate closing a fluid flow path between the outlet 2330 and the chambers of the basket unit 2500. For example, certain embodiments include one or more pinch members (not shown) that can pinch the conduit 2310, thereby selectively reducing the size of or eliminating the fluid flow path between the outlet 2330 and the chambers 502, 504 of the basket unit 2500. In some embodiments, at least one of the pinch members engages with the collar 2700 such that rotation of the collar 2700 can engage and/or disengage the pinch members with the collar 2700. For example, the pinch members can include gears that engage with the teeth 720 on the collar 700. In some implementations, one of the pinch members is engaged with another of the pinch members in a master-slave gear relationship.

XVI. Waste Bin Unit

Several embodiments include a waste bin unit for collecting and/or storing cartridges, such as used or unwanted cartridges. The waste bin unit can be selectively received in, and removable from, the housing 105. This can facilitate removing and/or discarding cartridges from the machine 100.

Figure 32:
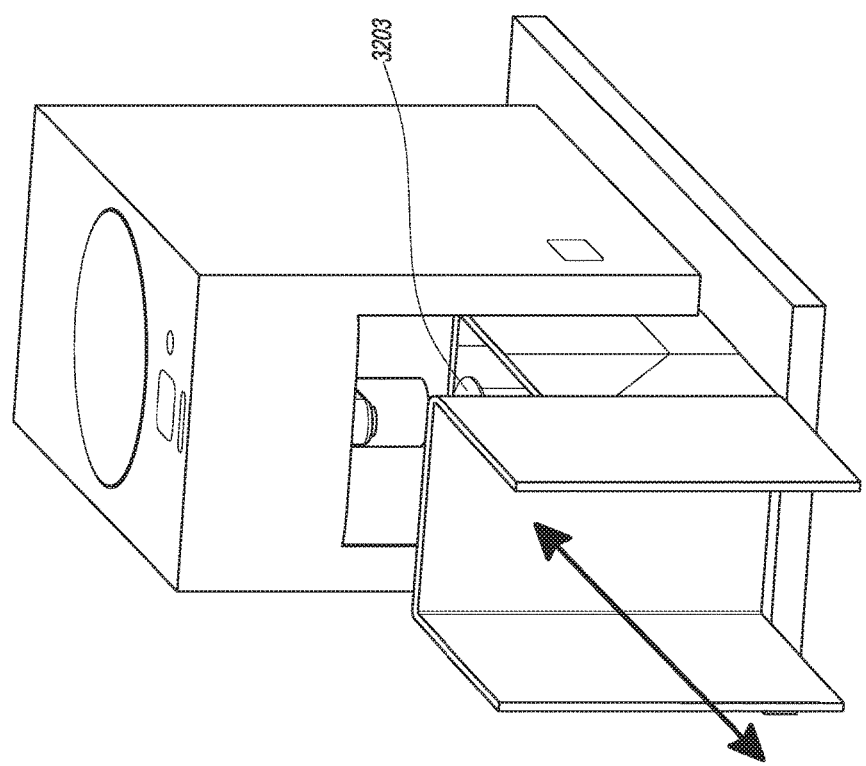

As illustrated in FIGS. 32 and 32A, the waste bin unit can include a first receptacle 3201 configured to receive the cartridges. Certain embodiments include a plurality of receptacles, such as a first receptacle 3201 and a second receptacle 3202. In certain variants, the second receptacle 3202 is located underneath the first receptacle 3201. In some embodiments, the first receptacle 3201 is separable from the second receptacle 3202.

The first receptacle 3201 can be configured to receive a cartridge (e.g., a spent, used, or discarded cartridge 3203) from the single-serve brewing machine. In some implementations, the first receptacle 3201 may comprise a porous (e.g., perforated) floor. The porous floor can be configured to retain the cartridge body and/or to permit excess water, beverage, and/or any stray beverage precursor material to pass through (e.g., to enter the second receptacle). Such a drainage system may be beneficial to limit molding, odor, and other negative aspects of storing wet, used cartridges. The porous floor may comprise, for example, mesh, netting, a single opening, a plurality of openings, etc. In some variations, the openings may range from 0.1 mm to 5 mm; 0.5 mm to 5 mm; 1 mm to 5 mm; 0.1 mm to 2 mm; 0.5 mm to 2 mm; or 1 mm to 2 mm such that liquid is permitted to pass through but the cartridge body and beverage precursor material is substantially retained. In some variations, the openings may range from 1 mm to 20 mm; 1 mm to 10 mm; 1 mm to 5 mm; 3 mm to 20 mm; 3 mm to 10 mm; 3 mm to 5 mm; 5 mm to 20 mm; or 5 mm to 10 mm to permit beverage precursor material to pass through. In some embodiments the porous floor comprises the same material as the first receptacle. In other implementations, the perforated floor comprises a different material than the first receptacle. In some embodiments, the porous floor and the reminder of the first receptacle 3201 (e.g., walls) are formed as a single unitary component. In other variants, the porous floor and the reminder of the first receptacle 3201 are formed as separate components that are subsequently assembled together.

In some embodiments, the waste bin unit includes a removal mechanism. This can assist the user in disassociating the waste bin unit from the beverage machine. In some embodiments, the removal mechanism is configured to tilt one or more of the receptacles, such as tilting the first and/or second receptacles generally toward a front of the machine 100.

In some embodiments, the waste bin unit includes a compression device (not shown) to compress the contents of one or more of the receptacles. For example, the machine 100 can include a piston that extends into the first and/or second receptacle to apply compressive force to cartridges located therein. This can reduce the amount of volume of the receptacle that is occupied by discarded cartridges, which can increase the number of cartridges the receptacle is able to contain, can reduce the frequency that the receptacle needs to be emptied, and/or can facilitate disassociating the waste bin unit from the beverage machine.

In certain embodiments, the waste bin unit includes a sensing mechanism (not shown) configured to determine a status of one or more of the receptacles. For example, the sensing mechanism can include a position sensor to monitor whether one or both of the receptacles are properly engaged in the machine 100. In some implementations, the sensing mechanism includes a sensor for monitoring the amount or level of material in one or both of the receptacles. For example, the sensing mechanism can include a sensor (e.g., a proximity sensor, weight sensor, or otherwise) configured to send a signal to a controller of the machine 100 when a characteristic (e.g., height or weight) of the materials in one or more of the receptacles exceeds a certain amount.

XVII. Summary

Various embodiments and examples of beverage preparation machines and methods including multi-chamber basket units have been described herein. Although certain embodiments and examples have been described herein with respect to cartridges for producing coffee beverages, the basket units and chambers described herein can be configured to receive cartridges containing other particulate materials or components for producing many other types of beverages, such as a chocolate based product (e.g., hot cocoa), tea, juice, soup, broth, and other beverages. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener).

As used herein, the term "beverage," in addition to having its ordinary meaning, can include, among other things, any liquid or substantially liquid substance or product having a flowing quality such as juices, coffee beverages, teas, frozen yogurt, beer, wine, cocktails, liqueurs, spirits, cider, soft drinks, flavored water, energy drinks, soups, broths, combinations of the same, or the like. The term "cartridge" as used herein shall be given its ordinary and customary meaning, and includes, among other things, cartridges, capsules, cups, pods, pucks, pads, and the like, whether or not such cartridge is capable of being pierced or otherwise ruptured in order to form an inlet and/or outlet for the cartridge.

Although this disclosure describes certain embodiments and examples of beverage preparation machines, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensable. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. Although there may be some embodiments within the scope of this disclosure that are not expressly recited above or elsewhere herein, the present disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15°, 10°, 5°, 3°, 1°, 0.1°, or otherwise. Similarly, in certain embodiments, the terms "generally perpendicular" and "substantially perpendicular" refer to a value, amount, or characteristic that departs from exactly perpendicular by less than or equal to 15°, 10°, 5°, 3°, 1°, 0.1°, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various illustrative embodiments and examples of beverage preparation machines have been disclosed. Although the beverage preparation machines have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A method of preparing an individual serving of a beverage, the method comprising:
   rotating a basket unit to a first configuration in which a first chamber of the basket unit is located in a loading position;
   receiving a cartridge in the first chamber;
   introducing liquid into the cartridge in the first chamber to prepare the individual serving of the beverage;
   dispensing the individual serving of the beverage into a vessel;
   rotating the basket unit to a second configuration in which a second chamber of the basket unit is located in the loading position; and
   sensing, with an electronic sensor, that one of the first chamber and the second chamber is in the loading position.

2. The method of claim 1, further comprising:
   ejecting the cartridge into a waste bin during rotation of the basket unit to the second configuration;
   rinsing at least one of an interior surface of the first chamber and a seal surface of the first chamber; and
   disposing of residual beverage fluid in the first chamber into the waste bin.

3. The method of claim 1, further comprising compressing the cartridge in the first chamber with a tamp assembly.

4. The method of claim 1, further comprising:
   rotating a collar in a first direction; and
   engaging the collar with a first surface of a ratchet assembly that is connected with the basket unit, thereby rotating the basket unit between the first and second configurations.

5. The method of claim 4, further comprising:
   rotating the collar in a second direction; and
   sliding the collar along a second surface of the ratchet assembly, thereby not rotating the basket unit between the first and second configurations.

6. The method of claim 4, wherein the collar rotates about an axis of rotation that is substantially perpendicular to an axis of rotation of the basket unit.

7. The method of claim 1, wherein sensing, with the electronic sensor, that one of the first chamber and the second chamber is in the loading position comprises sensing, with the electronic sensor, whether the first chamber is in the loading position or whether the second chamber is in the loading position.

8. The method of claim 1, wherein rotating the basket unit to the second configuration comprises operating a motor to rotate the basket unit.

9. The method of claim 1, wherein rotating the basket unit to the second configuration further comprises rotating the first chamber to an inverted position.

10. The method of claim 1, wherein in the first configuration the first chamber is oriented generally upwardly and the second chamber is oriented generally downwardly, and in the second configuration the second chamber is oriented generally upwardly and the first chamber is oriented generally downwardly.

11. A method of controlling a beverage preparation machine to prepare a beverage, the method comprising:
positioning a first chamber of a basket unit of the beverage preparation machine in a position to receive a first cartridge, the first cartridge having a first size;
introducing liquid into the first cartridge in the first chamber, thereby producing the beverage;
dispensing the beverage from the first cartridge;
dispensing the beverage from the beverage preparation machine;
rotating, with a motor, the basket unit relative to a housing of the beverage preparation machine;
sensing, with a sensor of the beverage preparation machine, a rotational position of the basket unit; and
positioning a second chamber of the basket unit of the beverage preparation machine in a position to receive a second cartridge, the second cartridge having a second size that is less than the first size of the first cartridge, the second chamber being too small to receive the first cartridge.

12. The method of claim 11, further comprising sending a signal from the sensor to a controller of the beverage preparation machine, the signal indicative of the rotational position of the basket unit.

13. The method of claim 11, wherein the sensor of the beverage preparation machine comprises an electronic sensor.

14. The method of claim 11, wherein the first size comprises an outside diameter of a sidewall of the first cartridge and the second size comprises an outside diameter of a sidewall of the second cartridge.

15. The method of claim 11, wherein rotating, with the motor, the basket unit relative to the housing of the beverage preparation machine comprises rotating the first chamber to a substantially inverted position.

16. The method of claim 11, wherein:
positioning the first chamber of the basket unit of the beverage preparation machine in the position to receive the first cartridge comprises positioning the first chamber in a position such that the first chamber opens upwardly; and
positioning the second chamber of the basket unit of the beverage preparation machine in the position to receive the second cartridge comprises positioning the second chamber in a position such that the second chamber opens upwardly.

17. The method of claim 11, wherein rotating, with a motor, the basket unit relative to the housing of the beverage preparation machine comprises rotating a collar substantially circumscribing the basket unit.

18. The method of claim 11, wherein the first cartridge comprises a brewed coffee beverage cartridge type, and wherein dispensing the beverage from the first cartridge comprises dispensing a brewed coffee beverage.

19. The method of claim 18, wherein the second cartridge comprises an espresso beverage cartridge type and the method further comprises:
pressurizing the second chamber to at least 9 bar;
introducing liquid into the second cartridge in the second chamber, thereby producing an espresso beverage; and
dispensing the espresso beverage.

20. A method of preparing an individual serving of a beverage using a beverage preparation machine that comprises a basket unit and a sensor, the method comprising:
rotating a basket unit to a first configuration in which a first chamber of the basket unit is located in a loading position;
receiving a cartridge in the first chamber;
introducing liquid into the cartridge in the first chamber to prepare the individual serving of the beverage;
dispensing the individual serving of the beverage into a vessel;
rotating the basket unit to a second configuration in which a second chamber of the basket unit is located in the loading position; and
sensing, with the sensor, whether the first chamber is in the loading position or whether the second chamber is in the loading position.

21. The method of claim 20, further comprising compressing the cartridge in the first chamber with a tamp assembly.

22. The method of claim 20, wherein rotating the basket unit to the second configuration comprises operating a motor to rotate the basket unit.

23. The method of claim 20, wherein rotating the basket unit to the second configuration further comprises rotating the first chamber to an inverted position.

24. A method of preparing an individual serving of a beverage, the method comprising:
rotating a basket unit to a first configuration in which a first chamber of the basket unit is located in a loading position;
receiving a cartridge in the first chamber;
introducing liquid into the cartridge in the first chamber to prepare the individual serving of the beverage;
dispensing the individual serving of the beverage into a vessel;
rotating the basket unit to a second configuration in which a second chamber of the basket unit is located in the loading position;
rotating a collar in a first direction; and
engaging the collar with a first surface of a ratchet assembly that is connected with the basket unit, thereby rotating the basket unit between the first and second configurations.

25. The method of claim 24, further comprising:
rotating the collar in a second direction; and
sliding the collar along a second surface of the ratchet assembly, thereby not rotating the basket unit between the first and second configurations.

26. The method of claim 24, wherein the collar rotates about an axis of rotation that is substantially perpendicular to an axis of rotation of the basket unit.

* * * * *